US008244779B2

(12) United States Patent
Borg et al.

(10) Patent No.: US 8,244,779 B2
(45) Date of Patent: Aug. 14, 2012

(54) METHOD AND SYSTEM FOR MONITORING A MOBILE EQUIPMENT FLEET

(75) Inventors: Christophe S. Borg, Austin, TX (US); Christopher K. Copeland, Austin, TX (US)

(73) Assignee: BorgSolutions, Inc., Austin, TX (US)

( * ) Notice: Subject to any disclaimer, the term of this patent is extended or adjusted under 35 U.S.C. 154(b) by 0 days.

(21) Appl. No.: 13/253,599

(22) Filed: Oct. 5, 2011

(65) Prior Publication Data

US 2012/0028635 A1 Feb. 2, 2012

Related U.S. Application Data

(63) Continuation of application No. 12/390,960, filed on Feb. 23, 2009, now Pat. No. 8,065,342.

(60) Provisional application No. 61/030,636, filed on Feb. 22, 2008.

(51) Int. Cl.
*G06F 17/30* (2006.01)

(52) U.S. Cl. ........ 707/803; 707/721; 707/792; 707/917; 707/944; 707/955; 455/404

(58) Field of Classification Search .................. 707/721, 707/792, 803; 455/404, 456, 566
See application file for complete search history.

(56) References Cited

U.S. PATENT DOCUMENTS

| 7,149,537 | B1 * | 12/2006 | Kupsh et al. ................. 455/466 |
| 7,349,825 | B1 * | 3/2008 | Williams et al. ............. 702/182 |
| 7,457,693 | B2 | 11/2008 | Olsen et al. |
| 2002/0097193 | A1 * | 7/2002 | Powers .......................... 345/2.3 |
| 2002/0168958 | A1 * | 11/2002 | Ford et al. ..................... 455/404 |
| 2008/0162592 | A1 * | 7/2008 | Huang et al. .................. 707/202 |

OTHER PUBLICATIONS

CSR Press Release, "Driven to Perform: New UPS Fleet Maintenance Procedures to Save 330,000 Quarts of Oil, $3 Million Annually," CSRwire, Aug. 18, 2003, http://www.csrwire.com/press_releases/24322-Driven-to-Perform-New-UPS-Fleet-Maintenance-Procedures-To-Save-330-000-Quarts-of-Oil-3-Million-Annually, 2 pages. [Retrieved Apr. 4, 2012].

GE Capital Solutions Fleet Services' my.DashboardSM Surpasses 100 Data Metrics Mark, GE Capital: Fleet Services, Jun. 1, 2007, https://www.gefleet.com/fleet/ab_4_1_0_20070601.html, 2 pages. [Retrieved Apr. 4, 2012].

John Deere, JDLinkTM Machine Monitoring System Customer FAQS, Deere & Company, 2012, http://www.deere.com/en_US/cfd/forestry/deere_forestry/service_support/jdlink_faq.html, 2 pages. [Retrieved Apr. 4, 2012].

* cited by examiner

*Primary Examiner* — Jean M Corrielus
*Assistant Examiner* — Andalib Lodhi
(74) *Attorney, Agent, or Firm* — Stephen A. Mason; Meyertons, Hood, Kivlin, Kowert & Goetzel, P.C.

(57) ABSTRACT

A method is disclosed. The method includes receiving a message from a remote device. The message includes data. The method further includes analyzing the data using a set of rules. The analyzing includes performing a maintenance analysis by analyzing the data using a set of asset maintenance rules and a set of asset usage rules. Responsive to the analyzing the data using the set of rules, an alert is sent.

17 Claims, 66 Drawing Sheets

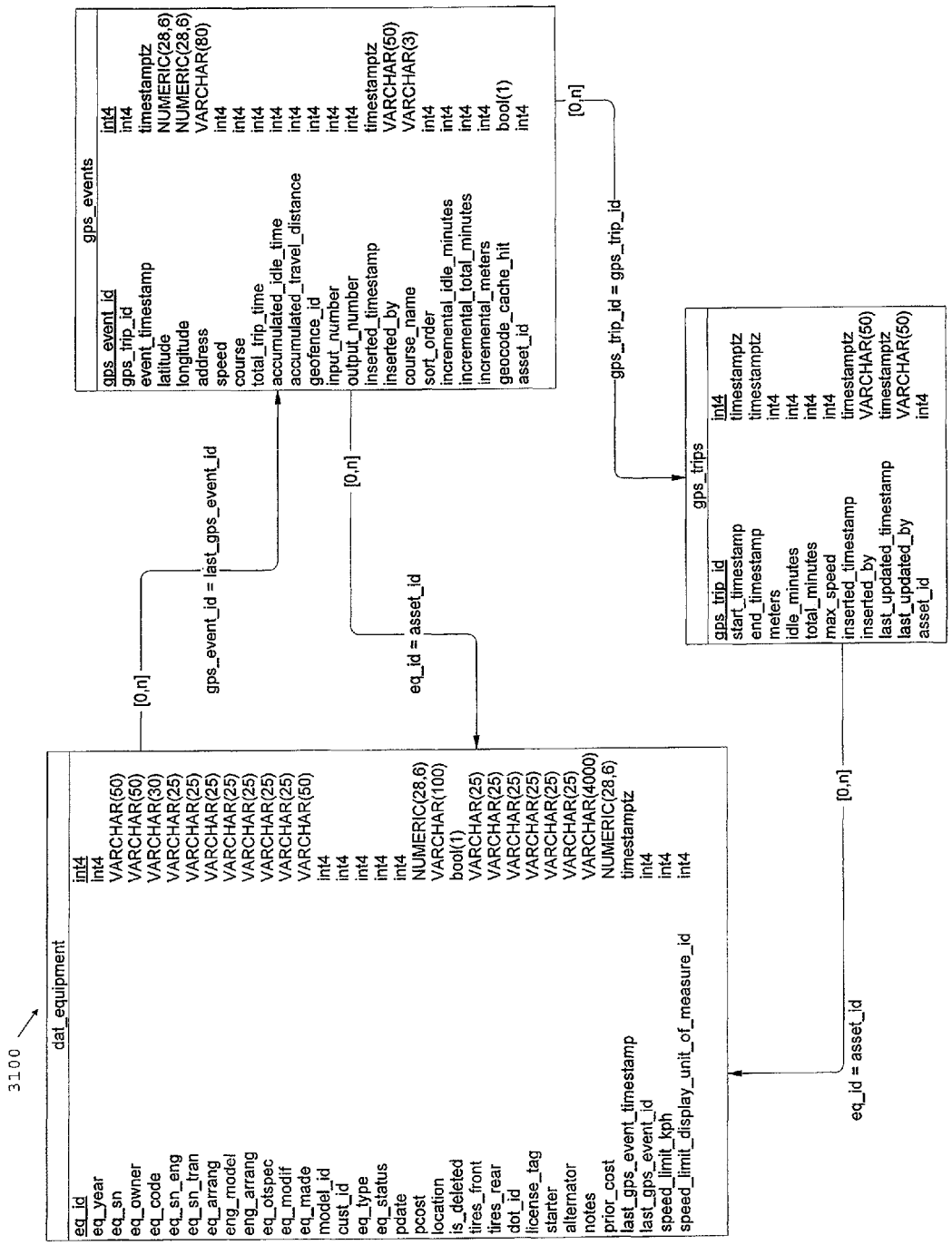
Figure 31B1

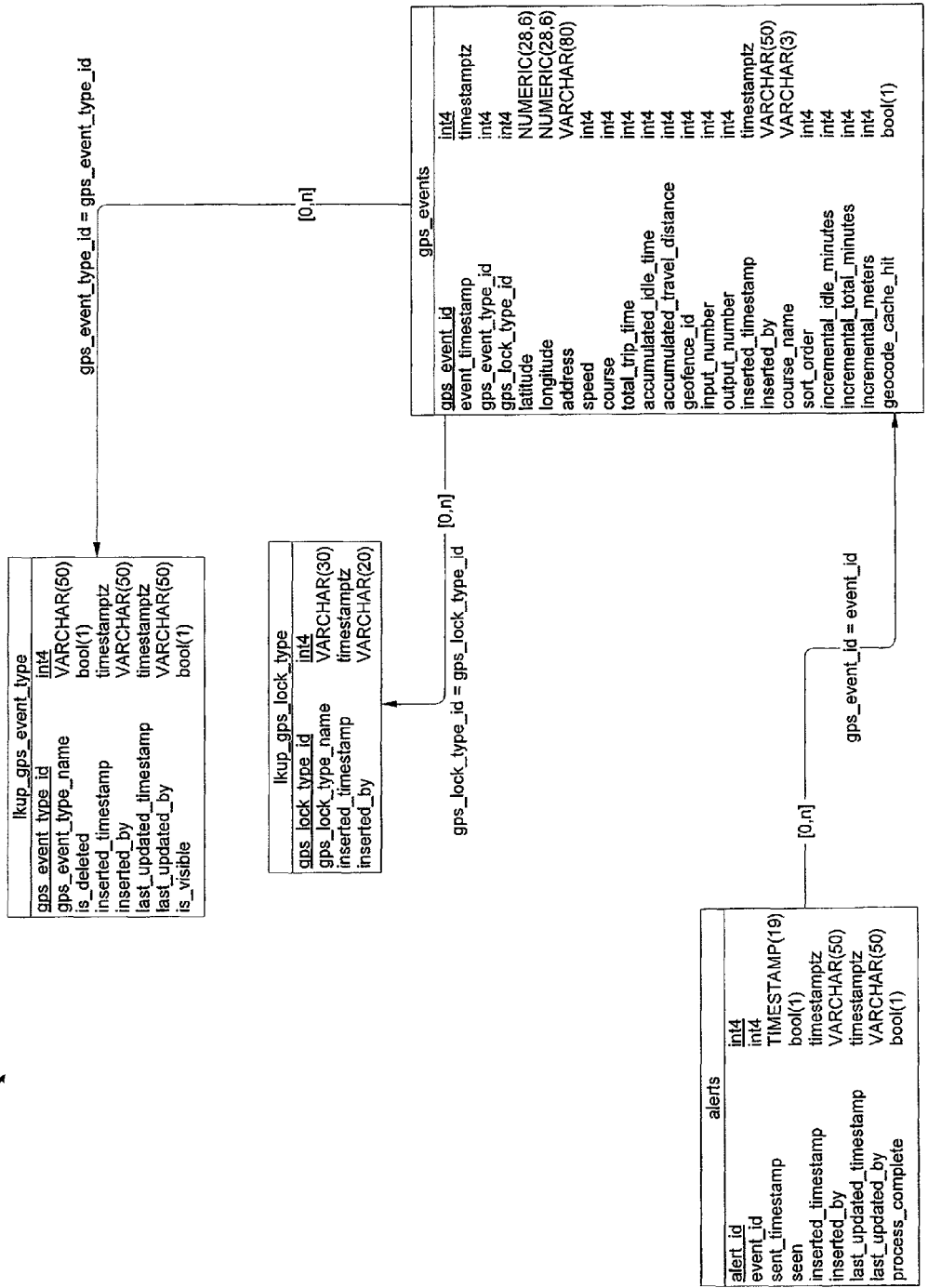
Figure 31B2

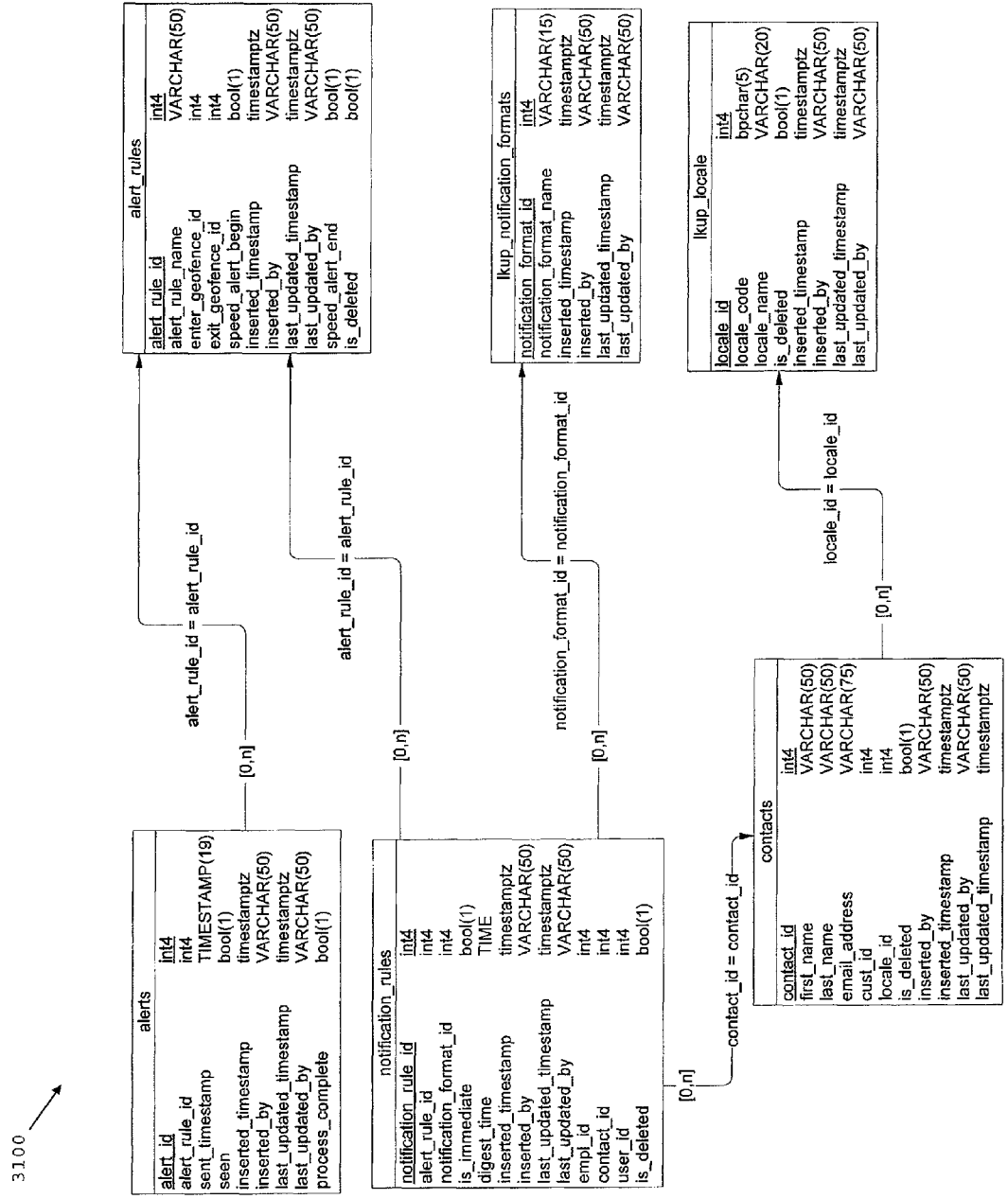
Figure 31C1

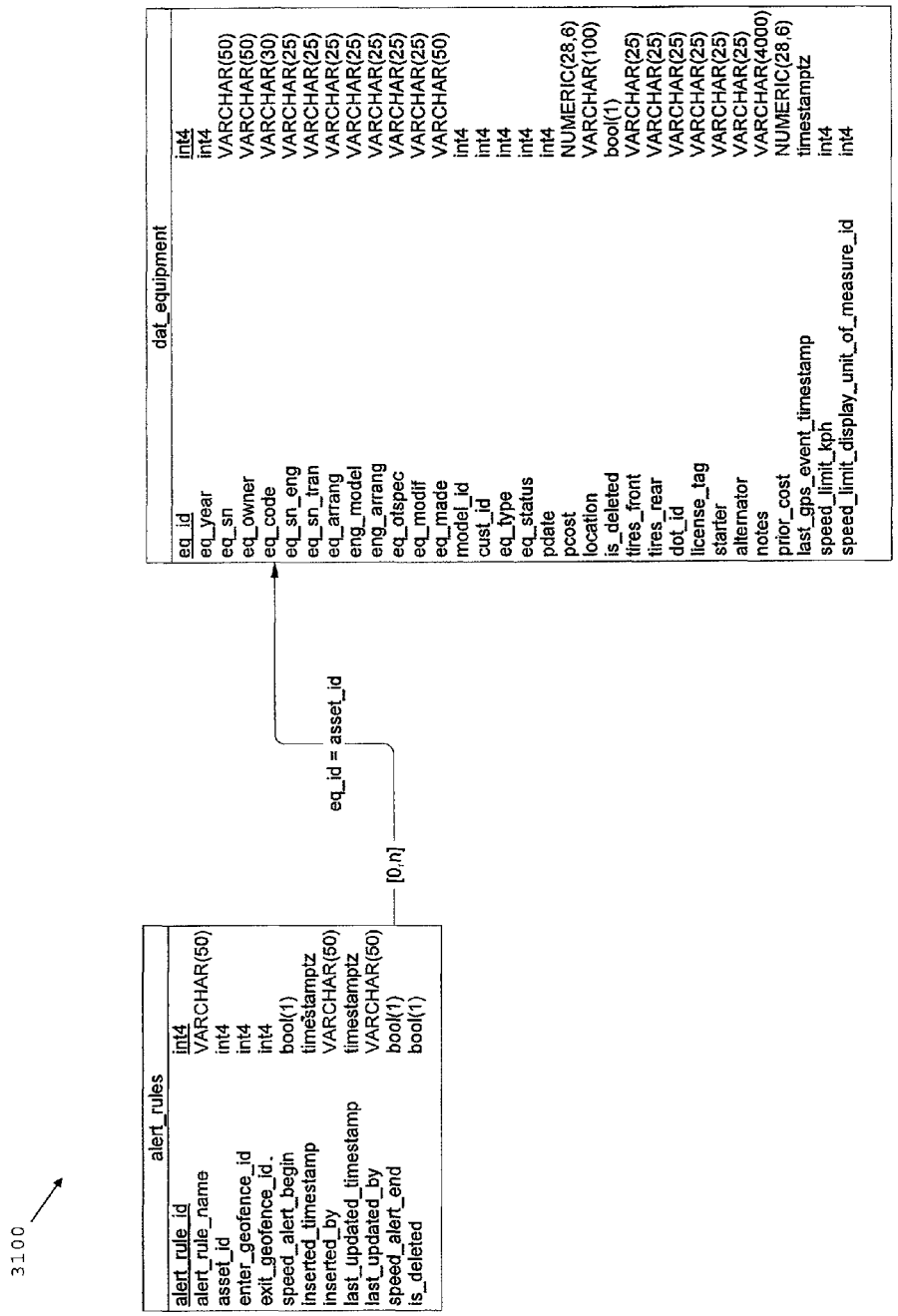
Figure 31C2

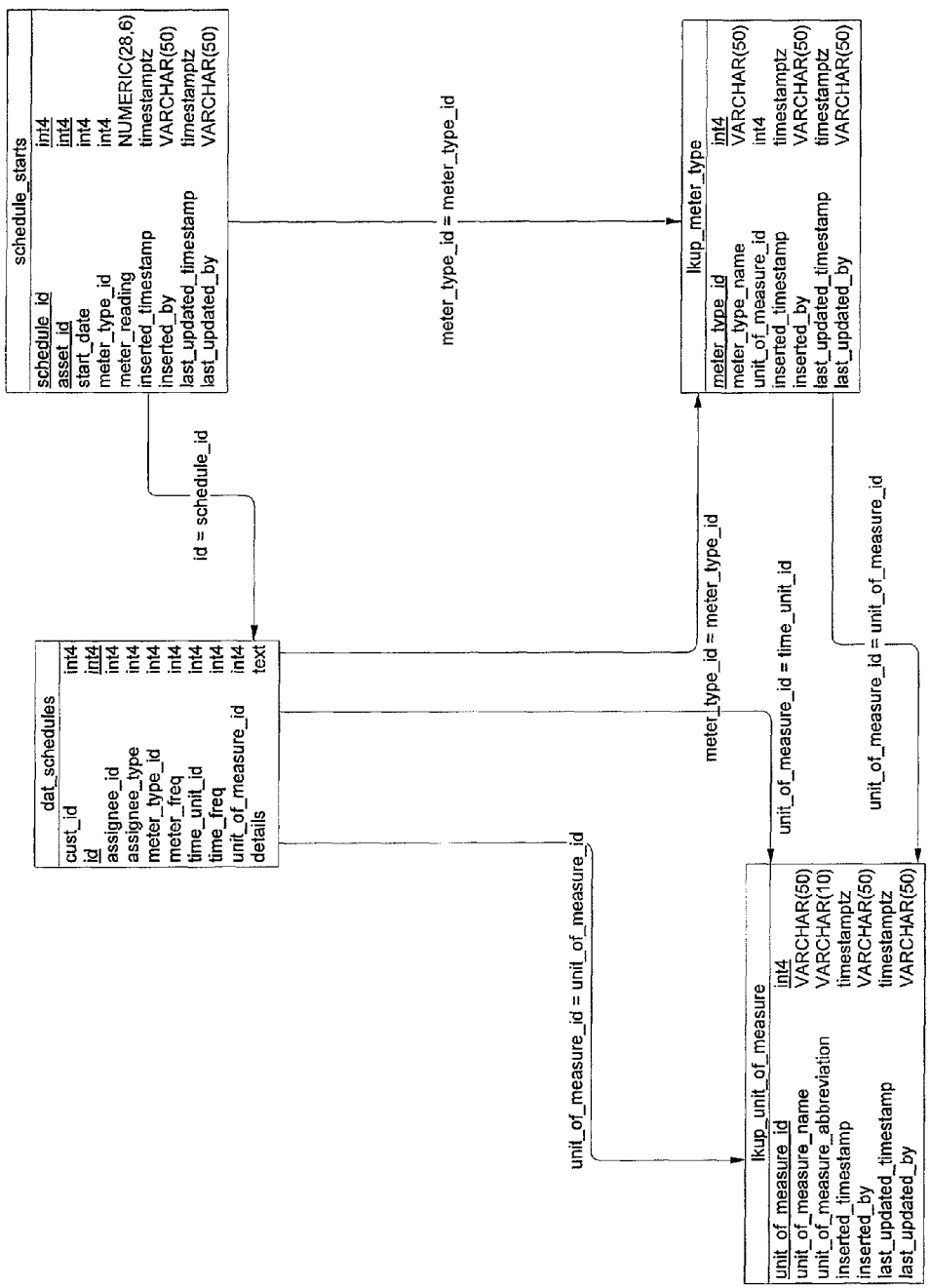
Figure 32A1

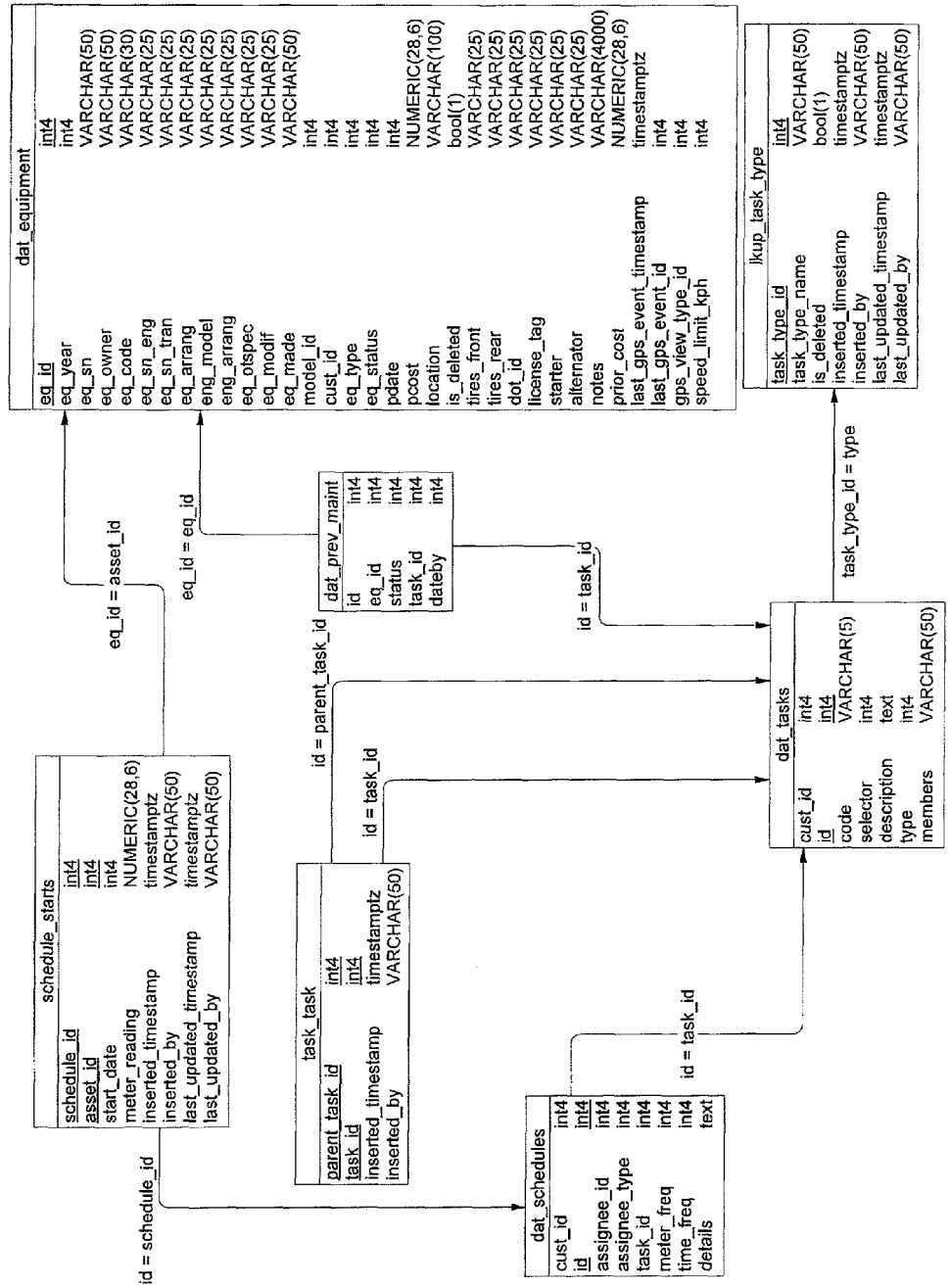
Figure 32A2

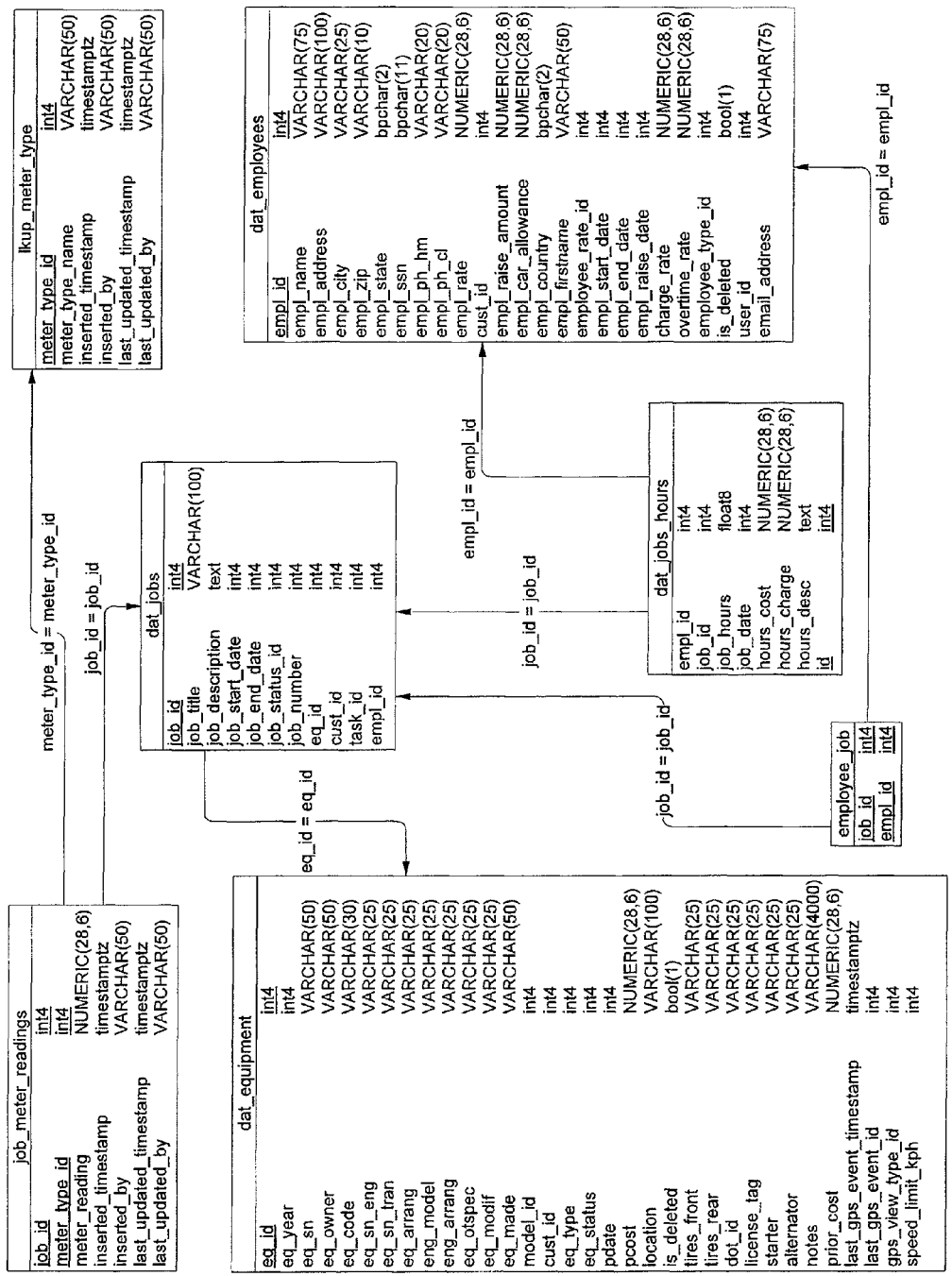
Figure 32B1

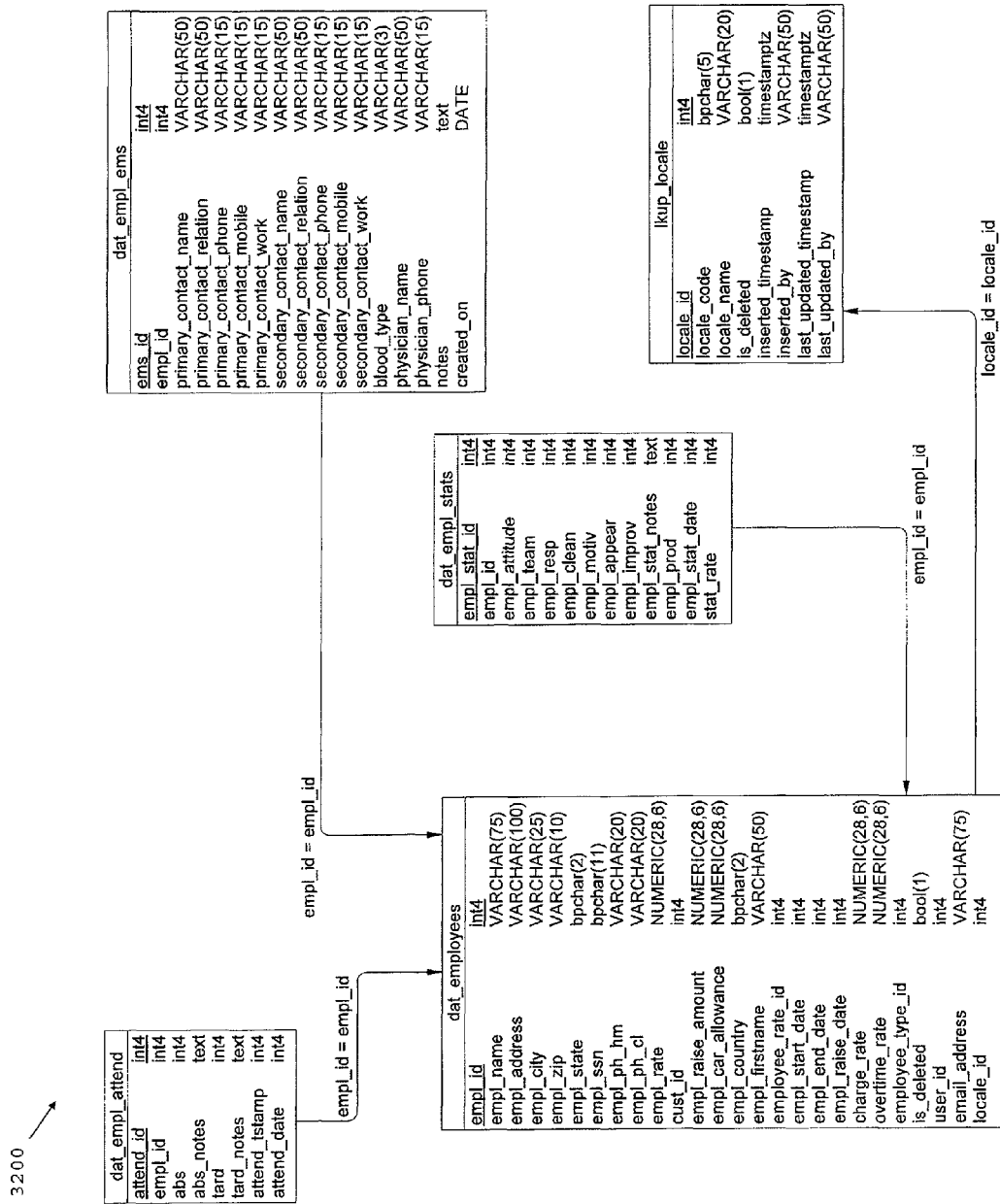
Figure 32B2

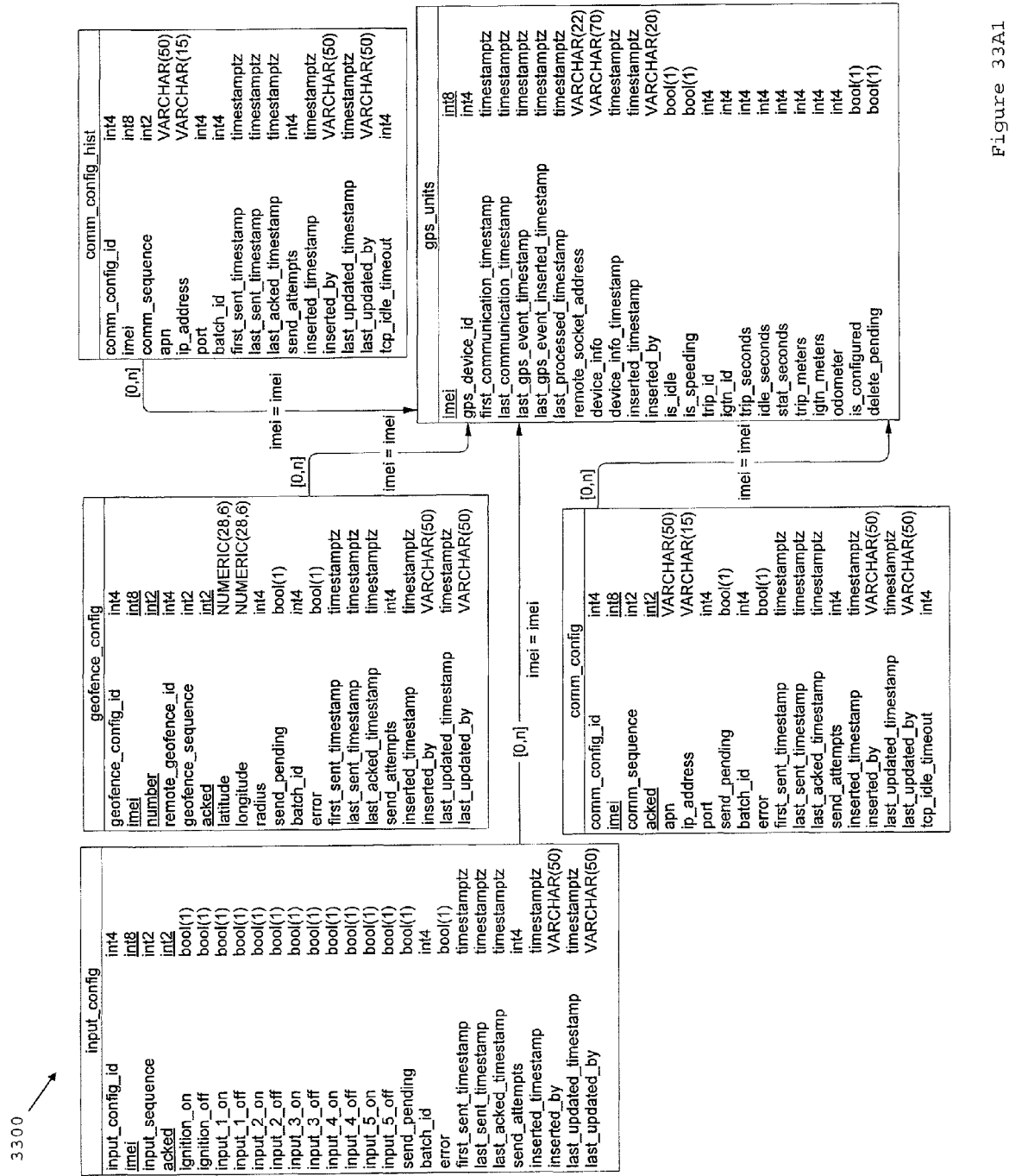
Figure 33A1

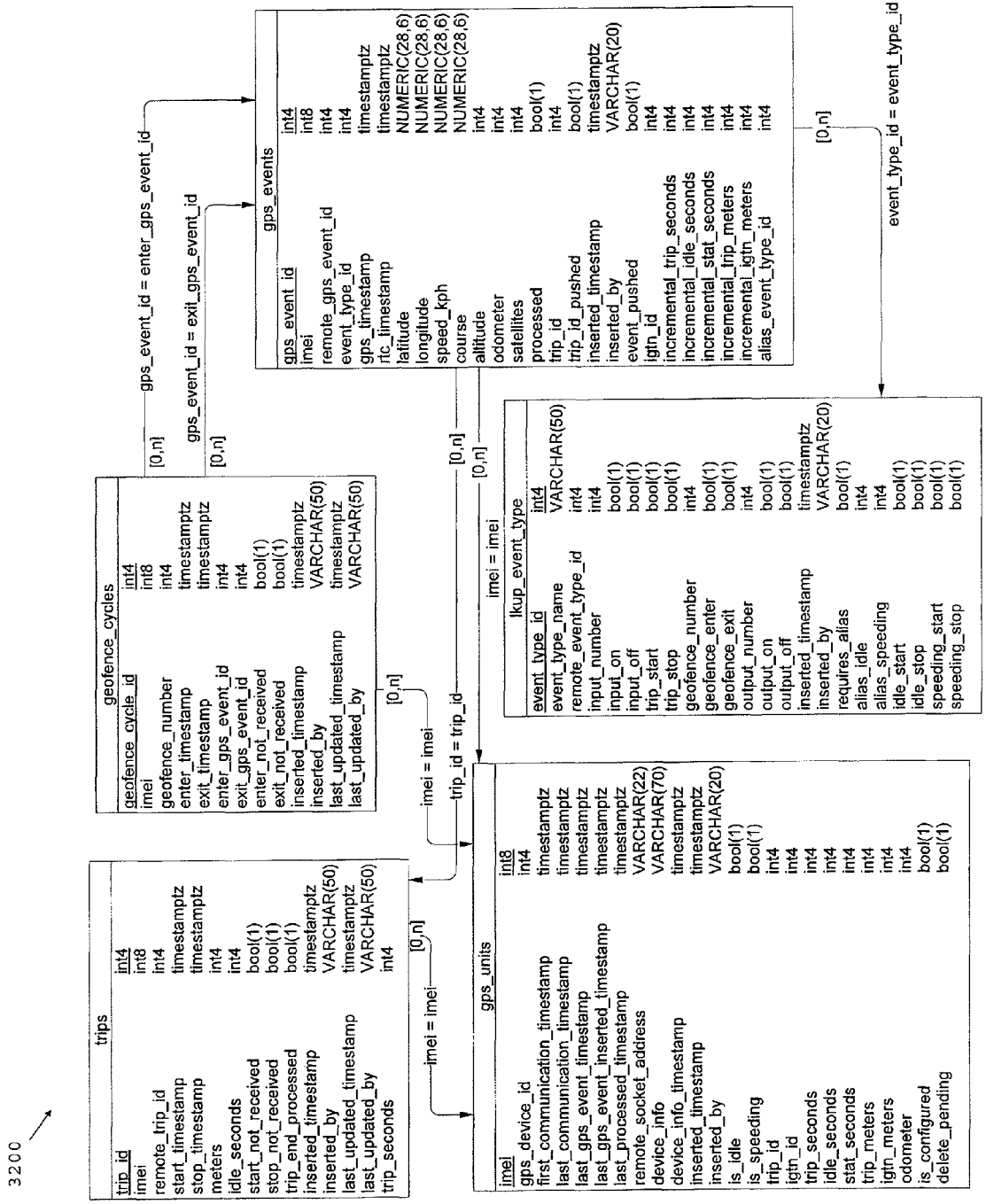
Figure 33A2

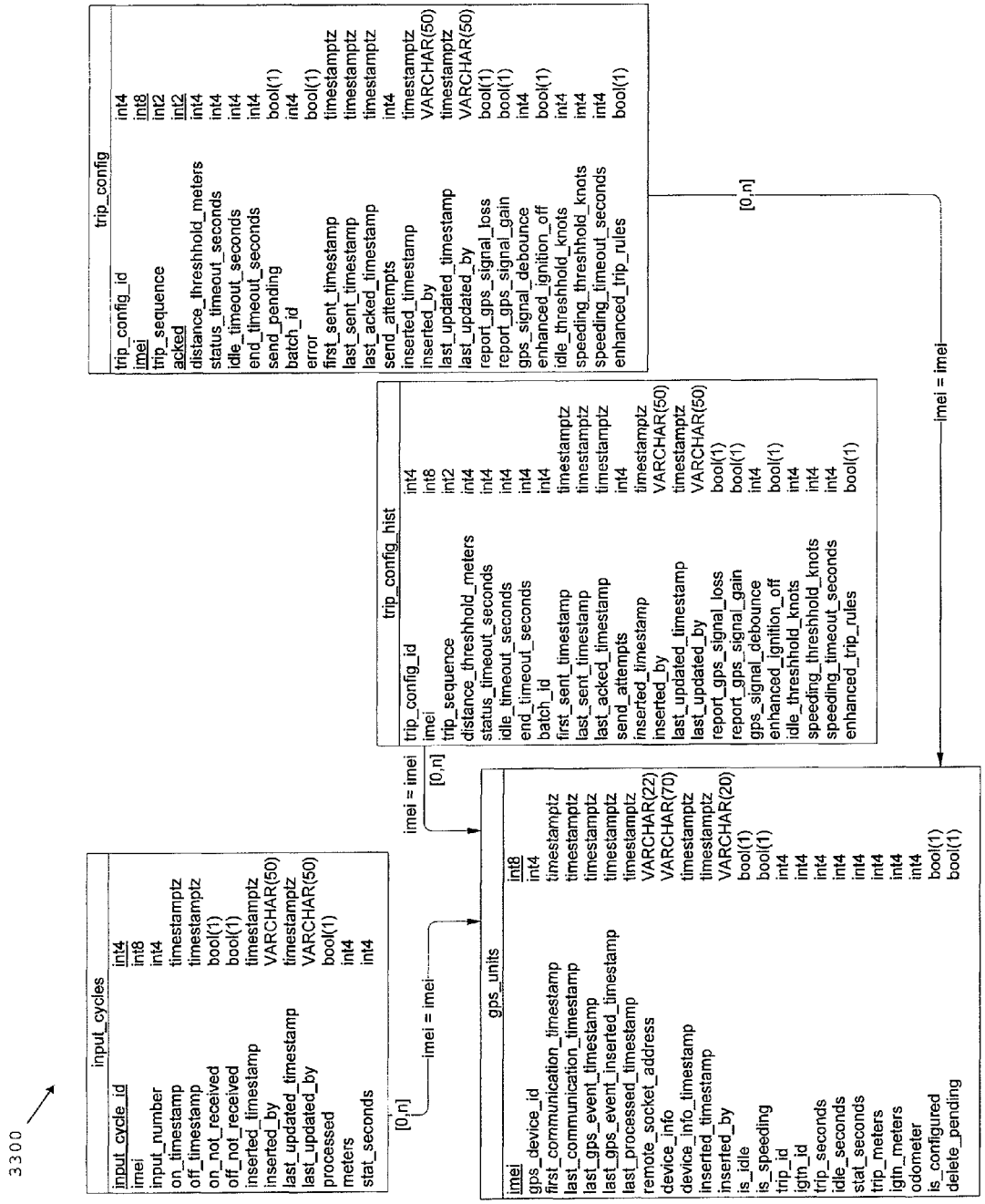
Figure 33B1

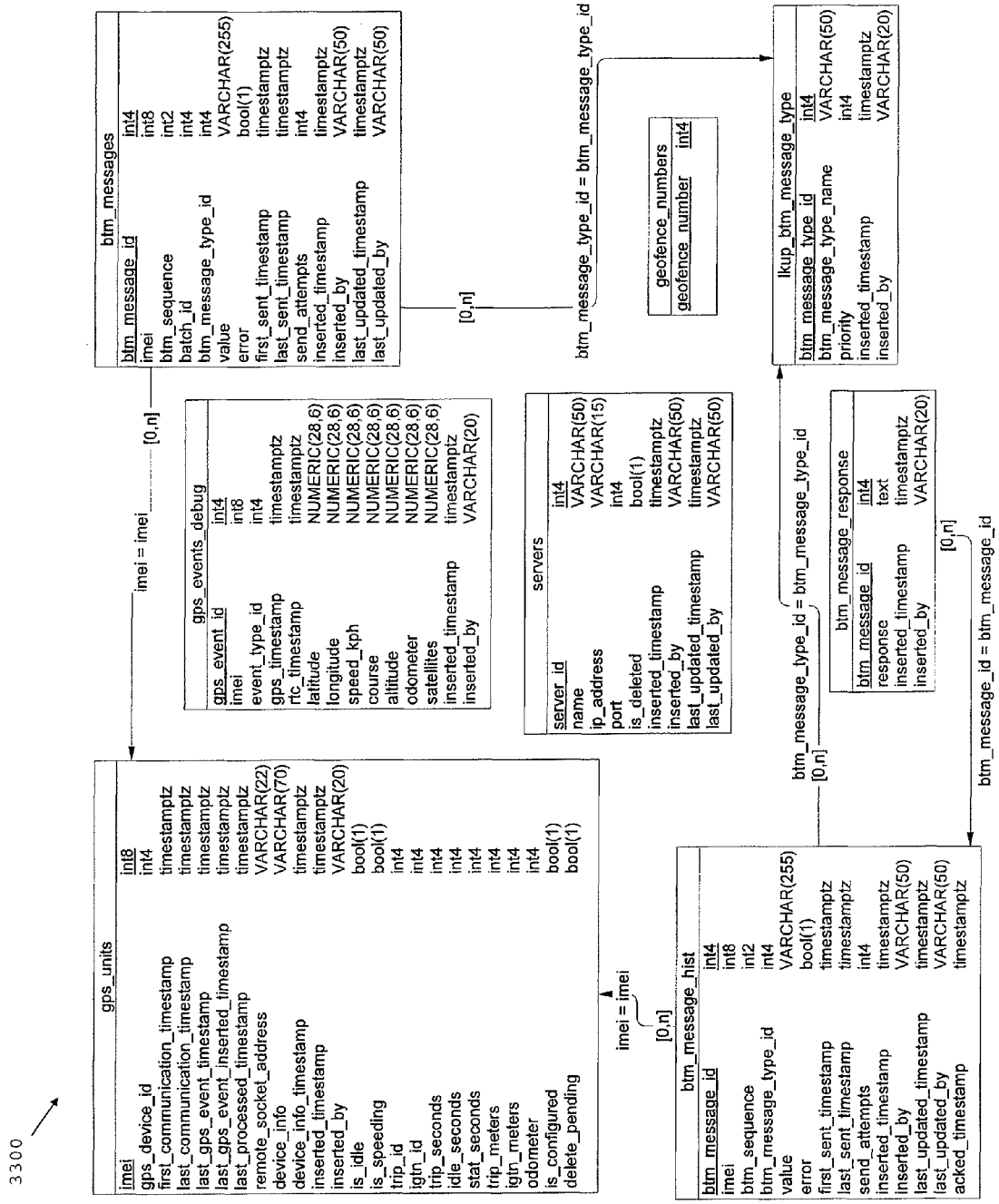
Figure 33B2

Figure 33B3

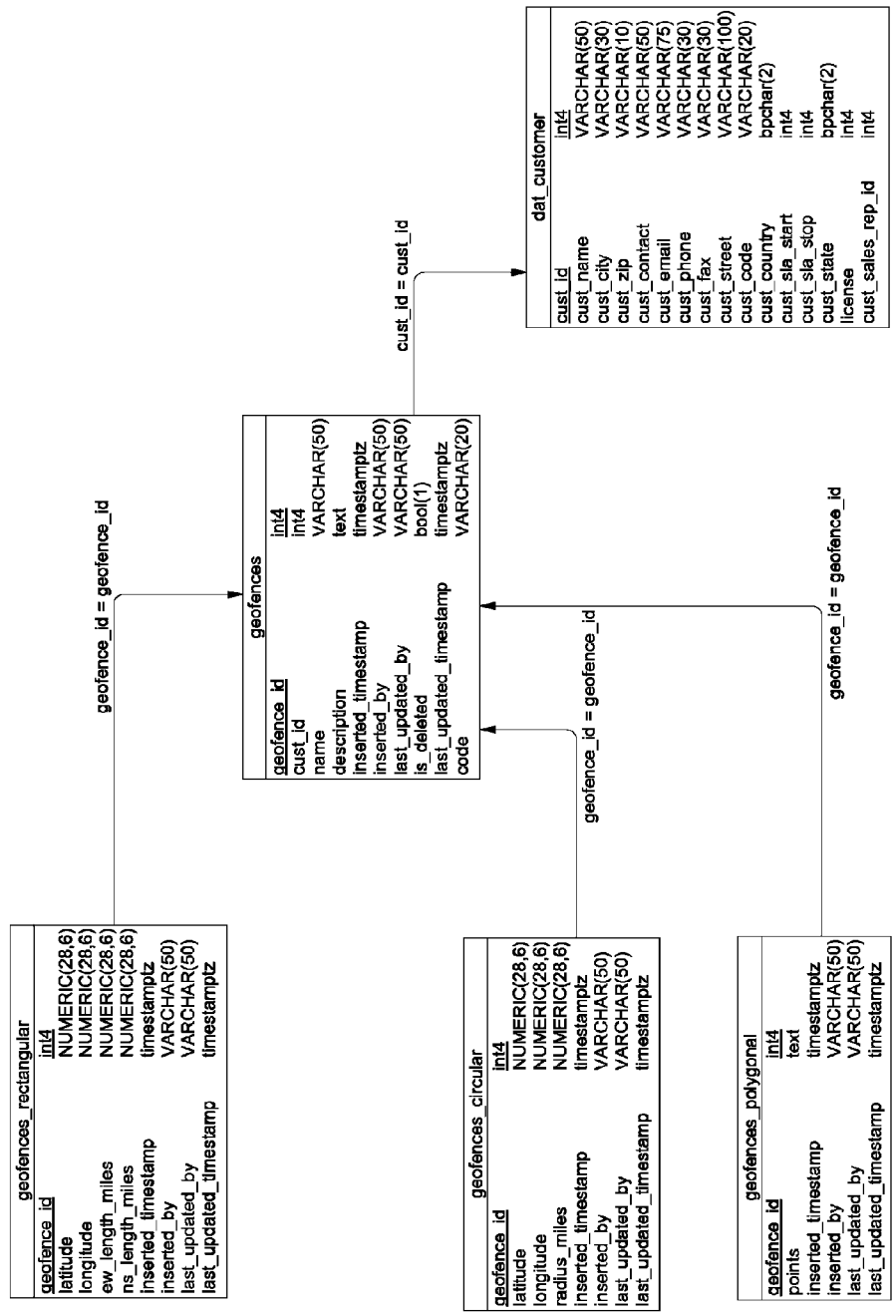
Figure 34A1

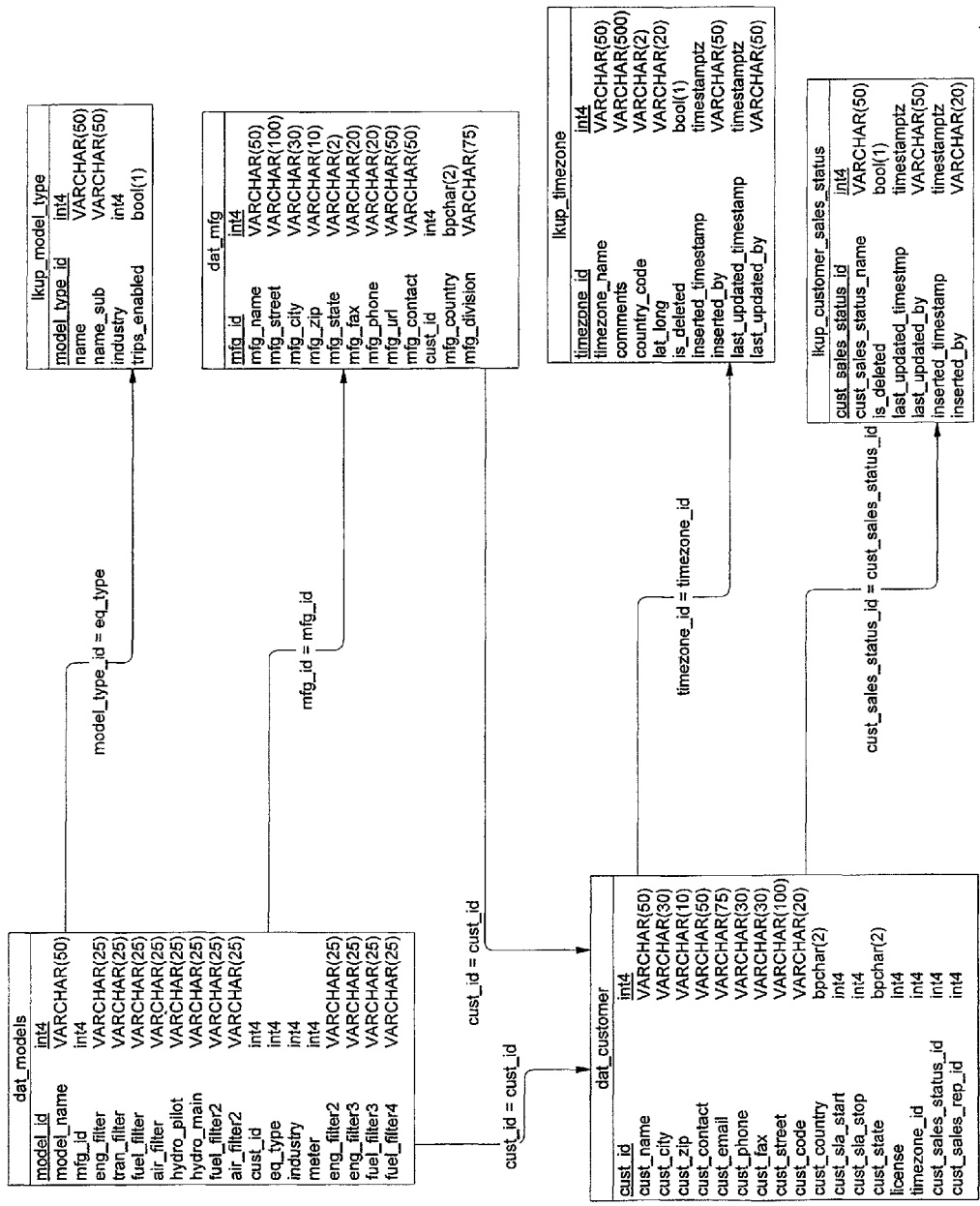
Figure 34A2

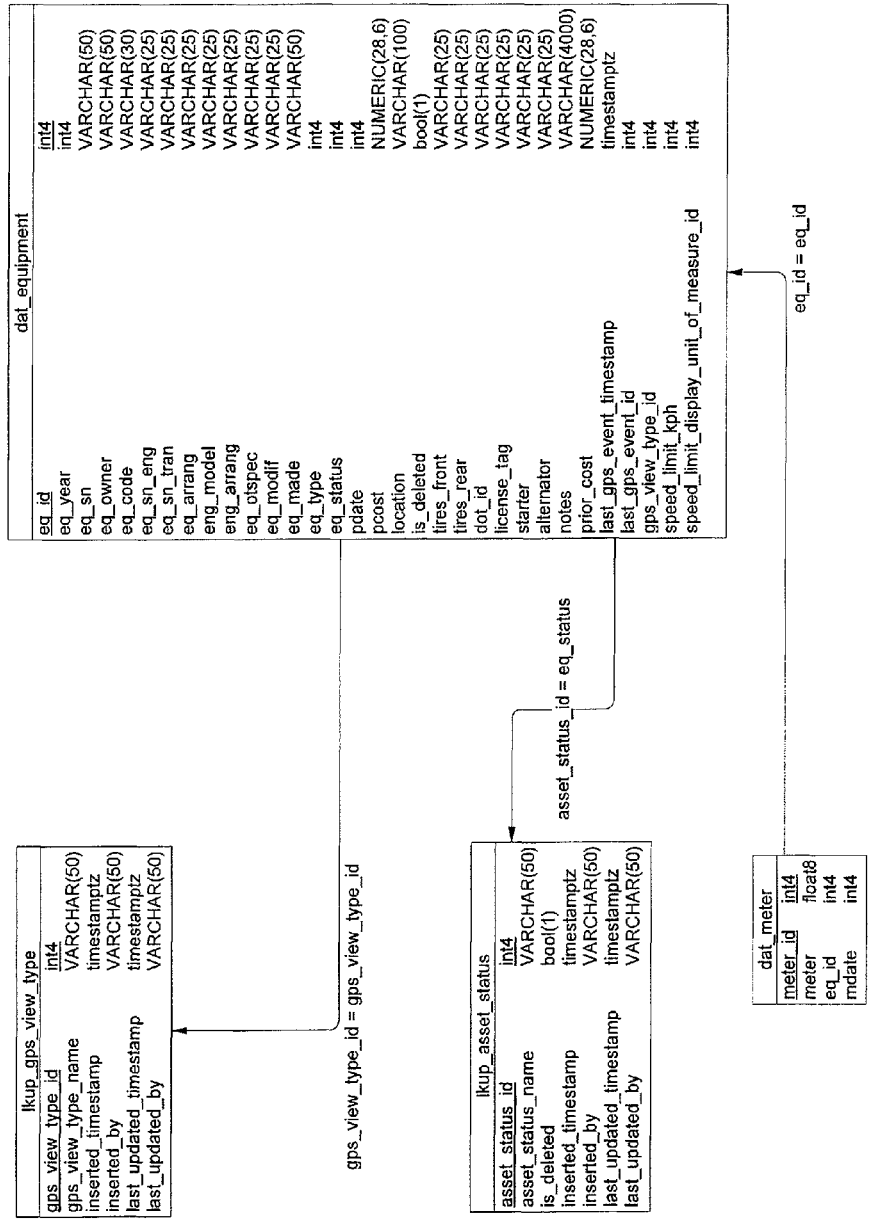
Figure 34B1

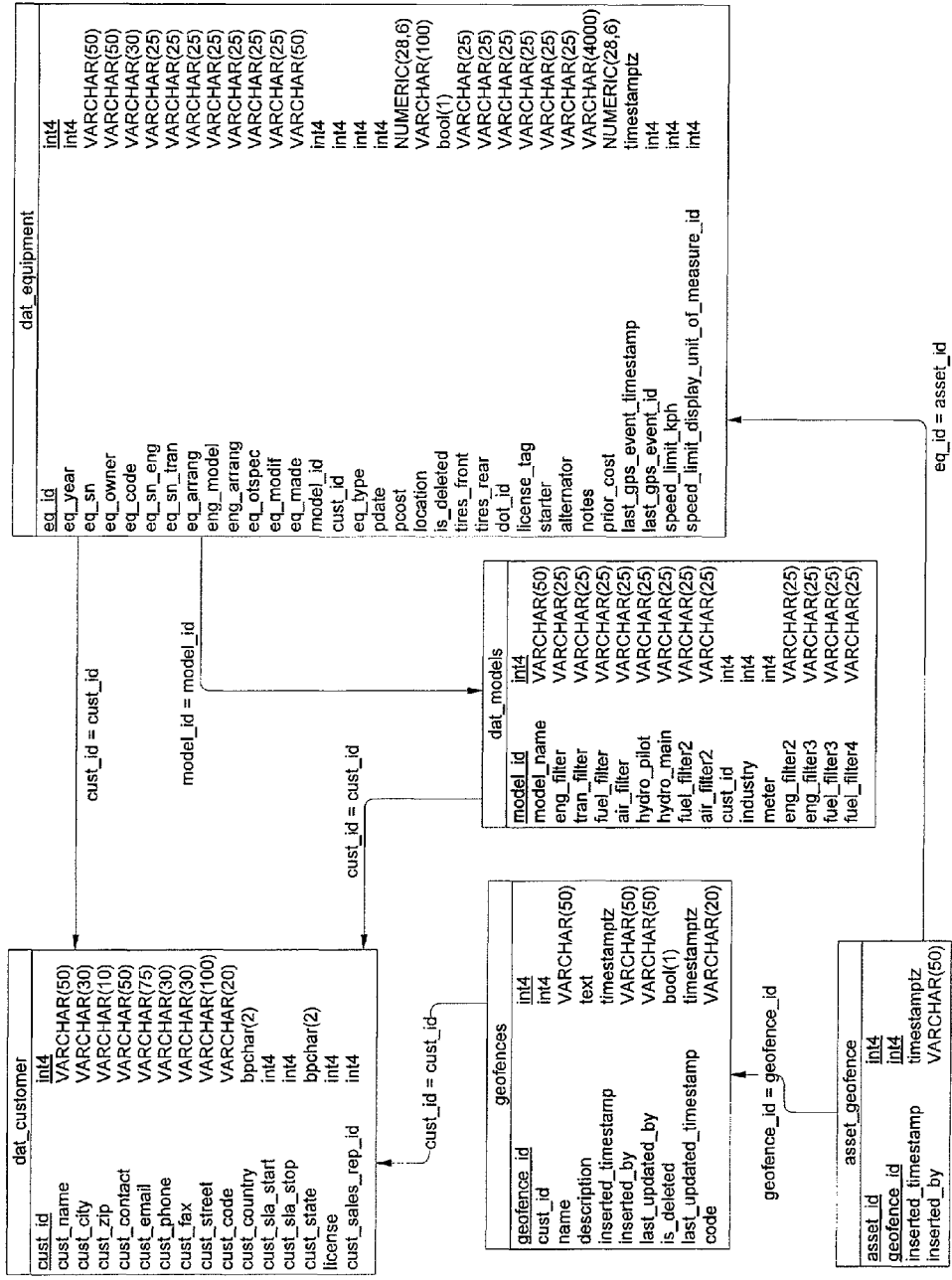
Figure 34B2

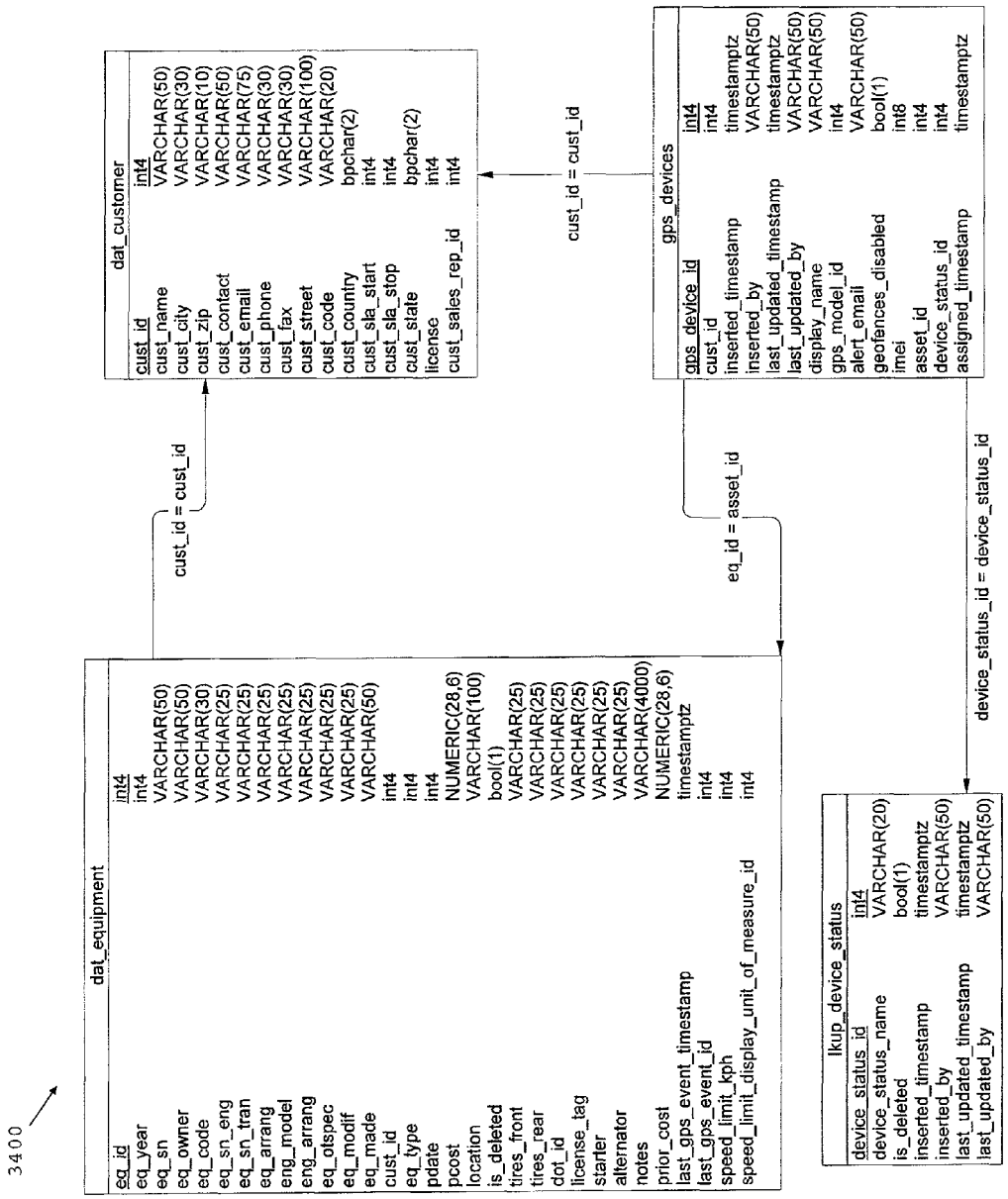
Figure 34B3

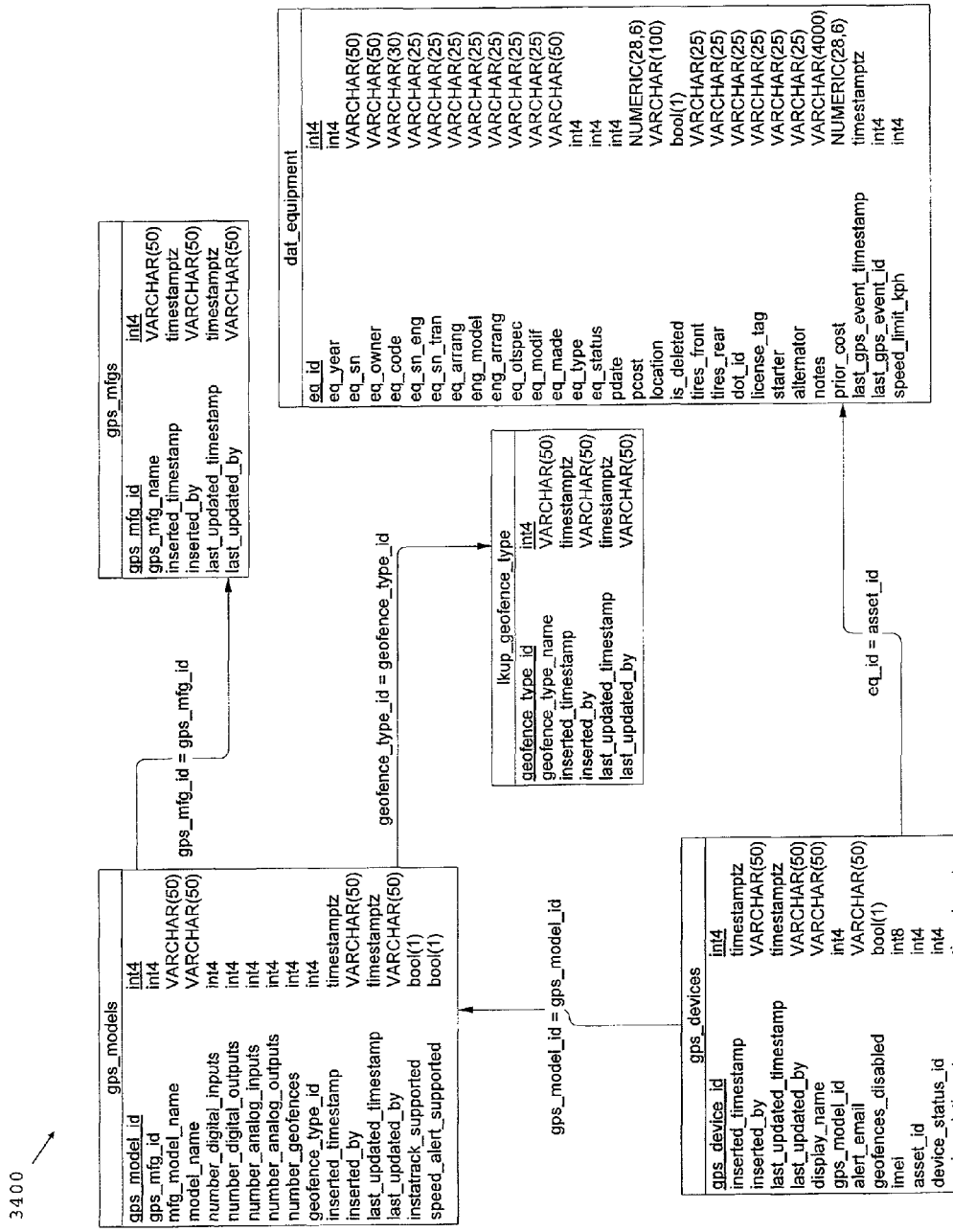
Figure 34C1

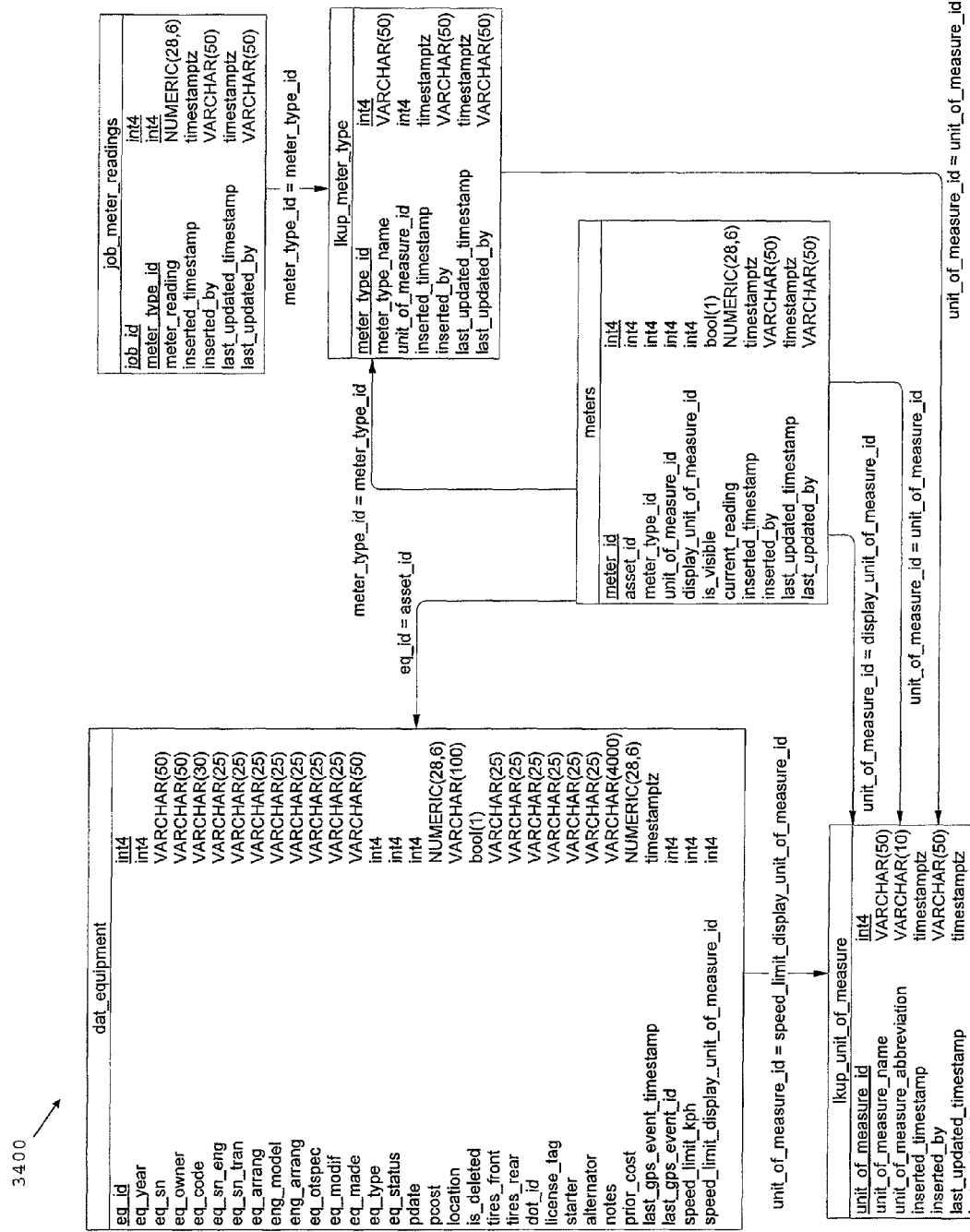
Figure 34C2

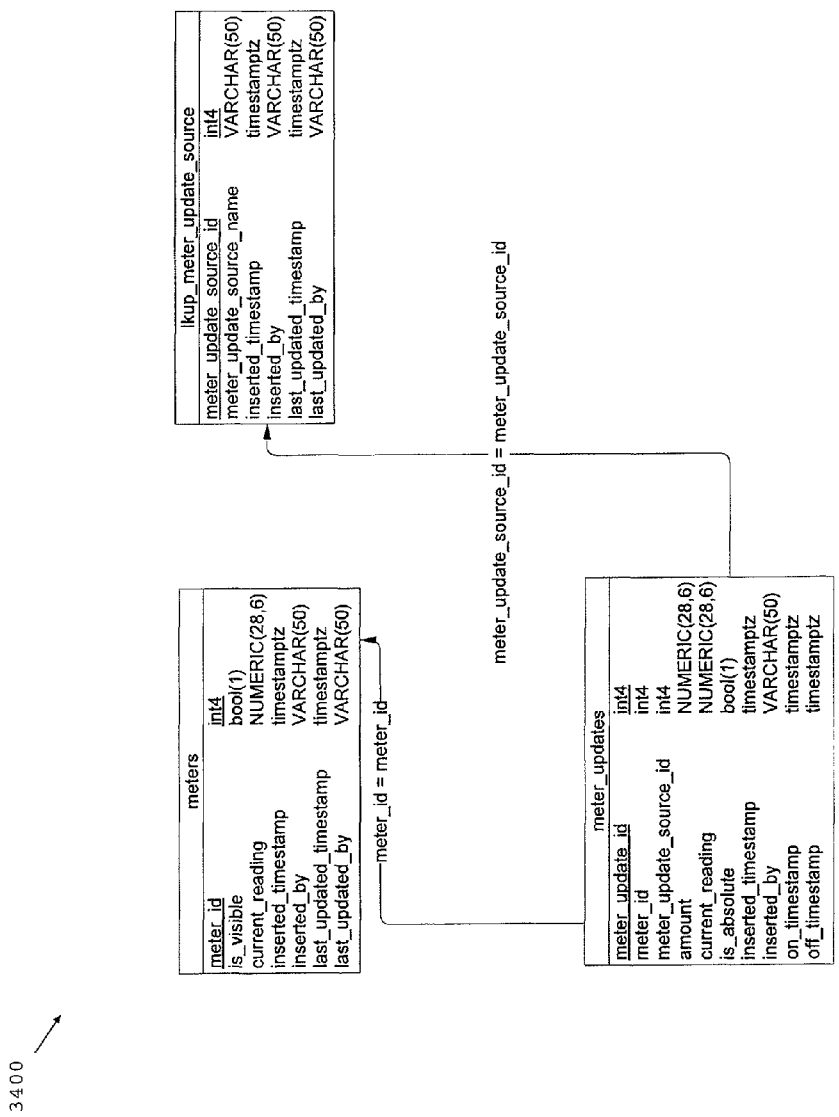
Figure 34C3

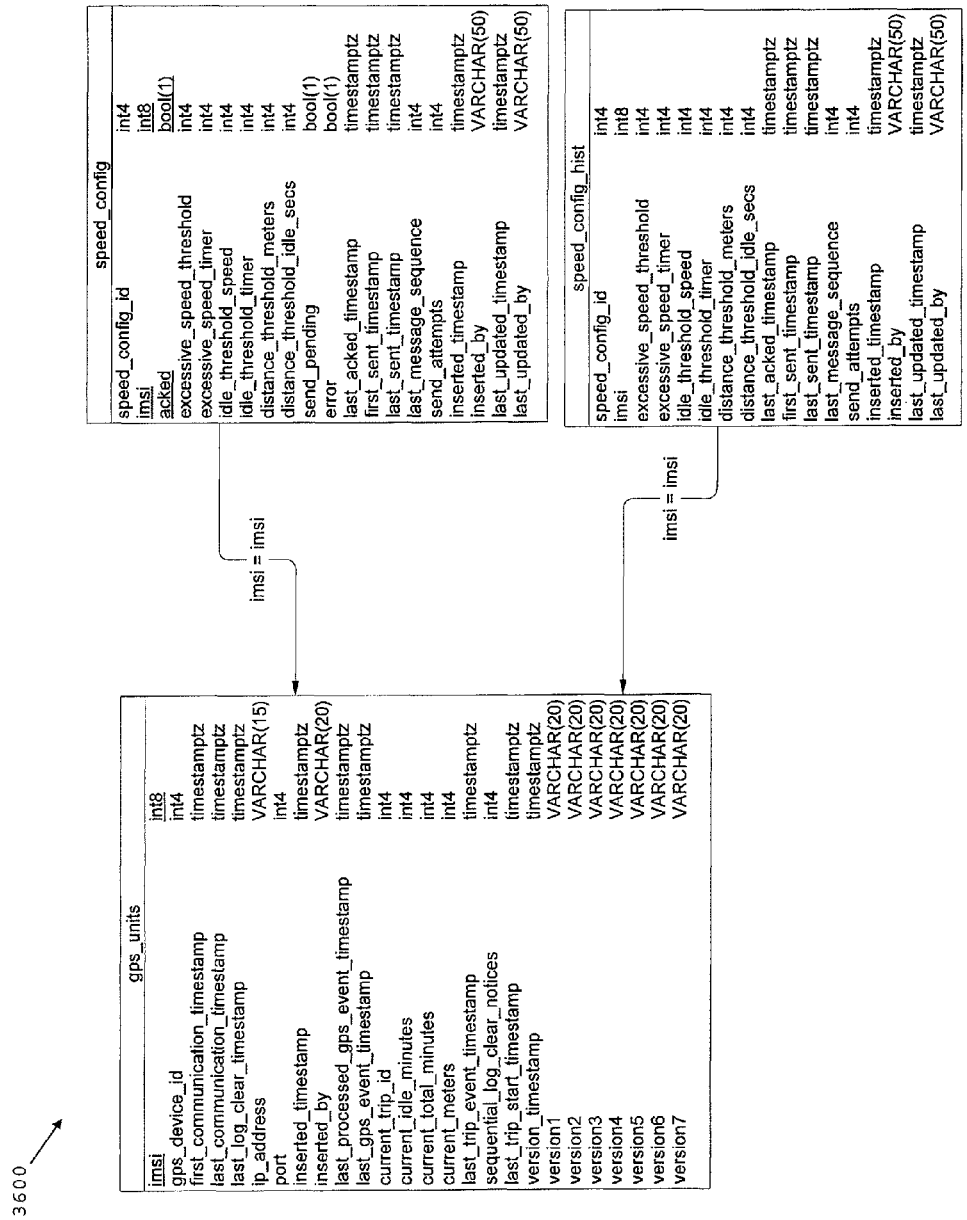

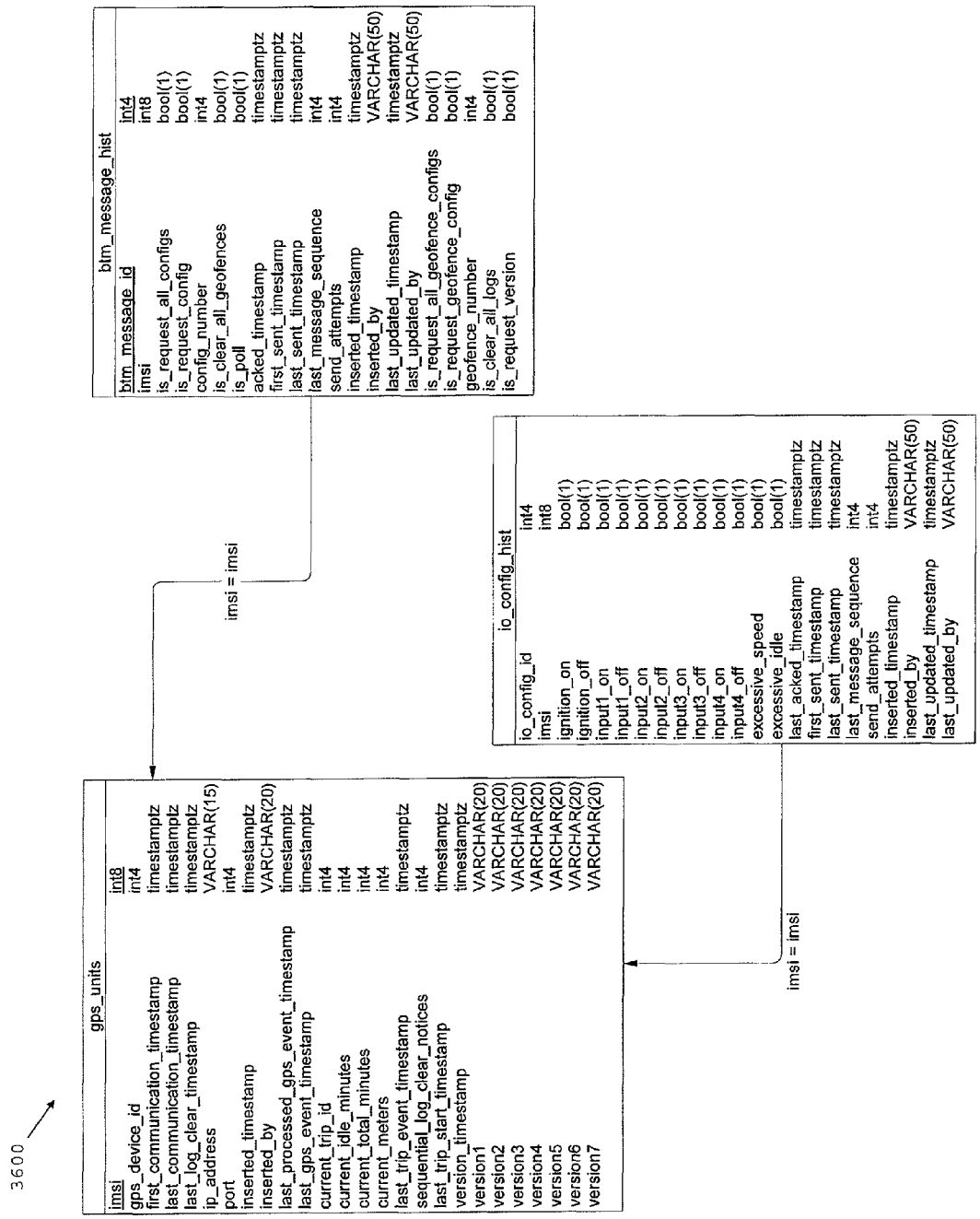
Figure 36A3

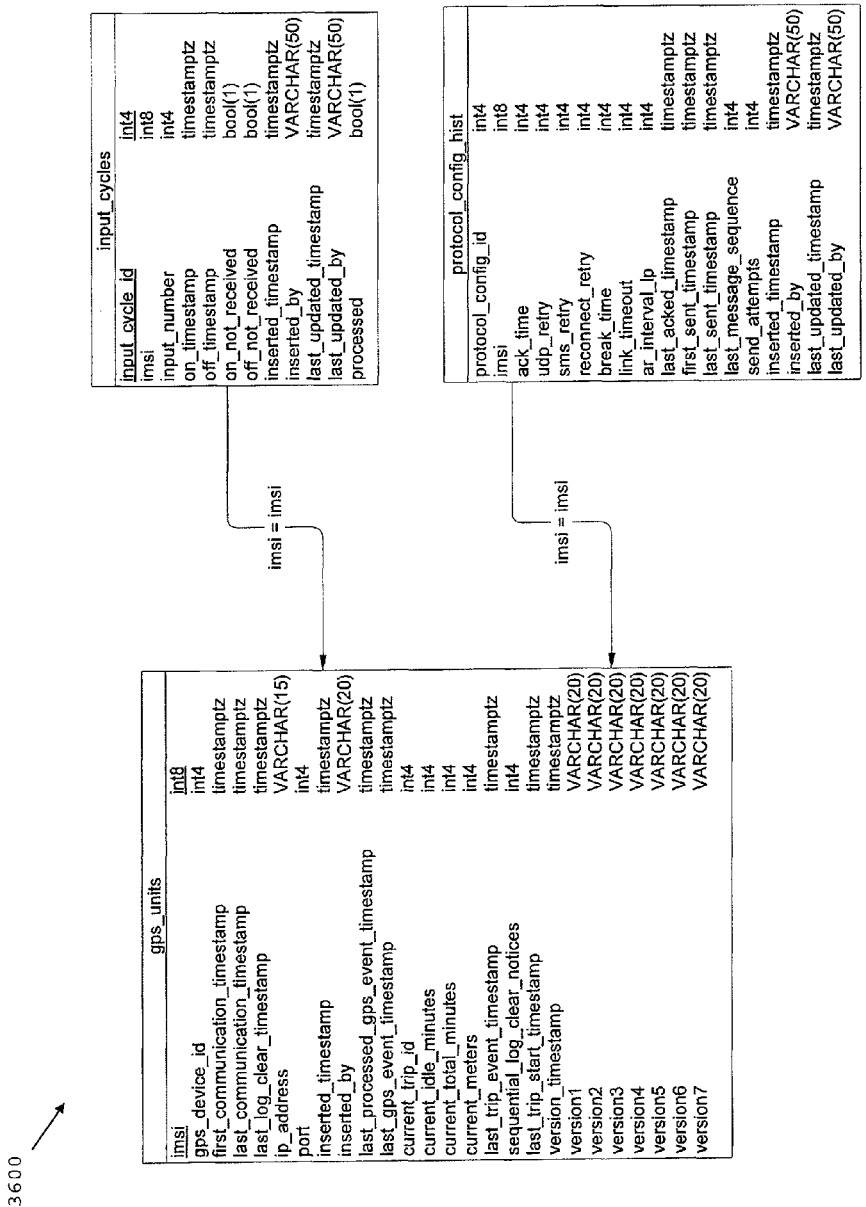
Figure 36A4

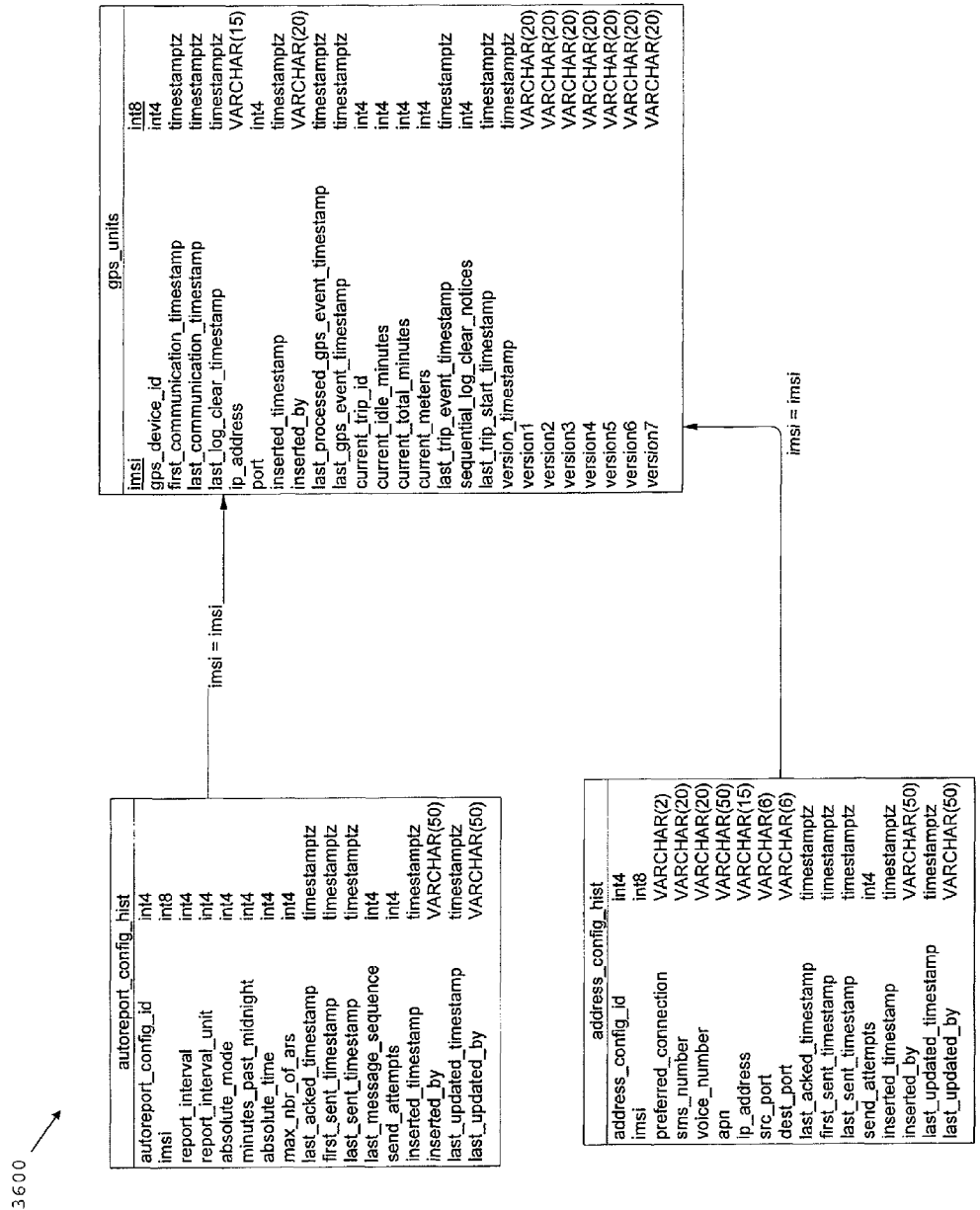
Figure 36B1

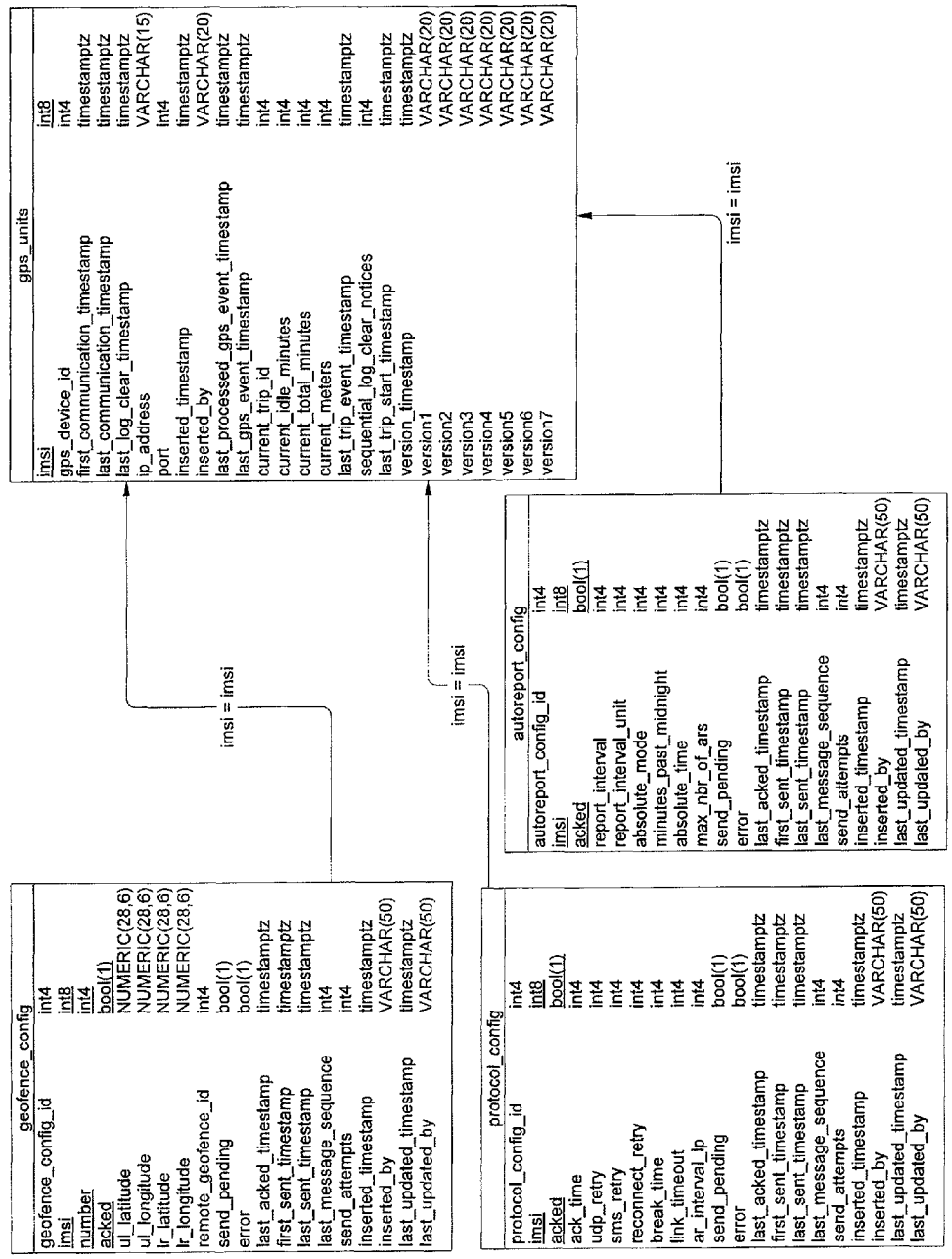
Figure 36B2

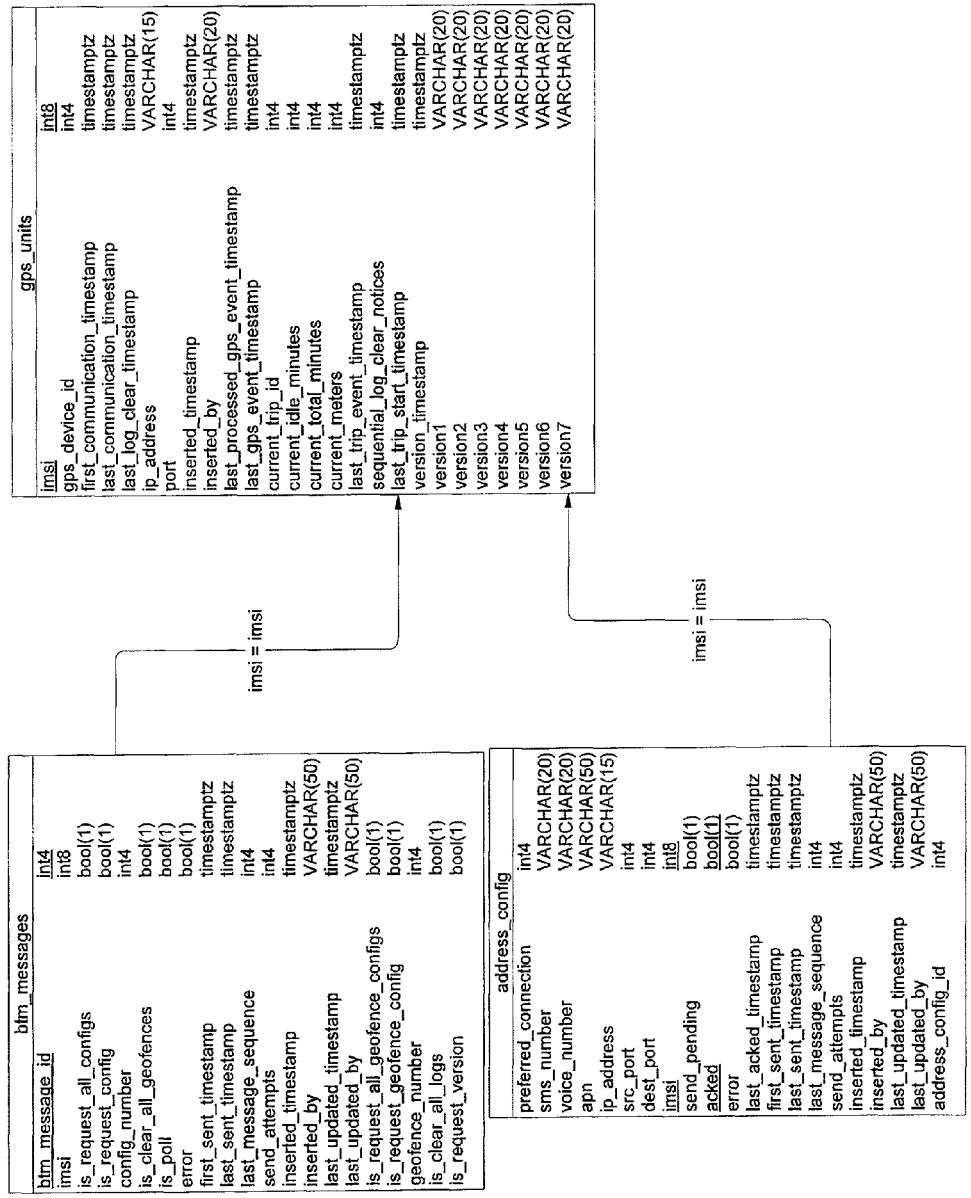
Figure 36B3

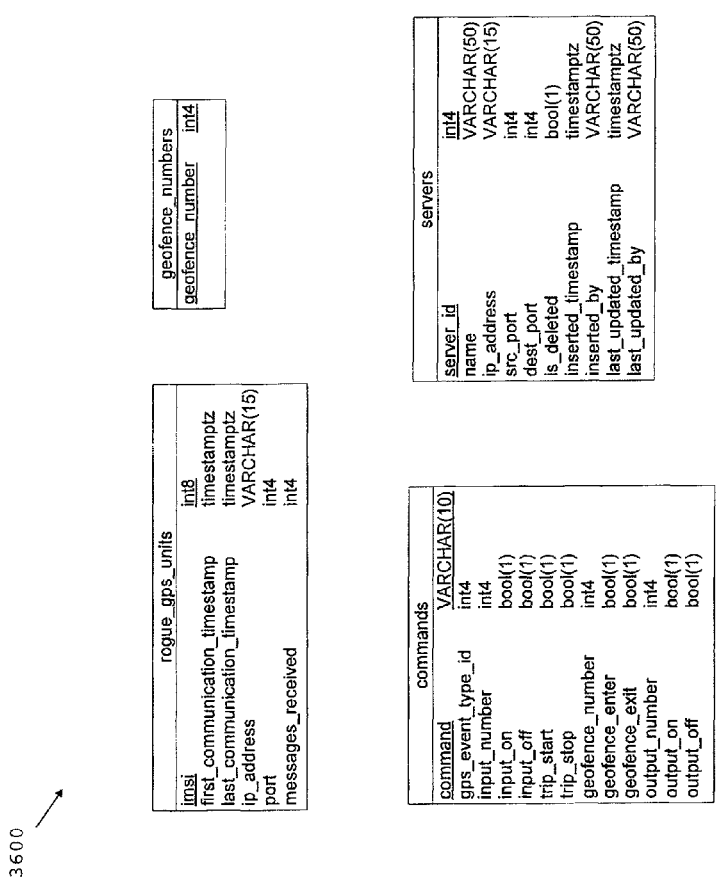
Figure 36C1

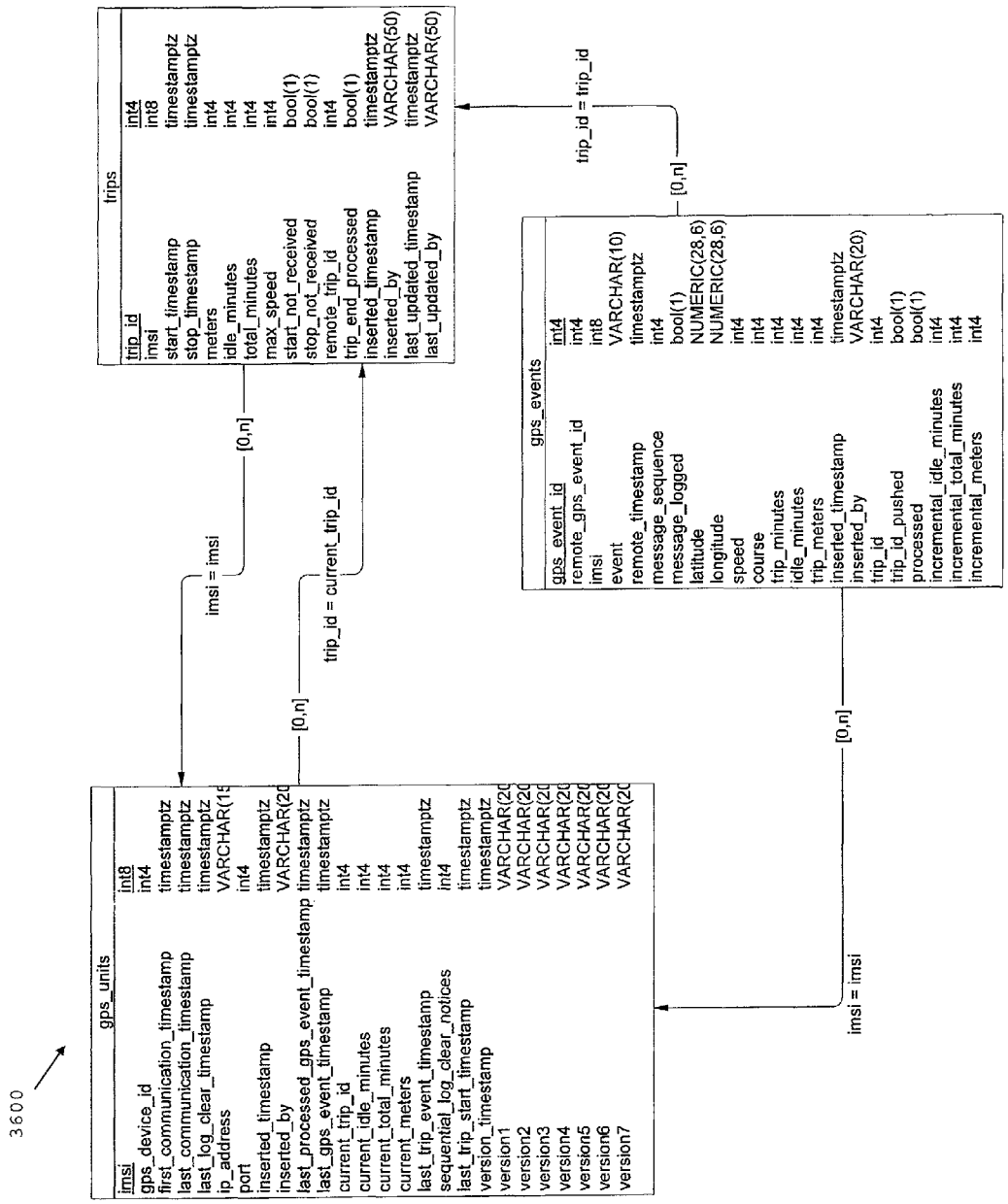
Figure 36C2

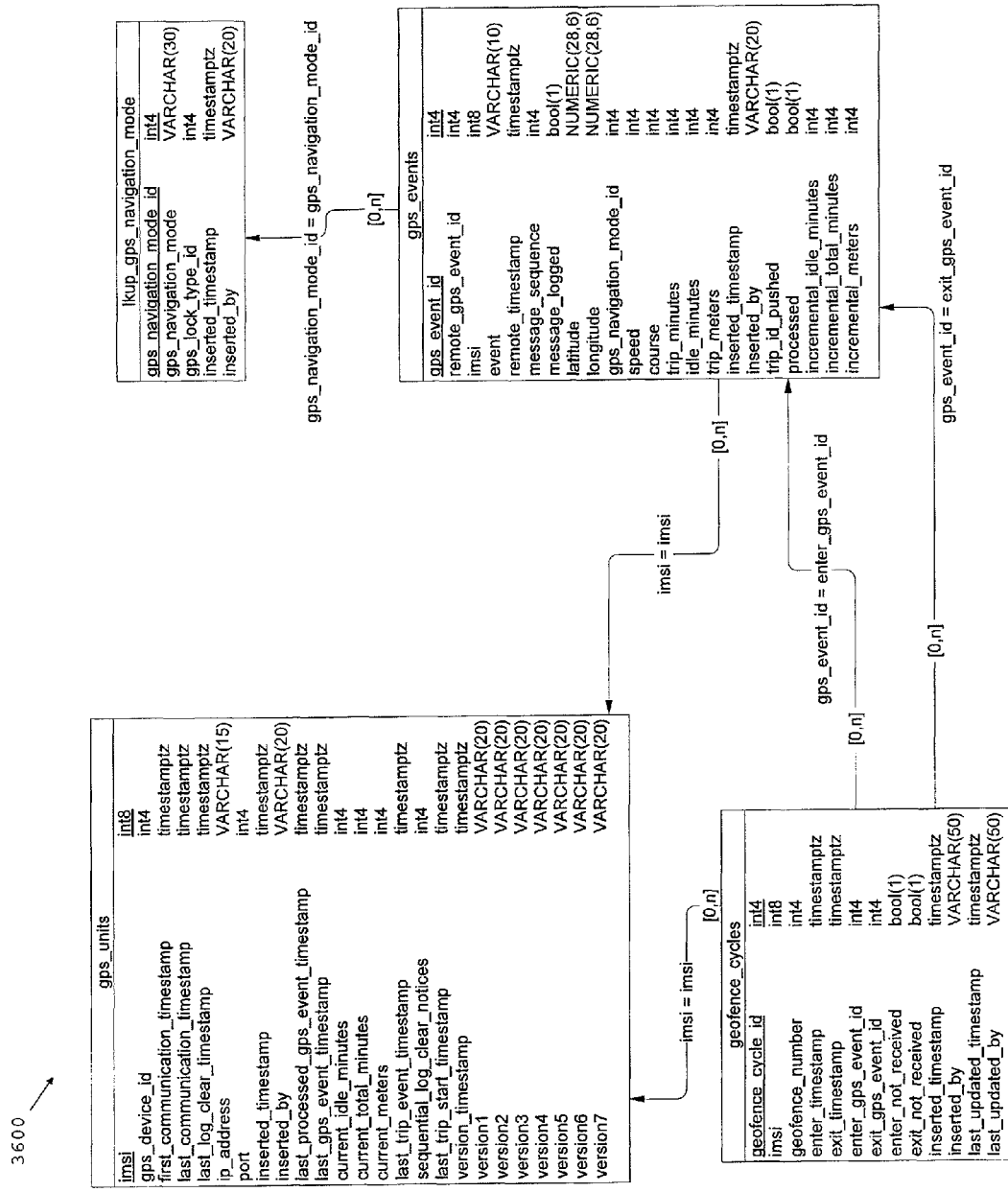
Figure 36C3

METHOD AND SYSTEM FOR MONITORING A MOBILE EQUIPMENT FLEET

CROSS-REFERENCES TO RELATED APPLICATIONS

This application is a continuation of U.S. application Ser. No. 12/390,960, filed Feb. 23, 2009, now U.S. Pat. No. 8,065, 342 which claims the benefit, under 35 U.S.C. §119(e), of U.S. Provisional Patent Application No. 61/030,636, entitled "METHOD AND SYSTEM FOR MONITORING A MOBILE EQUIPMENT FLEET," filed Feb. 22, 2008, and naming Christophe S. Borg and Christopher K. Copeland as inventors. The above-referenced applications are hereby incorporated by reference herein in their entirety.

BACKGROUND OF THE INVENTION

In the construction industry, among many other industries, enterprises maintain large fleets of mobile equipment, which they deploy, employ, and redeploy throughout a series of geographically distributed worksites. The nature of a large fleet of mobile equipment creates a long series of problems, both obvious and subtle, that create adverse impact on the profitability of the fleet-owning enterprise.

From the perspective of maintaining a distributed fleet, obvious difficulties exist in terms of maintenance. The geographic distribution of equipment adds difficulty to a central motor pool's tracking of the simplest tasks, such as when an oil change is needed or when spark plugs need to be replaced. The prior art offers no good solution to these problems, other than sending a human being to collect and analyze data at great cost in terms of labor.

Additionally, the prior art offers no real way for a central office to determine the utilization of a distributed fleet. Owners of construction equipment that is distributed over a geographic area may know that three job sites need backhoes to complete excavations, but they have no sense of the number of hours per working day that an individual backhoe is utilized. Stated simply, when equipment is idle and the central routing facility does not know that the equipment is idle, capacity is wasted and potential profit is lost.

Further, various forms of theft are made easier by distributed fleets, and the prior art makes no allowance for preventing these thefts. The most obvious thefts, such as loading a backhoe onto a trailer and stealing the backhoe during the night, are difficult to catch without a distributed security force monitoring assets. A distributed security force represents, of course, a tremendously costly investment of labor. Smaller forms of theft, such as the same backhoe being "borrowed" by an employee to dig out a swimming pool on the weekend, cost the owner of the equipment a tremendous amount of money and are nearly impossible to effectively police with prior art methods.

Under the prior art, there is simply no cost-effective way to monitor, without tremendous investment of labor, the deployment and disposition of distributed equipment fleets.

BRIEF DESCRIPTION OF THE DRAWINGS

The present invention may be better understood in its numerous objects, features, and advantages made apparent to those skilled in the art by referencing the accompanying drawings.

FIG. 31A-C illustrate an entity relationship diagram for an alerts and notifications portion of a database in accordance with one embodiment of the present invention;

FIG. 32A-D depict an entity relationship diagram for a maintenance portion of a database in accordance with one embodiment of the present invention;

FIG. 33A-B illustrate an entity relationship diagram for a device management and interaction portion of a database in accordance with one embodiment of the present invention;

FIG. 34A-C depict an entity relationship diagram for an assets portion of a database in accordance with one embodiment of the present invention;

FIG. 36A-C depict an entity relationship diagram for a device management and interaction portion of a database in accordance with one embodiment of the present invention.

DETAILED DESCRIPTION

Embodiments of the present invention provide a solution to the many problems associated with a geographically distributed fleet of mobile equipment or equipment capable of being moved or relocated. Location-aware and sensor-enabled remote devices (or user entry, when such remote devices are not available) enable a data processing system to track the location, condition, and employment of assets in a geographically distributed fleet of mobile equipment. Using an array of communication interfaces, embodiments of the present invention enable a remote device to report its location and accumulated sensor data to a system of databases and servers. One embodiment of the present invention then enables those servers and databases to provide users with information that enables the users to efficiently deploy, maintain and protect assets in a geographically distributed fleet of mobile equipment.

Example applications of embodiments of the present invention include the determination of asset location, whether the asset is being used at a specific moment or during a given portion of the day of the day, and whether the asset requires scheduled maintenance or is experiencing a malfunction (typically reflected in a diagnostic trouble code (DTC)). One embodiment of the present invention further offers integrated parts ordering and labor scheduling for the maintenance of assets in a geographically distributed fleet of mobile equipment. Further, one embodiment of the present invention enables users of assets in a geographically distributed fleet of mobile equipment to deter theft by alerting those users to unauthorized movement of assets in a geographically distributed fleet of mobile equipment.

Figure 1:
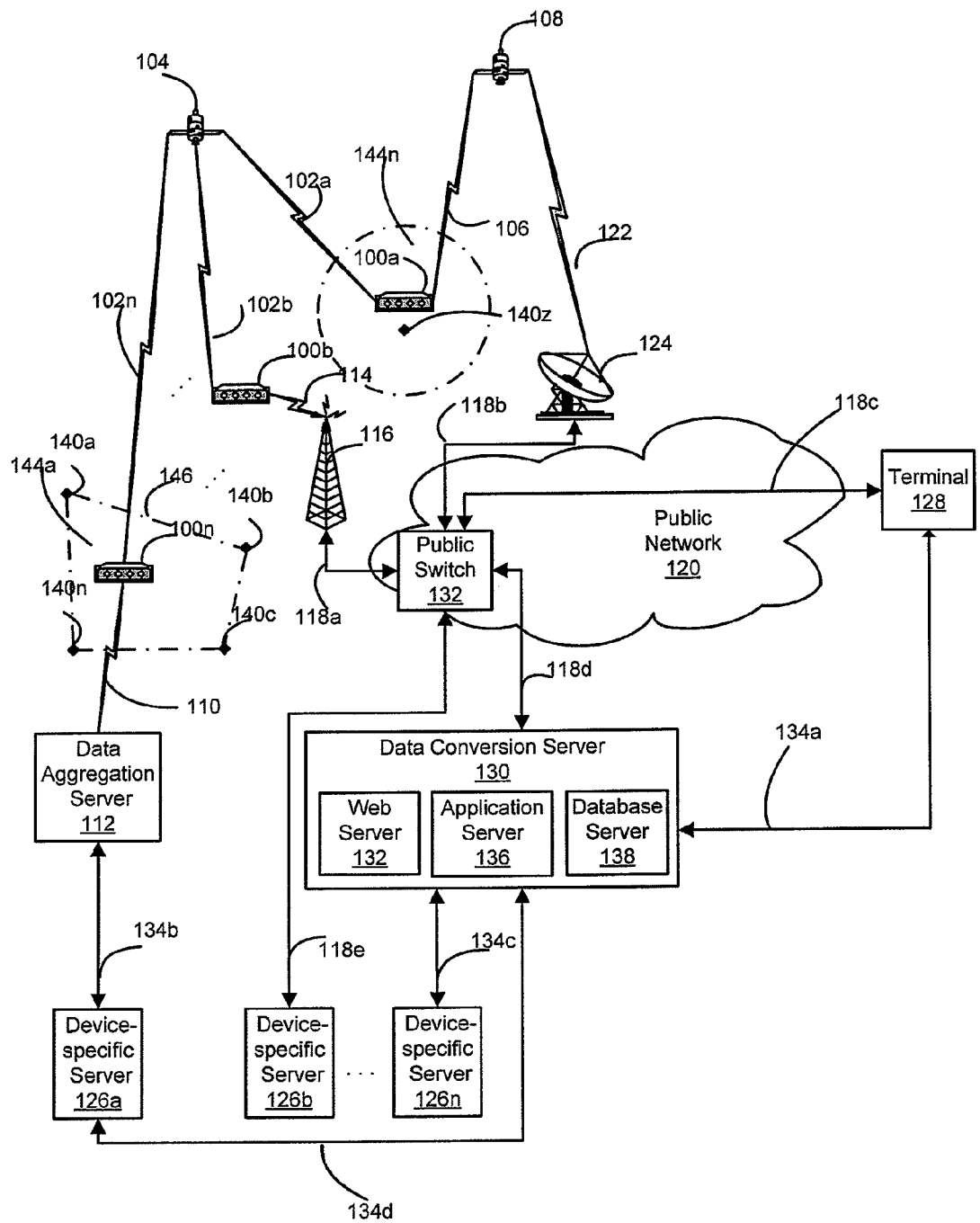
FIG. 1 illustrates an exemplary system for performing monitoring and management of a mobile equipment fleet, in accordance with one embodiment of the present invention.

With reference now to the figures, and in particular with reference to FIG. 1, an exemplary system for performing monitoring and management of a mobile equipment fleet, in accordance with one embodiment of the present invention, is illustrated. Remote devices 100a-100n, which can be mounted to and acquire data from a broad range of vehicles and equipment (called assets), receive location signals 102a-102n from a global positioning system (GPS) satellite 104.

As used with respect to an embodiment of the present invention, the notation 100a-100n indicates a flexibly variable quantity of devices, and the presence of differently numbered devices bearing the same reference letter (e.g., 102a and 100a), does not necessarily indicate a correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'nth' member of a different plurality, though they may correspond.

While one GPS satellite 104 is illustrated for the purpose of simplicity in FIG. 1, one skilled in the art will, in light of the present disclosure, realize that conventional location techniques employ a plurality of signals transmitted from a constellation of satellites similar to GPS satellite 104. While embodiments of the present invention are illustrated with respect to location signals 102a-102n from a satellite 104 of the global positioning system, one skilled in the art will, in light of the present disclosure, realize that embodiments of the present invention can be practiced with a broad range of location-determination systems, including, for example, both radio-frequency and gyroscopic systems.

In one embodiment, remote devices 100a-100n are capable of transmitting and receiving data and messages in several ways. Remote device 100a transmits and receives data and messages over a satellite uplink 106 to a communications relay satellite 108, which then delivers downlink signals 122 to a satellite signal receiver 124. Remote device 100b transmits and receives data and messages over a medium-range wireless signal 114, such as the global system for mobile communications (GSM) network, to a base station 116. Remote device 100n transmits and receives data and messages over a short-range radio connection 110, such as a connection complying with one or more of the Institute for Electrical and Electronics Engineers (IEEE) 802.11a/b/g standards ("Wi-Fi"), to a data aggregation server 112, which can integrally contain or be connected to a radio-frequency transceiver (not shown) for handling short-range radio connection 110.

While, for the sake of simplicity in illustration, an embodiment of the present invention is illustrated in FIG. 1 with respect to each of remote devices 100a-100n communicating over only a single mode of communication, one skilled in the art will, in light of the present disclosure, realize that each of remote devices 100a-100n can be capable, in varying embodiments of the present invention, of communicating using several modes of communication without departing from embodiments of the present invention. Further, one skilled in the art will, in light of the present disclosure, realize that each of remote devices 100a-100n can be capable, in varying embodiments of the present invention, of communicating using modes of communication not illustrated in FIG. 1, without departing from embodiments of the present invention.

Public network links 118a-118e, which are part of a public network 120 mediated by a public switch 132, connect base station 116 and satellite signal receiver 124, as well as a device-specific server 126b and a terminal 128, to a data conversion server 130. In one embodiment, data conversion server 130, device specific-servers 126a-126n, and data aggregation server are composed of instructions stored on a computer-readable medium and executed by a processor.

Terminal 128 also connects through a private network link 134a to data conversion server 130. Similar private network links 134b-134d connect data aggregation server 112 to device-specific server 126a, connect device-specific server 126a to data conversion server 130 and connect device-specific server 126n to data conversion server 130. Data conversion server 130 executes several programs, including a web server 132 in a hypertext transmission protocol (HTTP) or secure hypertext transmission protocol (HTTPS) layer, an application server 136 in an application layer and a database server 138 in a database layer.

The example embodiment shown in FIG. 1 illustrates specific uses of finite quantities of private network links 134b-134d and public network links 118a-118d. One skilled in the art will quickly realize, in light of the present disclosure, that alternative embodiments and implementations of the present invention will utilize different configurations and quantities of private network links 134b-134d and public network links 118a-118d as well as varying virtual private network connections to connect various elements used in implementing embodiments of the present invention. In one embodiment, data for use by application server 136 can be acquired through user input at terminal 128, data feed from database server 138, or through a third party, which can provide complete databases, such as a database of weather and geography and effects on usage and wear of equipment, or can provide a discrete data service such as data aggregation through a data aggregation server 112.

One skilled in the art will also realize that while data aggregation server 112, data conversion server 130, and device-specific servers 126a-126n are illustrated in FIG. 1 as free-standing systems running on independent hardware, alternative embodiments and implementations of the present invention can combine data aggregation server 112, data conversion server 130, and device-specific servers 126a-126n or various elements of the functions and processes that they embody, into integrated systems.

In one embodiment, remote devices 100a-100n receive location signals 102a-102n from a global positioning system (GPS) satellite 104, and data conversion server 130 provides several location-aware functions, as will be described below. Trip processing by data conversion server 130 includes location-enabled monitoring of key events, such as ignition on, trip start, trip idle, trip stop, and ignition off. Data conversion server 130 calculates incremental hours of use computed from ignition on to ignition off, as well as idle time and active time computed from events. Data conversion server 130 also provides user-configurable support for other events that data conversion server 130 receives during ignition "on" and "off" periods, which are grouped into a "trip" for reporting and display to terminal 128.

Data conversion server 130 provides several location-aware functions based on the concept of a geofence 144a (or geofence 144n). Geofence 144a is a group of coordinates 140a-140n defining a region, though a geofence need not be defined in terms of a closed figure, but can be defined relative to a single line 146 without departing from embodiments of the present invention. Alternatively, geofence 144n represents a spherical volume defined by a distance from point 140z, for applications, for example, involving air-mobile or crane-supported equipment. Application server 130 provides geofence-based job billing. In geofence-based job billing, a user of terminal 128 creates a geofence 144n to encompass or otherwise demarcate a job site. Data conversion server 130 records when an asset equipped with a remote device 100n enters and exits the job site to determine the total time the asset was assigned to the job site. Data conversion server 130 records the number of engine hours and distance traveled within the geofence 144n to determine asset utilization within the job site.

Data conversion server 130 further provides server-based geofence 144n reporting that supports legacy systems for geographic reporting. For geofence 144n coordinate sets that are numerous or complex, processing can be done on data conversion server 130 using a geographic information system (GIS)-enabled database system. Data conversion server 130 supports reporting to terminal 128 by political and governmental regions and can display hours of use, distance traveled, and time present within a region calculated for governmental regions such as counties, parishes, boroughs, states, and countries. Data conversion server 130 supports uploading through terminal 128 of regions in the form of shapefiles available from government survey authorities or other sources. Additionally, data conversion server 130 supports user entry of any geofence 144n that has value to the user. As an example, in one embodiment of the present invention, a user can define a geofence 144n or set thereof by uploading through terminal 128 a database of location points and then establishing circular regions of a given diameter, e.g., 100 meters, centered on the points, which, in one embodiment, represent oil wells serviced by an oilfield services company. In another embodiment, such points can indicate a route along which cable is to be buried or a road on which an item of equipment is to be transported. As illustrated in FIG. 1, coordinates 140a-140n define an enclosed region, which could represent a construction site, for example.

Data conversion server 130 processes GPS events to determine which region(s) remote devices 100a-100n are contained in and if a region boundary has been crossed since a last report. In one embodiment, if a boundary has been crossed, usage data can be prorated by data conversion server 130, based on actual time spent within the boundaries of a selected region.

Data conversion server 130 includes geofence-based reporting including utilization metrics that incorporate data gathered using geofence 144n, as well as information such as hours-of-use data and distance-traveled data. Data conversion server 130 allows a user to, on the basis of geofence 144n, monitor and analyze any data received by remote device 100n. For example, in one embodiment of the present invention, remote device 100n is equipped with pump sensors and mounted to a water tank truck and a user of data conversion server 130 can request reporting of the number of gallons of water pumped in each of several geofences 144n.

Data conversion server 130 can define a geofence 144n as, for example, either multiple adjacent geofences, each defining a segment of the job site, that together encompass the entire job site, or one geofence that encompasses the entire job site and one or more smaller geofences, each of which is wholly within the job site geofence, that define segments of the job site. Further, equipment can be shared across (and billed out separately to each of) multiple job sites by defining separate geofences and recording time spent within the region defined by each geofence. Data conversion server 130 includes an option to allow that a geofence 144*n* or portions can be implemented on remote device 100*n* if the regions of interest are known at the time the asset is in use. The geofence 144*n* or portions can also be implemented retrospectively on data conversion server 130 to examine regions of interest after the period of equipment utilization.

Application server 136 generates reports that show for each asset, for example, calendar time on the job site in total and per job site segment, daily hours of use or distance traveled per job site segment, and daily utilization percentage per job site segment based on standard working hours defined for the job site.

Application server 136 further provides reporting and management of maintenance tasks. A maintenance task encapsulates a specific service to be performed on an asset. Examples include: engine oil and filter change, brake system inspection, tire rotation, and the like. Maintenance tasks can also be created for administrative actions such as Department of Transportation (DOT) registration, safety inspection, insurance renewal, and the like. Standard tasks from manufacturers are available based on equipment model, and are supported by data conversion server 130. Application server 136 allows a user to accept the manufacturer's recommended rules or customize them through terminal 128. Reporting for maintenance tasks includes a model-specific list of parts required to perform the task, a list of labor resources and hours normally required to perform the task. For example, a task could require 2 hours Master Mechanic, 1 hour Hydraulic Specialist, and 1 hour Mechanic's Assistant.

Database server 138 maintains a master library of parts. In one embodiment, a part has the following properties: manufacturer; part identifiers (e.g., part number, stock keeping unit (SKU), uniform product code (UPC)); description; manufacturer's suggested retail price (MSRP); restocking level (i.e., a minimum number to keep in stock); and warranty terms. Each part record contains a compatibility matrix that represents the assets on which the part is used. Compatibility may, for instance, be defined by the manufacturer and model, manufacturer, model, and year of manufacture, or other criteria. Database server 138 tracks the inventory of parts throughout their lifecycle. Operations affecting inventory include, among others, receiving parts, using a part for a work order, selling a part and adjusting part stock level (e.g., due to loss or theft).

Database server 138 generates a report of parts needed based on parts with an inventory level less than their restocking level, parts that are needed for current work orders, and parts that are anticipated for upcoming work orders. Database server 138 can, from the list of parts needed, generate quote requests to be sent to part suppliers for quotation. From a quote request (or from scratch), database server 138 generates purchase orders for the parts that are needed. When parts are received for a purchase order, their arrival is entered through terminal 128, and they are reconciled against the purchase order. In one embodiment of the present invention, data conversion server 130 stores and monitors maintenance rules, which define the schedule on which maintenance tasks should be performed. A task defines a unit of work to be performed on an asset. In one embodiment each task has a task code (i.e., identifier) and a task type (e.g., preventative maintenance, predictive maintenance, repair, inspection, or administration). When a task is associated with a model, the following additional attributes can be made to apply to the "task+model" combination: a list of parts needed to perform the task (with quantities) and a list of labor resources needed to perform the task (with quantities). For example, a combination could require 2 hours of labor from a master mechanic and 1 hour of labor from a hydraulic specialist. This allows the parts and personnel needed for a given task to be "reserved" (though still in stock or otherwise available), allowing a more accurate view of the parts actually available and actual stock levels of a given part, for example.

Data conversion server 130 operates on schedules based on one or more of distance traveled, engine usage hours, and calendar time. As will be described below, past usage data is analyzed by components of data conversion server 130 to predict the next time a maintenance task will be due. In one embodiment of the present invention, a maintenance alert can also be generated in response to remote device 100*n* receiving a DTC, or a monitored sensor on remote device 100*n* reporting an out of normal range value. As used herein, an alert includes any notification between system components or to a user. An example of alerts according to one embodiment of the present invention is an alert passed between system components, such as the reporting of a DTC from remote device 100*n* to a device-specific server 126*n*. Another such example is an alert passed from a system component to a user, such as a maintenance alert delivered in an email or a report delivered by application server 136 using a web application. Yet another example is an alert passed from a system component to a third party system, such as a service request transmitted from application server 136 to a third-party service vendor. Other examples of alerts will vary between embodiments of the present invention without departing from the scope and intent of the present disclosure.

When an asset is added to the system, the user of terminal 128 can specify to data conversion server 130 the next time a maintenance task should be performed so that assets can be added mid-maintenance cycle. Standard rules from manufacturers are available based on equipment model, and are supported by data conversion server 130. Application server 136 allows a user to accept the manufacturer's recommended rules or customize them through terminal 128. In one embodiment, when an asset is sold from one entity, the asset's maintenance history can be transferred to the new owner (with the seller's permission). Data conversion server 130 further supports part management, including attributes of a part such as manufacturer, stock keeping unit (SKU), type, supplier(s), restocking level, manufacturer's suggested retail price (MSRP), price, units, description, location date and method received, and cost.

Application server 136 implements a part acquisition process for identifying needed parts and acquiring them. A part need is identified by data conversion server 130, for example because a quantity in inventory is less than restocking level or because parts are requested for work orders and not available from inventory. Additionally, application server 136 can calculate an anticipated part need by analyzing the upcoming maintenance tasks and the parts they require.

Application server 136 also provides a quote builder (not shown) that builds quotes. Parts are listed by application server 136 in the quote builder as follows: one group of parts, each of which does not have an associated supplier and one group per supplier listing each part that is needed and is available from that supplier. A part can be listed by application server 136 in the quote builder in more than one supplier group if it is available from more than one supplier. Suppliers can be added by application server 136 in the quote builder to move parts from the "no suppliers" group and additional suppliers can be added to parts within a supplier group to quote them from n+1 suppliers. Suppliers can be removed by application server 136 in the quote builder from a part to remove it from a quote request. The list of needed parts for a supplier is converted by application server 136 in the quote builder into a quote request. The quote request consists of a list of each part needed and the quantity needed for work orders and inventory. The quantity can be adjusted manually through terminal 128 to request additional parts in excess of those required.

A part can be deleted from the quote request manually. Additional parts can be manually added through terminal 128 to the quote request. Application server 136 provides delivery of the quote request to the supplier by application server 136 emailing directly from the system, printing and faxing, printing and mailing, and electronic delivery through an integration with the supplier over network 120.

Application server 136 provides purchase order creation through several methods. In a first method, a user can create a purchase order from scratch using terminal 128 by selecting a supplier, selecting part(s) to purchase and quantity and price for each, and adding shipping and taxes. In a second method application server 136 creates a purchase order from a quote request. Application server 136 creates a blank purchase order and then copies the parts list, quantity, and the like from the quote request. A user at terminal 128 can adjust quantities, add parts or delete parts as desired. A user at terminal 128 enters the price to pay for each part and adds shipping and taxes. Application server 136 provides delivery of a purchase order to the supplier by application server 136 emailing directly from the system, printing and faxing, printing and mailing, and electronic delivery through an integration with the supplier over network 120.

When parts are received, application server 136 supports recordation of receipt of parts as delivery of a purchase order, in which a user at terminal 128 enters the quantity of each part actually received (as the purchase order could arrive in multiple shipments). Application server 136 pre-fills quantity blanks on display of terminal 128 with the number of parts remaining to be received for the purchase order. For each part, application server 136 provides the following options for allocation: one item to stock and one item for every work order requesting the part. If there are enough parts received to satisfy all requesting work orders, then application server 136 allocates the parts to the work orders and the remaining, if any, are allocated to stock. If there are not enough parts to satisfy all requesting work orders, then application server 136 allocates parts to the oldest work orders first. The user at terminal 128 can manually adjust the allocation of parts between work orders and stock. Application server 136 associates a work order with an asset for performance of a maintenance task or a group of maintenance tasks. A Work Order consists of one or more tasks for performance on an asset using a list of parts (e.g. 4 quarts oil (part #ABC) and 1 ea. oil filter (part #XYZ)), using a list of labor (e.g. Employee A, 4 hours on Jul. 1, 2008 and Employee C 8 hours on Jul. 2, 2008) and using services of a third party (e.g. work performed at an external shop vs. in house). Parts needed for a work order may be configured by adding them individually, by selecting a set of parts that has been prescribed for performing the task by the task+model combination described above, or by selecting from a set of parts previously used for the same task on that asset or similar assets. If a part is assigned to a work order and there are not sufficient parts in stock to perform the work order, then a part request is created which feeds into the inventory "parts needed" calculation. When a work order is created, a notice is given if the asset is still under warranty. When parts are added to a work order, past work orders for the asset are checked to see if the same part has been used before and, if so, if it is still under warranty. If any parts are under warranty, a notice is given.

Application server 136 assigns to a work order a quantity of parts. If the parts are available in inventory, they are assigned to the work order by application server 136. If the total quantity of parts is not available in inventory, then application server 136 assigns any that are available and the remainder are requested through a part acquisition process. Application server 136 assigns to a work order hours from any number of employees, recording, for each employee, the date and number of hours. If employee hours across all work orders for that day are higher than a standard workday (e.g., eight hours), application server 136 calculates labor cost at overtime rates, a calculation which can also be performed for weekends, holidays and the like, or other time periods during which modified billing rates are appropriate.

Application server 136 generates, for example the following metrics: total parts cost, total parts charge, total labor cost, total labor charge, total labor hours, total work order cost, and total work order charge (for invoicing and inclusion in a maintenance cost history, which is used by an asset replacement analysis engine, discussed and illustrated below). At the time of performing a work order, the asset's meter readings are recorded by remote device 100*n* and associated with the work order by database server 138. In the case of an asset without a remote device 100*n*, the meter readings are entered manually by a user at terminal 128. In the case of an asset with a remote device 100*n*, the most recent reading from the device is used and can be manually adjusted by the user at terminal 128. The meter reading(s) now associated with the work order by database server 138 and the date the work order was performed are associated by database server 138 with the maintenance task to baseline the next time the maintenance task needs to be performed.

Application server 136 additionally facilitates employee management by storing in database server 138 basic employee information and emergency contacts, providing evaluation of an employee based on, for example, ten criteria, and calculation of a rating and ranking of the employee on a configurable scale. Application server 136 further provides attendance tracking with reason for absence and tardiness, which can be used for rating and ranking purposes. Work order efficiency is reported by comparing the actual labor hours used to complete a work order against the standards set for the task+model combination. Work order labor trends are reported by analyzing the actual labor hours spent for many instances of performing the same task.

Figure 2:
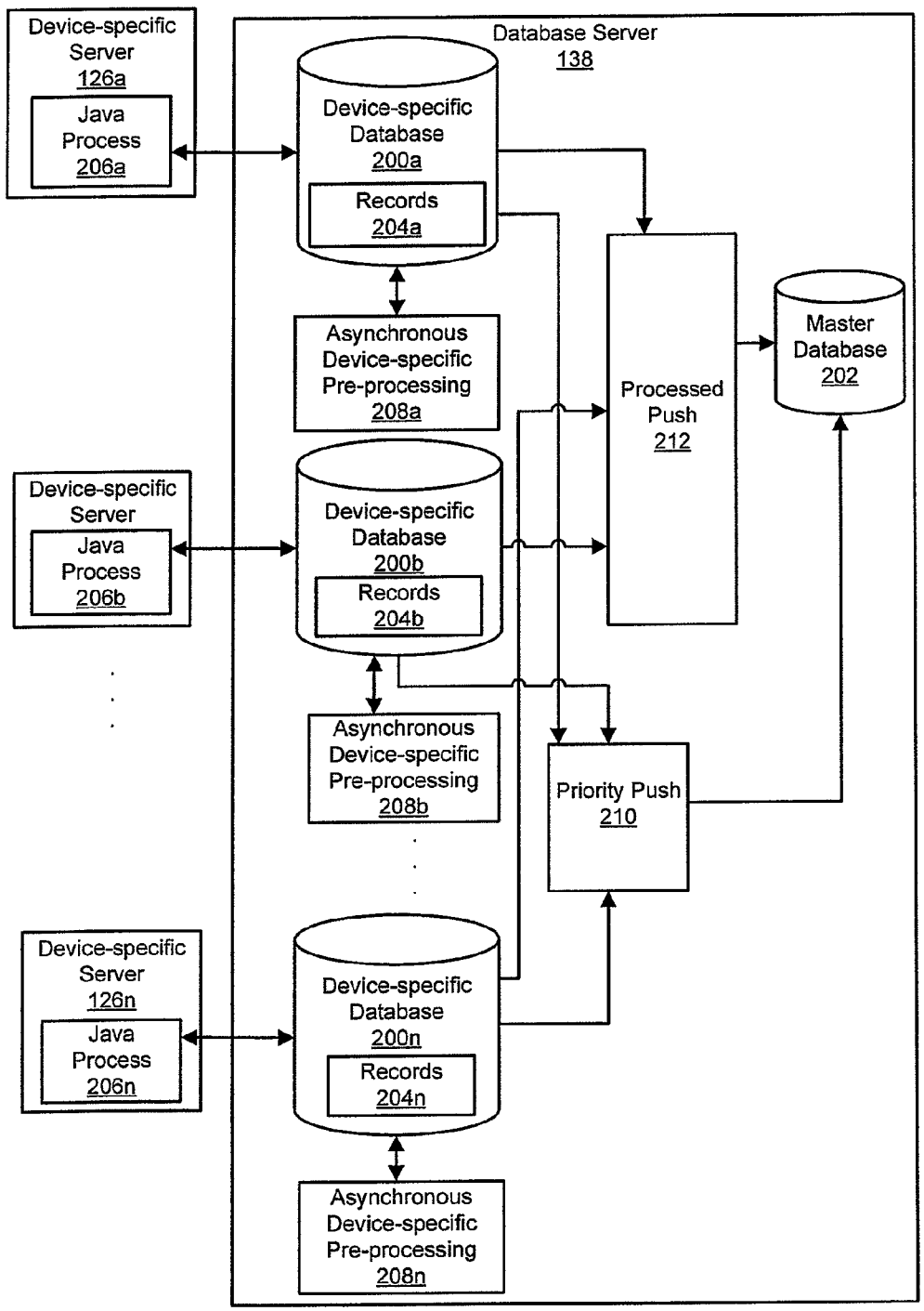
FIG. 2 depicts an exemplary database server for performing monitoring and management of a mobile equipment fleet, in accordance with one embodiment of the present invention.

Turning now to FIG. 2, an exemplary database server for performing monitoring and management of a mobile equipment fleet, in accordance with one embodiment of the present invention, is depicted. Database server 138 contains device-specific databases 200*a*-200*n* (which receive data) and a master database 202, which provide much of the processing that underlies the solutions provided by embodiments of the present invention. In one embodiment, master database 202 contains data stored in a standardized format that represents events while accommodating a wide range of devices and implements procedures stored in Procedural Language/Postgre Structured Query Language (PL/pgSQL)™. (It will be noted that all trademarks used in the present specification are the property of their respective owners.) Use of trademarks or service marks in describing the present application is for example only and does not imply any affiliation between the inventor or assignee and the trademark or service mark owner.

Master database 202 supports manipulation of event data stored through event parameters such as, for example, start_trip and end_trip through the employment of a standard table structure schema.

In one embodiment, master database 202 is accessed using a master database application program interface, which can be implemented as follows:

```
FUNCTION public.record_gps_event(
    _gps_device_id integer,
    _gps_trip_id integer,
    _event_timestamp timestamp with time zone,
    _gps_event_type_id integer,
    _gps_lock_type_id integer,
    _latitude numeric,
    _longitude numeric,
    _address character varying,
    _speed integer,
    _course integer,
    _total_trip_time integer,
    _accumulated_idle_time integer,
    _accumulated_travel_distance integer,
    _geofence_id integer,
    _input_number integer,
    _output_number integer,
    _sort_order integer,
    _inserted_by character varying)
RETURNS integer
/*
Record a gps_event in the master database.
The new event's gps_event_id is returned so that it can be
referenced in future.
*/
FUNCTION public.create_trip(
    _gps_device_id integer,
    _start_timestamp timestamp with time zone,
    _inserted_by character varying)
RETURNS integer
/*
Create a new trip in the master database.
The new trip's gps_trip_id is returned so that it can be referenced
in the future.
*/
FUNCTION public. add_event_to_trip(
    _gps_event_id integer,
    _gps_trip_id integer,
    _incremental_idle_minutes integer,
    _incremental_total_minutes integer,
    _incremental_meters integer)
RETURNS void
/*
Create an association between a gps_event and a gps_trip in the
master database. Optionally, update the incremental idle minutes, total
minutes, and meters of the gps_event at the same time.
*/
FUNCTION public.update_meter(
    _gps_device_id integer,
    _asset_id integer,
    _meter_type_id integer,
    _meter_update_source_id integer,
    _amount numeric,
    _input_unit_of_measure_id integer,
    _display_unit_of_measure_id integer,
    _is_visible Boolean,
    _is_absolute Boolean,
    _last_updated_by character varying)
RETURNS void
/*
Update a meter by specifying a gps_device_id or asset_id
and the meter_type_id. If the selected meter_type does not
exist for the asset, it will be created.
*/
CREATE FUNCTION public.update_trip(
    _gps_trip_id integer,
    _end_timestamp timestamp with time zone,
    _meters integer,
    _idle_minutes integer,
    _total_minutes integer,
    _max_speed integer,
    _last_updated_by character varying)
RETURNS void
/*
Updates a gps_trip in the master database to set end_timestamp,
total meters, idle minutes, trip minutes, and maximum speed. The
gps_trip must be referenced by the gps_trip_id returned
from create_trip.
*/
```

Each of device-specific databases 200a-200n is specific to a particular type of remote devices 100a-100n and any similar remote devices 100a-100n communicating through employment of a sufficiently similar protocol. In one embodiment, device-specific databases 200a-200n contain records 204a-204n, the schema of each of device-specific databases 200a-200n reflecting the structure of data associated with a particular type of remote devices 100a-100n and the assets to which they are deployed or with which they are associated. In one embodiment, fields of records 204a-204n include data such as, for example, latitude, longitude, speed, heading and flags for information, including whether a record has been processed and pushed. While one embodiment of the present invention employs, PL/pgSQL™ and Java™, one skilled in the art will, in light of the present disclosure, realize that equivalent embodiments will employ other programming languages and architectures without departing from embodiments of the present invention.

Device-specific databases 200a-200n receive data from Java™ processes 206a-206n running on device servers 126a-126n. In one embodiment, Java™ processes 206a-206n receive messages from remote devices 100a-100n, which Java™ processes 206a-206n then package and deliver to device-specific databases 200a-200n. When device-specific databases 200a-200n receive data from Java™ processes 206a-206n, device-specific databases 200a-200n send acknowledgement to Java™ processes 206a-206n. In one embodiment, device-specific databases 200a-200n also send downstream messages, including, for example, configuration information, to Java™ processes 206a-206n for delivery to remote devices 100a-100n.

Device-specific databases 200a-200n send data to asynchronous device-specific pre-processing engines 208a-208n, which identify devices needing processing and process new data to create new events, in a manner asynchronous to receipt, and return the data to device-specific databases 200a-200n after pre-processing. Device-specific databases 200a-200n then deliver the pre-processed events to one of a priority push engine 210, which delivers the events to master database 202 without processing, or a processed push engine 212, which identifies events requiring processing and processes the events before delivering them to master database 202.

One skilled in the art will, in light of the present disclosure, realize that while device-specific databases 200a-200n, asynchronous device-specific pre-processing engines 208a-208n, processed push engine 212, priority push engine 210 and master database 202 are illustrated in FIG. 2 as independent modules, alternative embodiments and implementations of the present invention can combine device-specific databases 200a-200n, asynchronous device-specific pre-processing engines 208a-208n, processed push engine 212, priority push engine 210 and master database 202 or various elements of the functions and processes that they embody, into integrated systems.

Asset management functions supported by master database 202 include, among other functions, creating an asset record, associating an asset with a remote device 100n, complete manual entry of data at terminal 128, and receipt of data pre-filled from a vehicle information number or other such asset identifier, imported from upload of a data file or automatically created from a link to another system, such as a database owned by a customer. Master database 202 supports usage measurement in terms of, among others, distance traveled, hours of engine use, or a combination of these. For equipment with multiple engines, hours of use are tracked per engine. Data can be uploaded to master database 202, manually entered as incremental or absolute values or received from remote devices 100a-100n.

Figure 3:
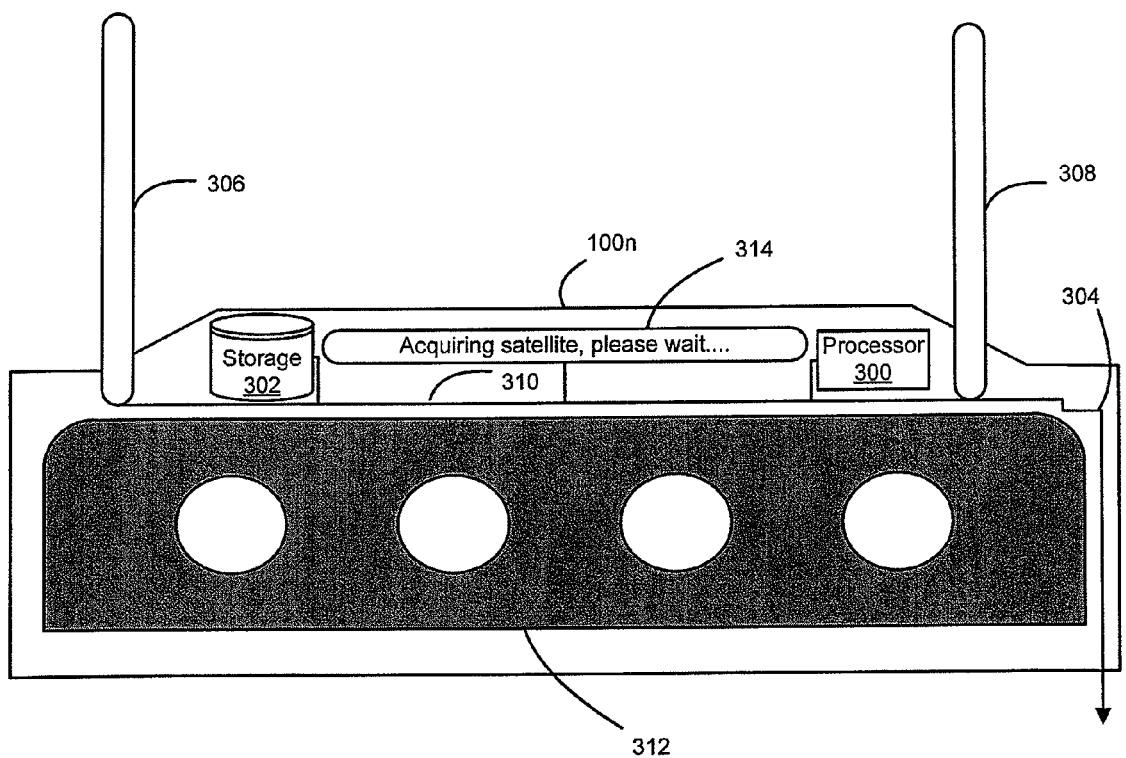
FIG. 3 illustrates an exemplary remote unit for performing monitoring and management of a mobile equipment fleet, in accordance with one embodiment of the present invention.

Referring now to FIG. 3, an exemplary remote device for performing monitoring and management of a mobile equipment fleet, in accordance with one embodiment of the present invention, is illustrated. As will be appreciated by one skilled in the art, FIG. 3 is a simplified schematic representation of remote device 100n, and one skilled in the art will, in light of the present disclosure, realize that it is possible to add, remove and substitute various components to fit the needs of various embodiments of the present invention. Remote device 100n supports many of the data gathering functions of embodiments of the present invention. In one embodiment, remote device 100n is associated with an asset by database server 138 through a record in master database 202. Remote device 100n contains a processor 300, a storage unit 302, a GPS antenna 306, a data transceiver antenna 308, a sensor lead 304, a tactile input subsystem 312 and a display unit 314. Processor 300, storage unit 302, sensor lead 304 GPS antenna 306, data transceiver antenna 308, tactile input subsystem 312 and display unit 314 are connected by a bus 310, which provides signal connectivity between processor 300, storage unit 302, sensor lead 304, GPS antenna 306, data transceiver antenna 308, tactile input subsystem 312 and display unit 314.

Processor 300 provides centralized control for remote device 100n, executing instructions and processing data stored on storage unit 302, which one skilled in the art will, in light of the present disclosure, realize can be embodied by one of many forms of memory or disk storage, among other computer-readable storage media. GPS antenna 306 receives GPS signals 102a-102n, which enable processor 300 to determine a location of remote device 100n. Remote device 100n uses data transceiver antenna 308 for transmission of data and messages over, for example, short-range radio connection 110, medium-range wireless signal 114 or satellite uplink 106. Embodiments of the present invention support radio/modem, cellular-based, shortwave, Bluetooth, Wi-Fi, and like implementations.

Remote device 100n communicates with a user through display unit 314, and a user communicates with remote device 100n through tactile input subsystem 312, such as a set of buttons and knobs or a keypad. A sensor lead 304, or in some embodiments, multiple sensor leads, provide a data acquisition interface to enable remote device 100n to receive signals from, and in some embodiments provide signals to, a vehicle or unit of equipment to which remote device 100n is attached. Signals readable by remote device 100n over sensor lead 304 can include electrical impulses, such as data signals from an onboard computer in a vehicle or unit of equipment to which remote device 100n is attached. Sensor lead 304 can attach to an interface (not shown) to a vehicle's onboard diagnostic system or from actual sensors indicative of asset conditions, such as whether an engine is started or stopped. In some embodiments, sensor lead 304 can be equipped to detect external conditions such as temperature and humidity. In further embodiments, sensor lead 304 can provide signals to a vehicle or unit of equipment, such as signals enabling remote device 100n to start or stop an engine. One embodiment of the present invention supports telemetry data processing on the basis of remote device 100n being fitted to a mobile (or possibly fixed) asset such as a vehicle.

Remote device 100n uses data transceiver antenna 308 for transmission of data and messages, when, for example, an alert occurs due to, for example, the presence of a diagnostic trouble code (DTC), a malfunction indicator light (MIL) becoming illuminated, or a monitored parameter exceeding or falling below a threshold, which can also be triggered at data conversion server 130. Additionally, remote device 100n uses data transceiver antenna 308 for transmission of data and messages, such as when, for example, telemetry is requested by one of device-specific servers 126a-126n. When an alert message is received by one of device-specific servers 126a-126n, it is converted into an actionable item in a standard format by one of device-specific servers 126a-126n and passed to data conversion server 130. For example, a DTC is looked up in data conversion server 130 to determine the corrective action to be taken and a work order is created and transmitted to terminal 128.

In one embodiment, device provisioning for remote device 100n, including assignment of server address and network credentials for device-specific servers 126a-126n is performed prior to customer deployment using data transceiver antenna 308, tactile input subsystem 312 and display unit 314. Likewise, device configuration can be determined manually using tactile input subsystem 312 and display unit 314 or by using data transceiver antenna 308 to communicate standard configurations from master database 202 based on an equipment type or usage profile. Remote device 100n also typically includes a serial port (not shown), and a user can connect to remote device 100n through a serial connection and issue the provisioning commands, update firmware or perform other necessary functions.

Configuration scenarios supported by remote device 100n provide the ability for a user of terminal 128 to specify parameters to manufacturer's firmware, write rules for manufacturer's event engine or write custom firmware. Further, remote device 100n supports dynamic configuration, including reconfiguration on the asset based on rules related to, for example, sensitivity based on ignition, interval based on location relative to a geofence 144n (inside/outside), an interval based on speed, an interval based on communication used during a time period, a set of geofences based on location, a set of geofences based on job assignment, or other factors that will vary from implementation to implementation.

Figure 4:
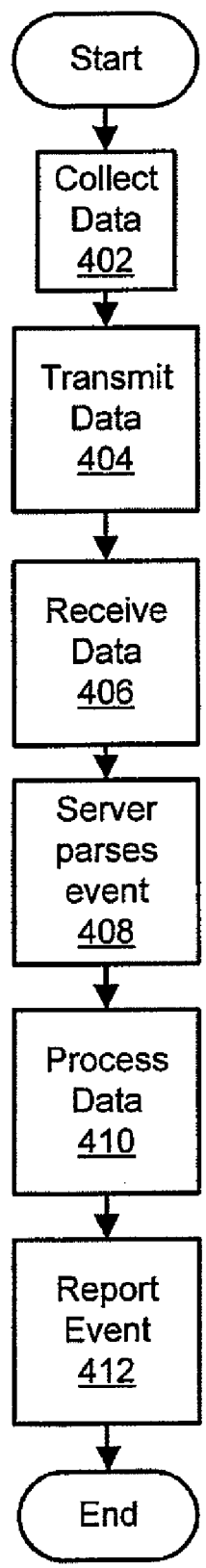
FIG. 4 depicts a flowchart of a process for performing monitoring and management of a mobile equipment fleet, in accordance with one embodiment of the present invention.

Turning now to FIG. 4, a flowchart of a process for performing monitoring and management of a mobile equipment fleet, in accordance with one embodiment of the present invention, is depicted. The process depicted with respect to FIG. 4 provides one embodiment of several aspects of the overall interaction of various components of embodiments of the present invention, though one skilled in the art will quickly realize that steps may be added to, removed from, or substituted into the process described in FIG. 4. After starting, the process proceeds to step 402, which illustrates remote device 100n collecting data, for example through sensor lead 304. The process next moves to step 404. Step 404 depicts remote device 100n transmitting data. Examples of remote device 100n transmitting data include transmission of data and messages over, for example, short-range radio connection 110, medium-range wireless signal 114 or satellite uplink 106. The process then proceeds to step 406, which illustrates one of device-specific servers 126a-126n, for example, receiving data transmitted by remote devices 100a-100n. The process next moves to step 408. Step 408 depicts one of device-specific servers 126a-126n, for example, parsing an event from data transmitted by remote devices 100a-100n. The process then proceeds to step 410, which illustrates data conversion server 130 processing data. Such data processing can include exemplary processes discussed further with respect to FIG. 8 below, and includes database processing, such as event creation data format normalization. The process next moves to step 412. Step 412 depicts data conversion server 130 reporting an alert of the event to terminal 128. The process then ends.

Figure 5:
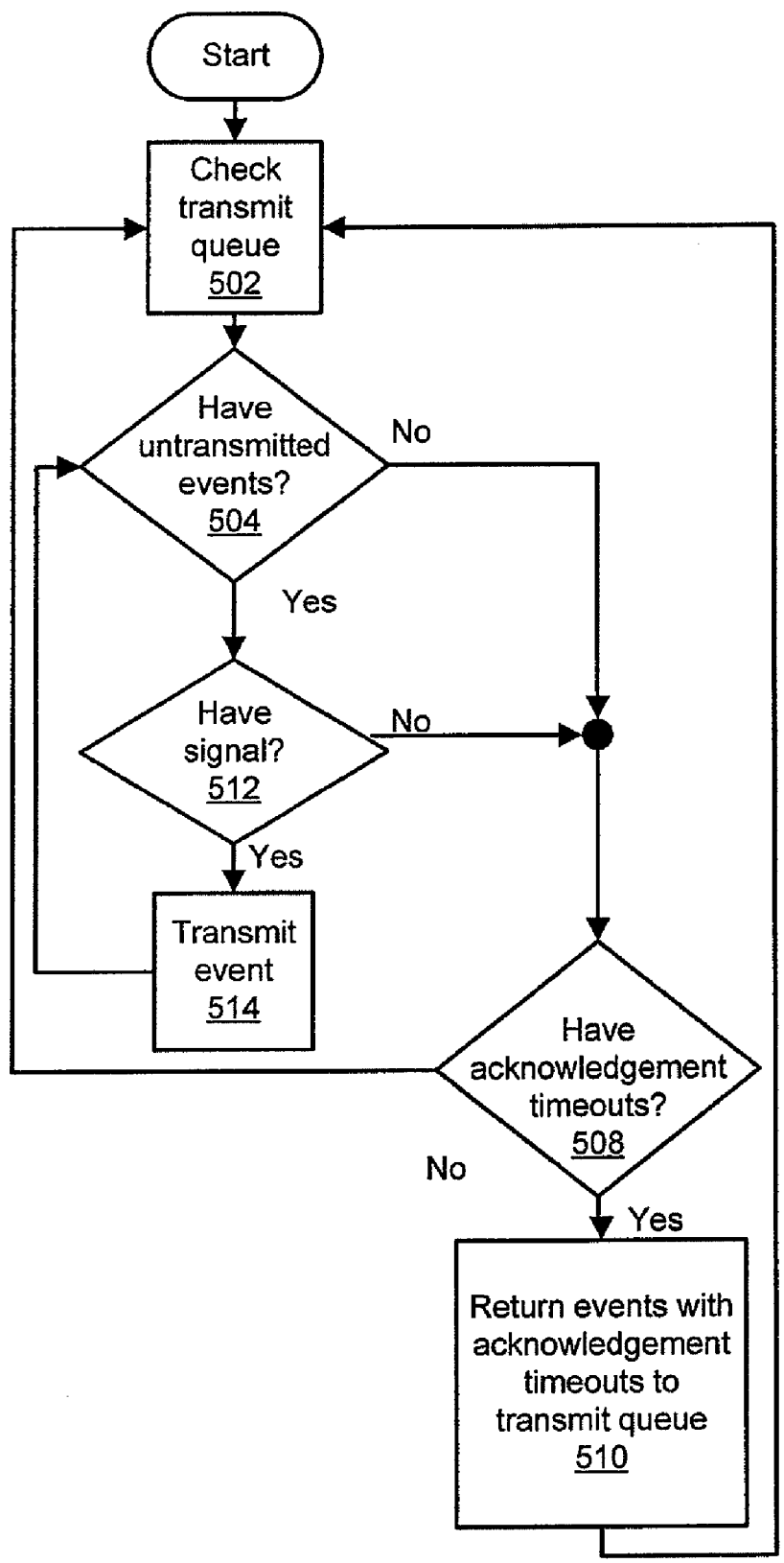
FIG. 5 illustrates a flowchart of a process for a remote unit transmitting data for monitoring and management of a mobile equipment fleet, in accordance with one embodiment of the present invention.

Referring now to FIG. 5, a flowchart of a process for a remote device transmitting data for monitoring and management of a mobile equipment fleet, in accordance with one embodiment of the present invention, is illustrated. The process depicted with respect to FIG. 5 provides one embodiment of several aspects of the transmission behavior of remote devices 100a-100n in step 404 above, though one skilled in the art will quickly realize that steps may be added to, removed from, or substituted into the process described in FIG. 5. After starting, the process proceeds to step 502, which illustrates remote device 100n checking a transmit queue in storage 302. The process next moves to step 504. Step 504 depicts remote device 100n determining whether any untransmitted events are present in the transmit queue of storage 302. If no untransmitted events are present in the transmit queue of storage 302, then the process next moves to step 508.

Step 508 depicts remote device 100n determining whether remote device 100n has experienced a timeout on acknowledgement of any previously transmitted data. If remote device 100n determines that remote device 100n has not experienced a timeout on acknowledgement of a previously transmitted event, the process then returns to step 502, which is described above. If remote device 100n determines that remote device 100n has experienced a timeout on acknowledgement of a previously transmitted event, the process proceeds to step 510, which illustrates remote device 100n returning to transmit queue of storage 302 an event for which a timeout on acknowledgement has occurred. The process then returns to step 502, which is described above.

Returning to step 504, if any untransmitted events remain in the transmit queue, then the process next moves to step 512, which illustrates remote device 100n determining whether, for example, short-range radio connection 110, medium-range wireless signal 114 or satellite uplink 106 are available to data transceiver antenna 308 for transmission of data and messages. In some embodiments of the present invention, remote device 100n will have the ability to attempt communication over multiple links to (in parallel or in series) to determine whether, for example, short-range radio connection 110, medium-range wireless signal 114 or satellite uplink 106 are available to data transceiver antenna 308 for transmission of data and messages. If remote device 100n determines that short-range radio connection 110, medium-range wireless signal 114 or satellite uplink 106 are not available to data transceiver antenna 308 for transmission of data and messages, then the process returns to step 508, which is described above. If remote device 100n determines that short-range radio connection 110, medium-range wireless signal 114 or satellite uplink 106 are available to data transceiver antenna 308 for transmission of data and messages, then the process proceeds to step 514. Step 514 depicts remote device 100n transmitting data and messages over short-range radio connection 110, medium-range wireless signal 114 or satellite uplink 106. The process then returns to step 504, which is described above.

Figure 6:
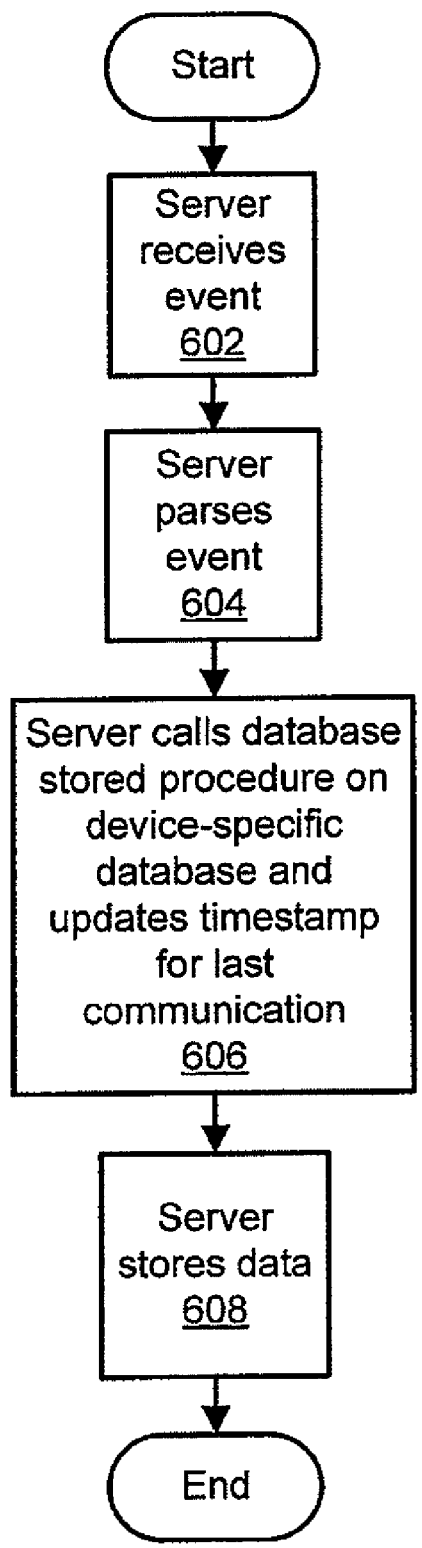
FIG. 6 depicts a flowchart of a process for a system of one or more servers receiving data for monitoring and management of a mobile equipment fleet, in accordance with one embodiment of the present invention.

Turning now to FIG. 6, a flowchart of a process for a system of one or more servers receiving data for monitoring and management of a mobile equipment fleet, in accordance with one embodiment of the present invention, is depicted. The process depicted with respect to FIG. 6 provides one embodiment of several aspects of the communication behavior of device-specific servers 126a-126n, though one skilled in the art will quickly realize that steps may be added to, removed from, or substituted into the process described in FIG. 6. After starting, the process proceeds to step 602, which illustrates one of device-specific servers 126a-126n receiving an event. The process next moves to step 604. Step 604 depicts one of device-specific servers 126a-126n parsing the event received in step 602. The process then proceeds to step 606, which illustrates one of device-specific servers 126a-126n calling a database stored procedure on one of device-specific databases 200a-200n and updating a timestamp for last communication with remote device 100n. The process next moves to step 608. Step 608 depicts one of device-specific databases 200a-200n storing the event received in step 602. The process then ends.

Figure 7:
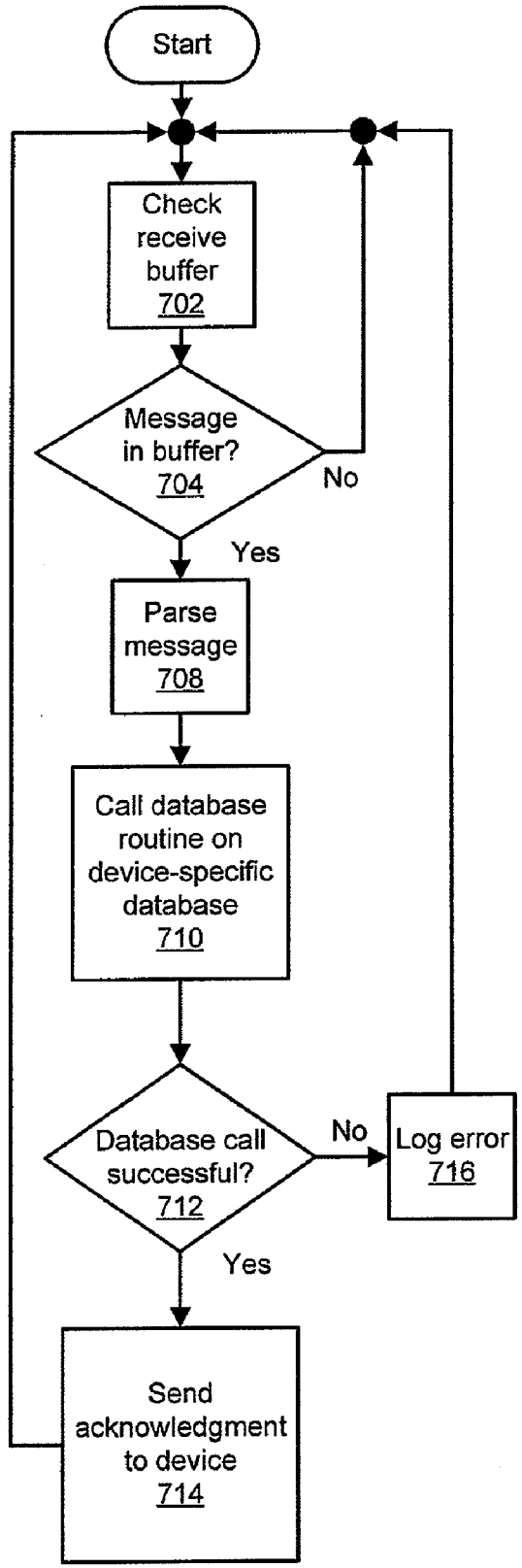
FIG. 7 illustrates a flowchart of a process for receiving and delivering to a database a message received from a remote device in accordance with one embodiment of the present invention.

Referring now to FIG. 7, a flowchart of a process for receiving and delivering to a database a message received from a remote device in accordance with one embodiment of the present invention, is illustrated. The process depicted with respect to FIG. 7 provides one embodiment of several aspects of the message-handling behavior of device-specific servers 126a-126n, though one skilled in the art will quickly realize that steps may be added to, removed from, or substituted into the process described in FIG. 7. After starting, the process then moves to step 702, which illustrates one of device-specific servers 126a-126n checking a receive buffer. The process then proceeds to step 704. Step 704 depicts device-specific server 126n determining whether there is a network (e.g., TCP or UDP) message in a receive buffer. If device-specific server 126n determines that there is no message in a receive buffer, then the process returns to step 702, which is described above.

Returning to step 704, if device-specific server 126n determines that there is a message in a receive buffer, then the process proceeds to step 708. Step 708 depicts device-specific server 126n parsing a message in a receive buffer. The process next moves to step 710, which illustrates device-specific server 126n calling a database routine on one of device-specific databases 200a-200n. The process then proceeds to step 712. Step 712 depicts device-specific server 126n determining whether the database call to device-specific database 200n was successful. If device-specific server 126n determines that the database call to device-specific database 200n was successful, then the process next moves to step 714, which illustrates device-specific server 126n sending an acknowledgement to one of remote devices 100a-100n. The process then returns to step 702, which is described above.

Returning to step 712, if device-specific server 126n determines that the database call to device-specific database 200n was not successful, then the process proceeds to step 716. Step 716 depicts device-specific server 126n logging an error. No acknowledgement is sent to remote device 100n, with the effect that remote device 100n will attempt to resend the message. The process then returns to step 702, which is described above.

Figure 8:
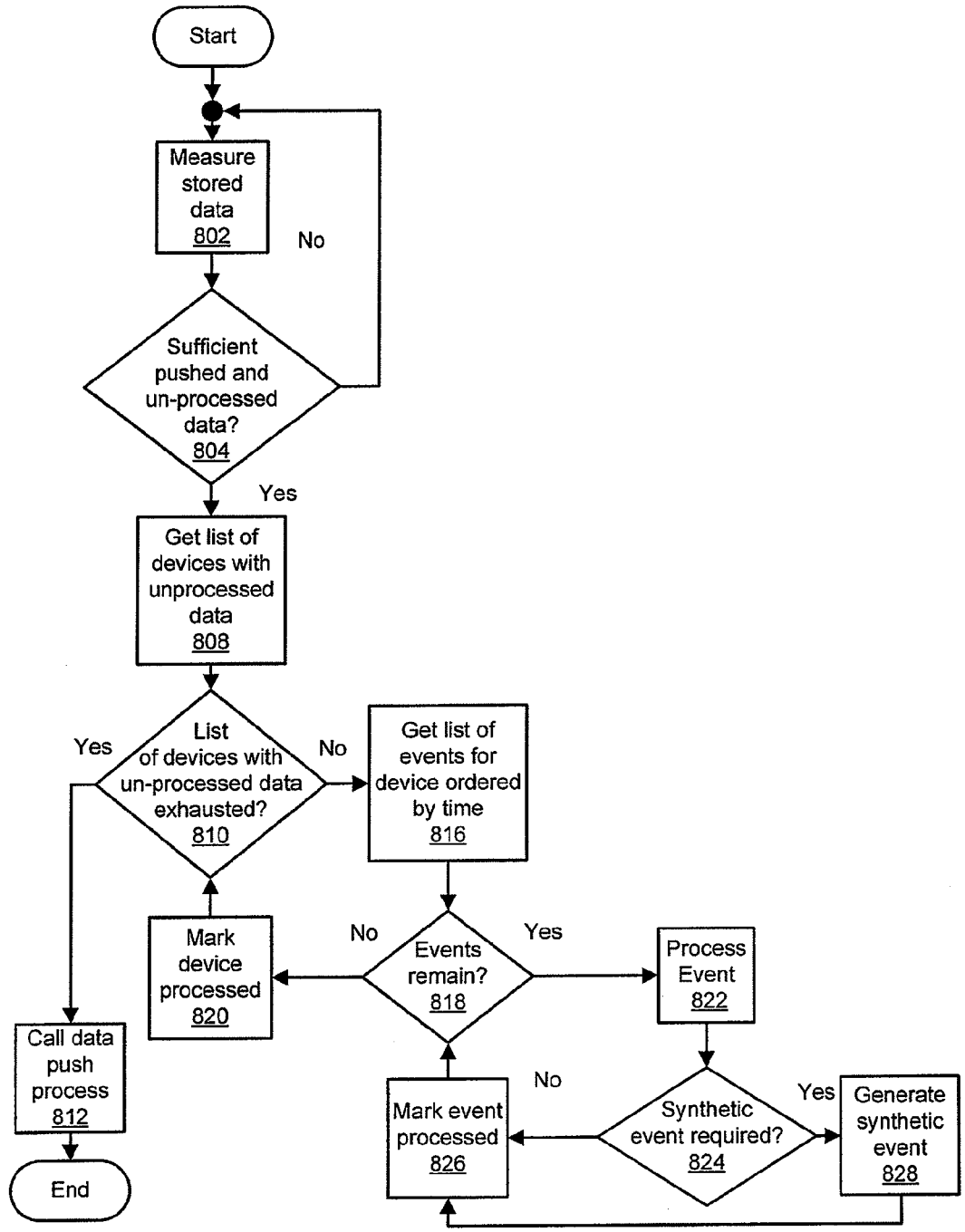
FIG. 8 depicts a flowchart of a process for device-specific database processing in accordance with one embodiment of the present invention.

Turning now to FIG. 8, a flowchart of a process for device-specific database processing in accordance with one embodiment of the present invention is depicted. The process depicted with respect to FIG. 8 provides one embodiment of several aspects of the data processing behavior of device-specific databases 200a-200n, broadly labeled as step 410 above, though one skilled in the art will quickly realize that steps may be added to, removed from, or substituted into the process described in FIG. 8. One skilled in the art will recognize that device-specific databases 200a-200n contain data for remote devices 100a-100n that device-specific databases 200a-200n serve.

After starting, the process moves to step 802, which illustrates database server 138 measuring the amount of stored data awaiting processing and pushing. The process then proceeds to step 804, which illustrates database server 138 determining whether sufficient pushed and unprocessed data exists. If database server 138 determines that insufficient pushed and unprocessed data exists, then the process next returns to step 802, which is described above.

Returning to step 804, if database server 138 determines, in reference, for instance, to a user-configurable standard, that sufficient pushed and unprocessed data exists, then the process next moves to step 808, which illustrates database server 138 generating a list of remote devices 100a-100n with unprocessed data. The process then proceeds to step 810. Step 810 depicts database server 138 determining whether the list of remote devices 100a-100n with unprocessed data is exhausted. If database server 138 determines that the list of remote devices 100a-100n with unprocessed data is exhausted, then the process proceeds to step 812, which illustrates database server 138 calling data push process 212. The process then ends at step 814.

Returning to step 810, if database server 138 determines that the list of remote devices 100a-100n with unprocessed data is not exhausted, then the process next moves to step 816. Step 816 depicts database server 138 generating a list of unprocessed events (ordered by time stamp, for example) for a remote device 100n. The process then proceeds to step 818, which illustrates database server 138 determining whether the list of unprocessed events for remote device 100n is exhausted. If database server 138 determines that the list of unprocessed events, ordered by time stamp, for remote device 100n is exhausted, then the process next moves to step 820. Step 820 depicts database server 138 marking remote device 100n as processed. The process then returns to step 810, which is described above.

Returning to step 818, if database server 138 determines that the list of unprocessed events, ordered by time stamp, for remote device 100n is not exhausted, then the process proceeds to step 822, which illustrates database server 138 processing a next queued event from the list of unprocessed events, ordered by time stamp, for a remote device 100n. The process then moves to step 824. Step 824 depicts database server 138 determining whether a synthetic event, which is created by database server 138, is needed in response to the processing of the event in step 822. If database server 138 determines that no synthetic event is needed in response to the processing of the event in step 822, then the process proceeds to step 826, which illustrates database server 138 marking the event processed in step 822 as processed. The process then returns to step 818, which is described above.

Returning to step 824, if database server 138 determines that a synthetic event is needed in response to the processing of the event in step 822, then the process next moves to step 828. Step 828 depicts database server 138 generating a synthetic event. The process then returns to step 826, which is described above.

Figure 9:
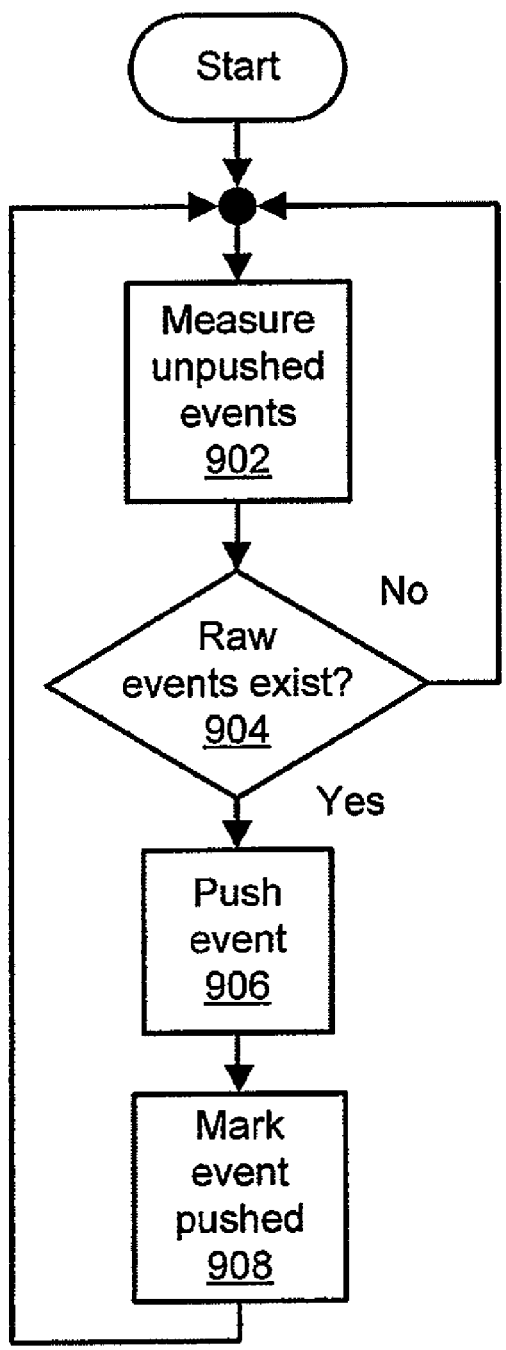
FIG. 9 illustrates a flowchart of a process for a priority push in accordance with one embodiment of the present invention.

Referring now to FIG. 9, a flowchart of a process for a priority push in accordance with one embodiment of the present invention is illustrated. A priority push exists when an event is pushed ahead of processing. After starting, the process proceeds to step 902, which illustrates database server 138 measuring unprocessed unpushed events. The process next moves to step 904. Step 904 depicts database server 138 determining whether raw events exist. If database server 138 determines that no raw events, which are both unpushed and unprocessed, exist, then the process returns to step 902, which is described above.

Returning to step 904, if database server 138 determines that raw events exist, then the process proceeds to step 906. Step 906 illustrates database server 138 pushing an event by calling the record_gps_event function described above with respect to the application interface of master database 202. In one embodiment, pushing an event includes normalizing the event data from a device-specific format to a standardized format compatible with the functions, such as record_gps_event, of master database 202. The function record_gps_event records a GPS event, such as the movement of an asset, in master database 202. The new event's identifier (e.g., gps_event_id) is returned so that the event can be referenced in future. The process next moves to step 908, which depicts database server 138 marking the event as pushed. The process then returns to step 902, which is described above.

Figure 10:
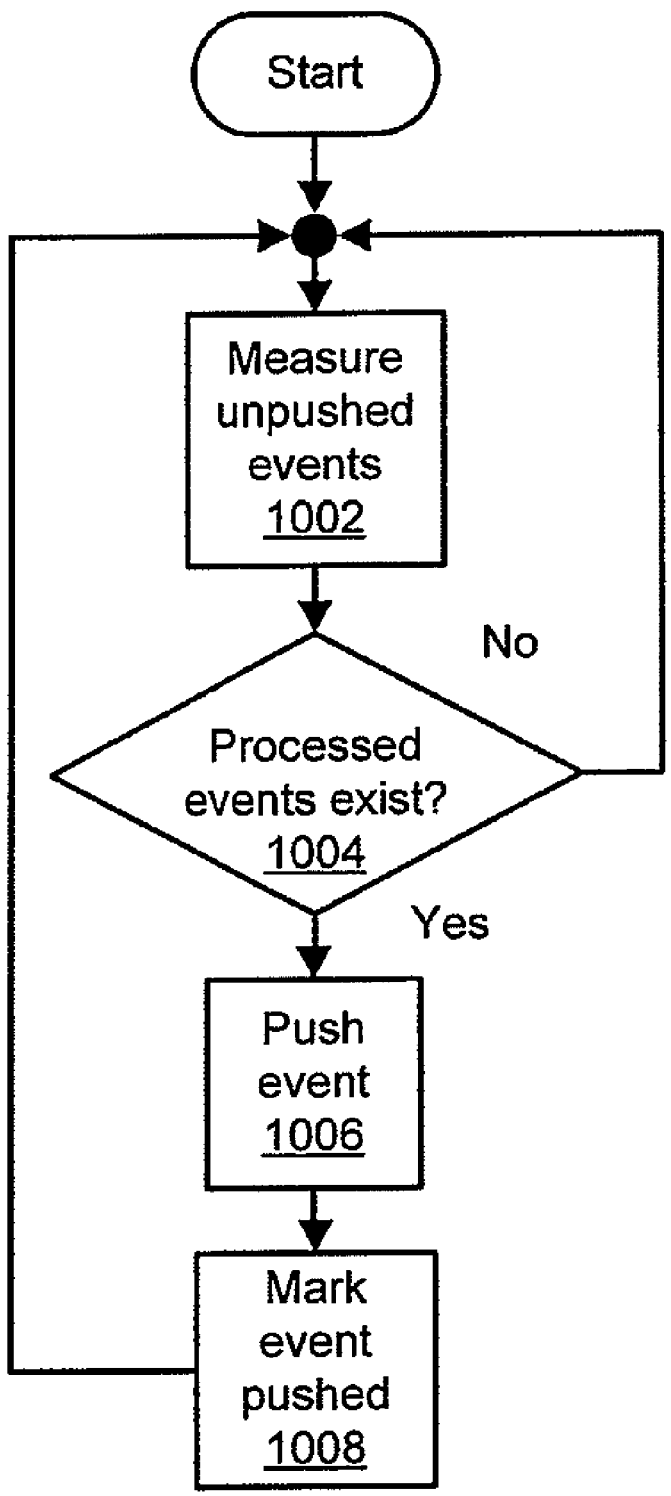
FIG. 10 depicts a flowchart of a process for push of processed events in accordance with one embodiment of the present invention.

Turning now to FIG. 10, a flowchart of a process for push of processed events in accordance with one embodiment of the present invention, is depicted. After starting, the process proceeds to step 1002, which illustrates database server 138 measuring processed unpushed events. The process next moves to step 1004. Step 1004 depicts database server 138 determining whether processed unpushed events exist. If database server 138 determines that no processed unpushed events exist, then the process returns to step 1002, which is described above.

Returning to step 1004, if database server 138 determines that processed unpushed events exist, then the process proceeds to step 1006. Step 1006 illustrates database server 138 pushing a processed event by calling, responsive to the content of the event, one or more of the add_event_to_trip, update_trip, update_meter, and create_trip functions described above. In one embodiment, pushing an event includes normalizing the event data from a device-specific format to a standardized format compatible with the functions, such as add_event_to_trip, update_trip, update_meter, and create_trip, of master database 202. Function add_event_to_trip allows for creation of an association between a gps_event data structure (which records a location-linked event) and a gps_trip data structure (which records a group of gps_event variables) in master database 202. Function update_trip updates a gps_trip data structure in master database 202 to set an end timestamp, meter totals, and other parameters. Function update_meter updates a meter reading in master database 202 by specifying meter, asset, and device types. Function create_trip creates a new trip data structure in master database 202. The process next moves to step 1008, which depicts database server 138 marking the event as pushed. The process then returns to step 1002, which is described above.

Figure 11:
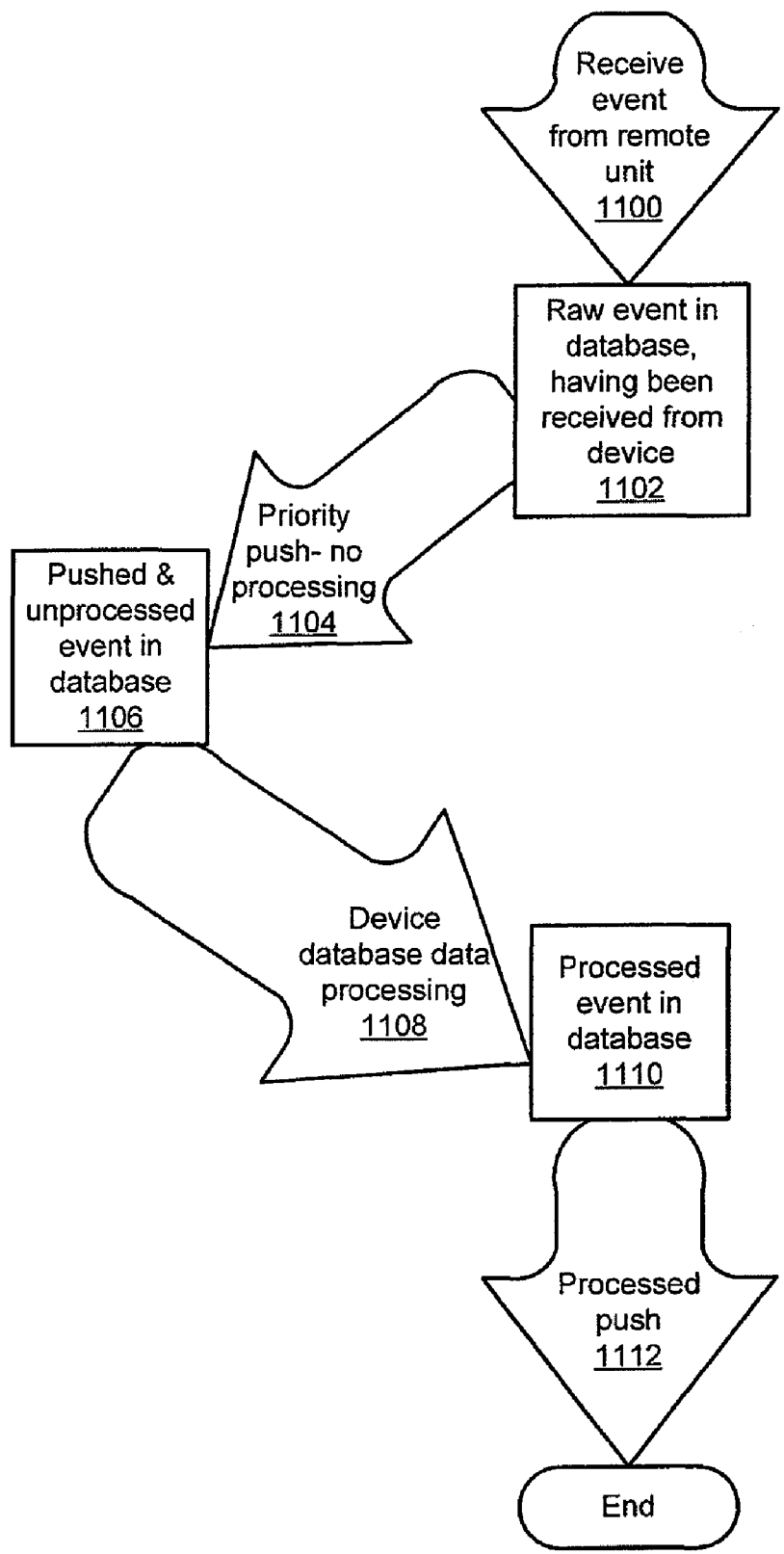
FIG. 11 illustrates a lifecycle diagram for an event in accordance with one embodiment of the present invention.

Referring now to FIG. 11, a lifecycle diagram for an event in accordance with one embodiment of the present invention is illustrated. The process depicted in FIG. 11 illustrates the handling of a message consistent with steps 406-410 above, as viewed from the perspective of the data being processed. In one embodiment, the lifecycle begins at step 1100, when an event from one of remote devices 100a-100n is received in one of device-specific databases 200a-200n. After the event is received and entered in one of device-specific databases 200a-200n from one of remote devices 100a-100n, a raw event 1102 exists in device-specific database 200n, having been received from remote devices 100a. The lifecycle then proceeds through step 1104, which depicts a priority push operation with no processing on priority push engine 210. After the use of priority push engine 210, a pushed and unprocessed event 1106 exists in device-specific database 200*n*. The lifecycle next moves through step 1108. Step 1108 illustrates device-specific database 200*n* performing data processing. After data processing, a processed event 1110 exists in device-specific database 200*n*. The lifecycle then proceeds through step 1112, which depicts a processed push operation with no processing on processed push engine 212. The event lifecycle then ends.

Figure 12:
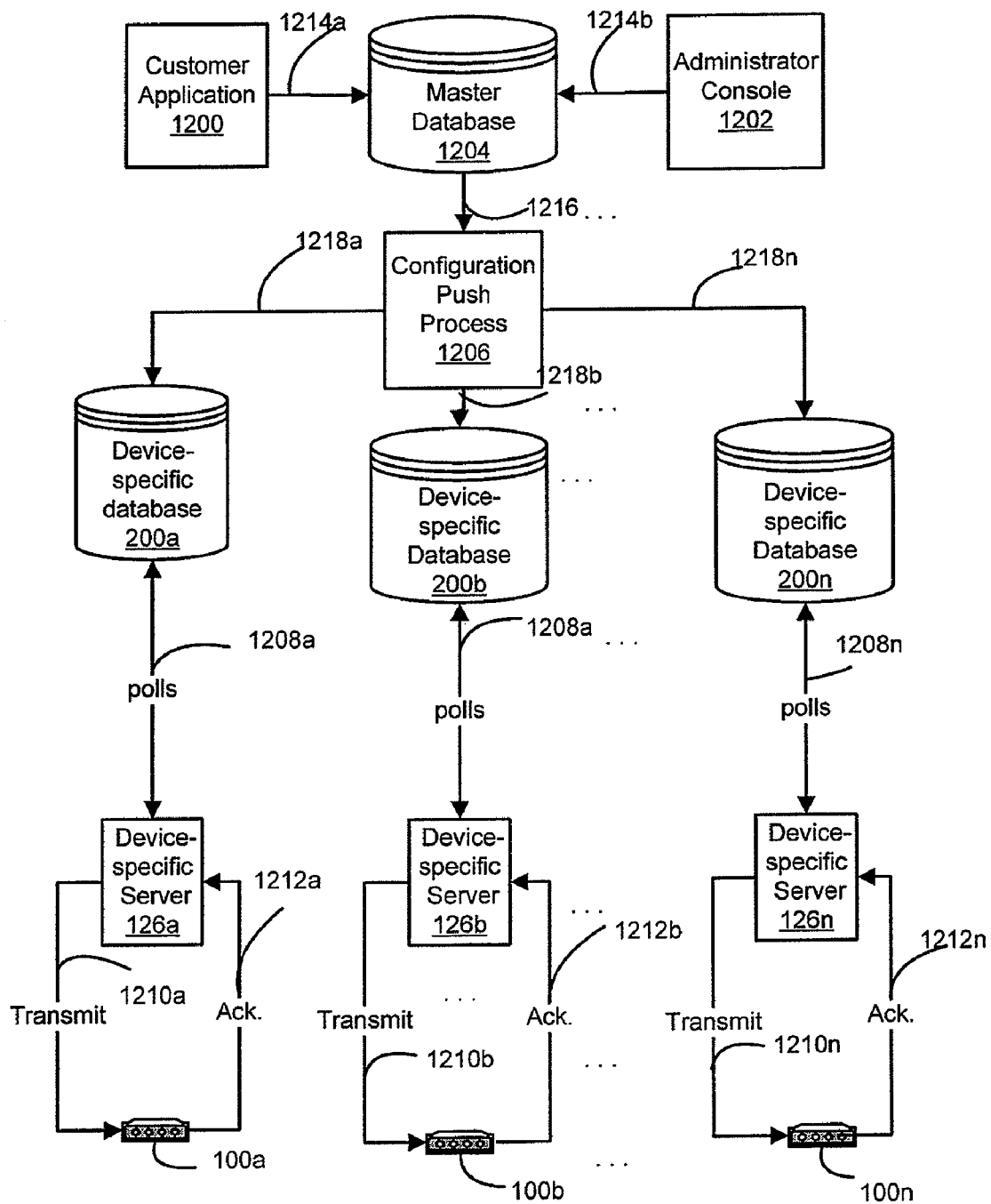
FIG. 12 depicts a component diagram for a process for information backflow in accordance with one embodiment of the present invention.

Turning now to FIG. 12, a component diagram for information backflow in accordance with one embodiment of the present invention is depicted. A customer application 1200 or an administrator console 1202 running on, for example, terminal 128 sends application-level instructions 1214*a*-1214*b* to master database 1204 on database server 138. Application-level instructions can, for example, configure remote devices 100*a*-100*n*, or a specific one of them, to transmit an alert if the speed of a vehicle exceeds a fixed velocity for a fixed length of time. Master database 1204 on database server 138 then processes application-level instructions 1214*a*-1214*b* to generate database-level instructions 1216, which database server 138 sends to a configuration push process 1206, which typically executes on data conversion server 130. Configuration push process 1206 on data conversion server 130 then transmits device database instructions 1218*a*-1218*n* to each of device-specific databases 200*a*-200*n*. In one embodiment, device-specific databases 200*a*-200*n* establish polls 1208*a*-1208*n* for regular bi-directional communication with device-specific servers 126*a*-126*n* and device server instructions, derived from device database instructions 1218*a*-1218*n* are sent to device-specific servers 126*a*-126*n* using polls 1208*a*-1208*n*. One skilled in the art will, in light of the present disclosure, realize that alternatives to polls, such as heartbeat messages, may also be used. Device-specific servers 126*a*-126*n* transmit remote device instructions 1210*a*-1210*n* to remote devices 100*a*-100*n*, which receive the device instructions 1210*a*-1210*n* and respond with acknowledgements 1212*a*-1212*n*.

Figure 13:
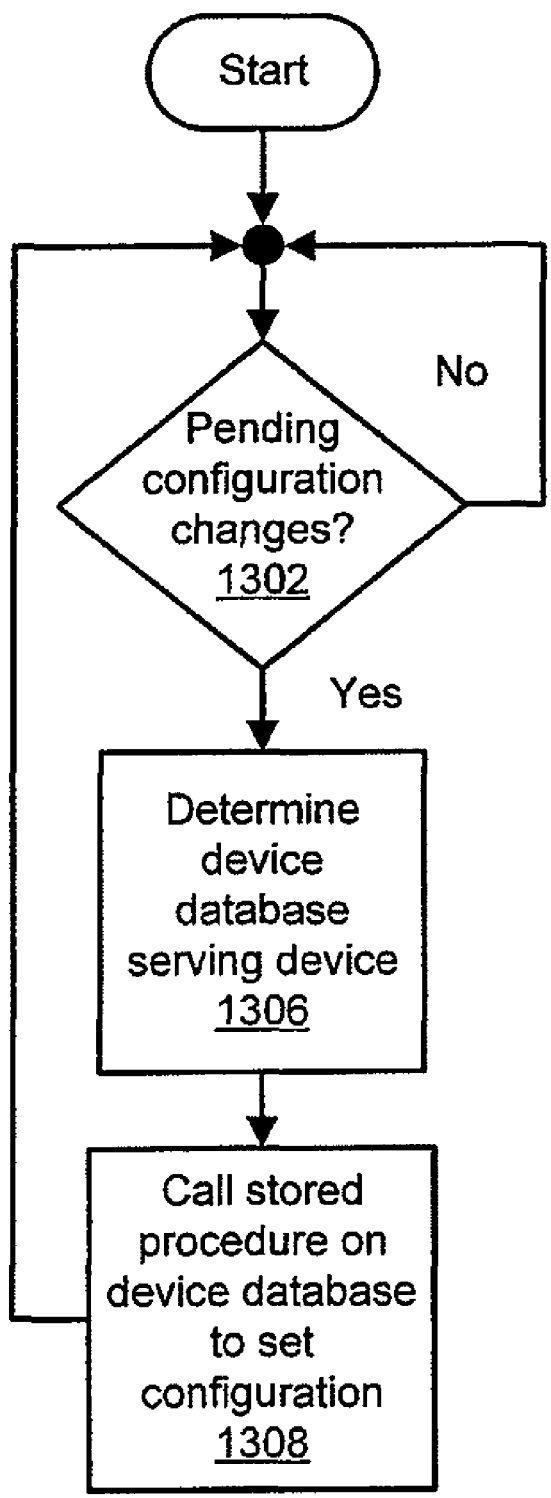
FIG. 13 illustrates a flowchart of a process for information configuration push during instruction backflow in accordance with one embodiment of the present invention.

Embodiments of the present invention can additionally provide for a flow of instructions from master database 202 to remote devices 100*a*-100*n* through instruction backflow. Referring now to FIG. 13, a flowchart of a process for information configuration push during instruction backflow in accordance with one embodiment of the present invention is illustrated. After starting, the process proceeds to step 1302, which depicts configuration push process 1206 on data conversion server 130 determining whether pending configuration changes have been received in database-level instructions 1216 from master database 138. If configuration push process 1206 on data conversion server 130 determines that no pending configuration changes have been received in database-level instructions 1216 from master database 138, then the process next returns to step 1302, which is described above.

Returning to step 1302, data conversion server 130 determines that pending configuration changes have been received in database-level instructions 1216 from master database 138, then the process proceeds to step 1306, which illustrates configuration push process 1206 on data conversion server 130 determining which of device-specific databases 200*a*-200*n* serves the remote device 100*n* to which pending configuration changes in database-level instructions 1216 apply. The process next moves to step 1308. Step 1308 depicts configuration push process 1206 on data conversion server 130 calling a stored procedure on a device-specific database 200*n* to set a configuration in accordance with pending configuration changes in database-level instructions 1216. The process then returns to step 1302, which is described above.

Figure 14:
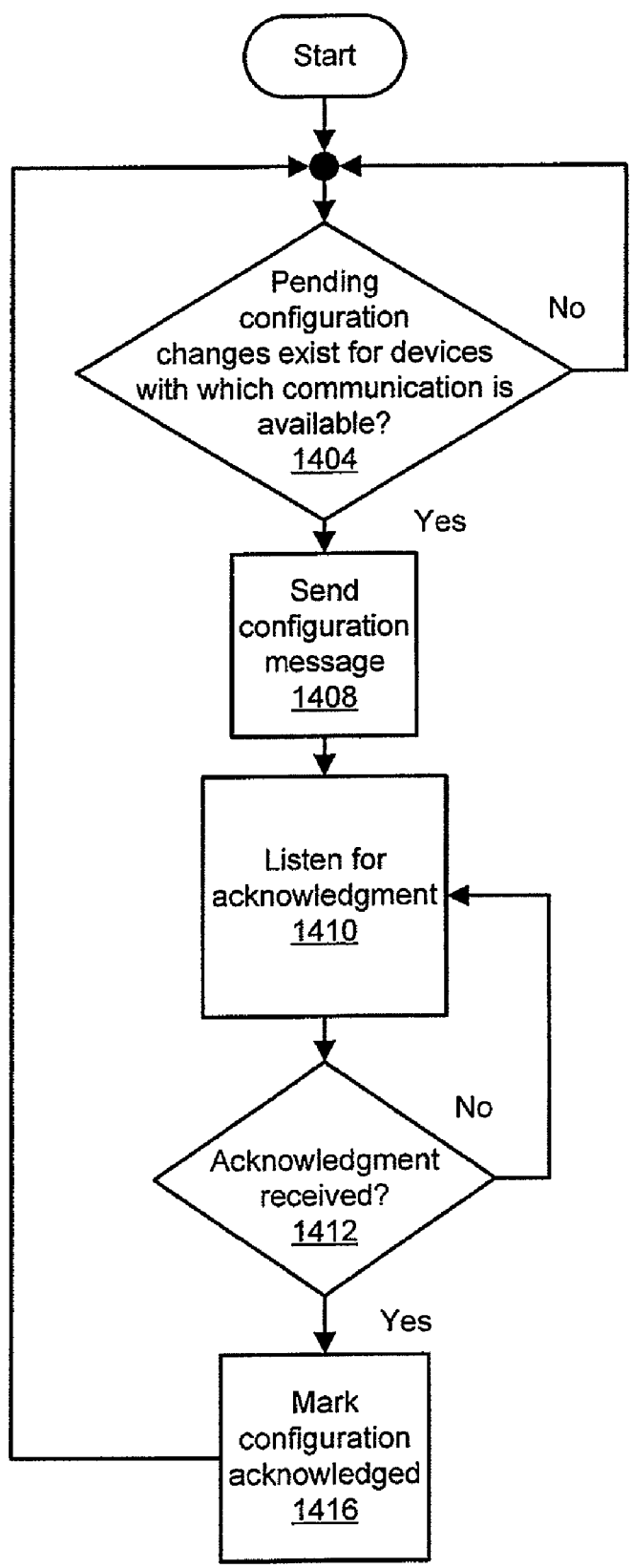
FIG. 14 depicts a flowchart of a process for instruction backflow in accordance with one embodiment of the present invention.

Turning now to FIG. 14, a process for instruction backflow is depicted. The process depicted with respect to FIG. 14 provides one embodiment of several aspects of the communication behavior of embodiments of the present invention in transmitting information to remote devices 100*a*-100*n*, though one skilled in the art will quickly realize that steps may be added to, removed from, or substituted into the process described in FIG. 14. After starting, the process proceeds to step 1402, which depicts device-specific server 126*n* determining whether a configuration change exists for a remote device 100*n* with which polls 1212*n* indicate that communication is available. If device-specific server 126*n* determines that no configuration change exists for a remote device 100*n* with which polls 1212*n* indicate that communication is available, then the process returns to step 1404, which is described above. Returning to step 1404, if device-specific server 126*n* determines that a configuration change exists for a remote device 100*n* with which polls 1212*n* indicate that communication is available, then the process proceeds to step 1408, which depicts device-specific server 126*n* transmitting remote device instructions 1210*n* to remote device 100*n*. The process next moves to step 1408.

Step 1408 illustrates device-specific server 126*n* listening for an acknowledgement 1212*n* from remote device 100*n*. The process then proceeds to step 1412, which depicts device-specific server 126*n* determining whether an acknowledgment 1212*n* from remote device 100*n* was received. If device-specific server 126*n* determines that no acknowledgment 1212*n* from remote device 100*n* was received, the process then returns to step 1410, which is described above. Returning to step 1412, if device-specific server 126*n* determines that an acknowledgment 1212*n* from remote device 100*n* was received, then the process proceeds to step 1416, which depicts device-specific server 126*n* marking the configuration change sent in remote device instructions 1210*n* as acknowledged. The process next returns to step 1404 which is described above.

Figure 15:
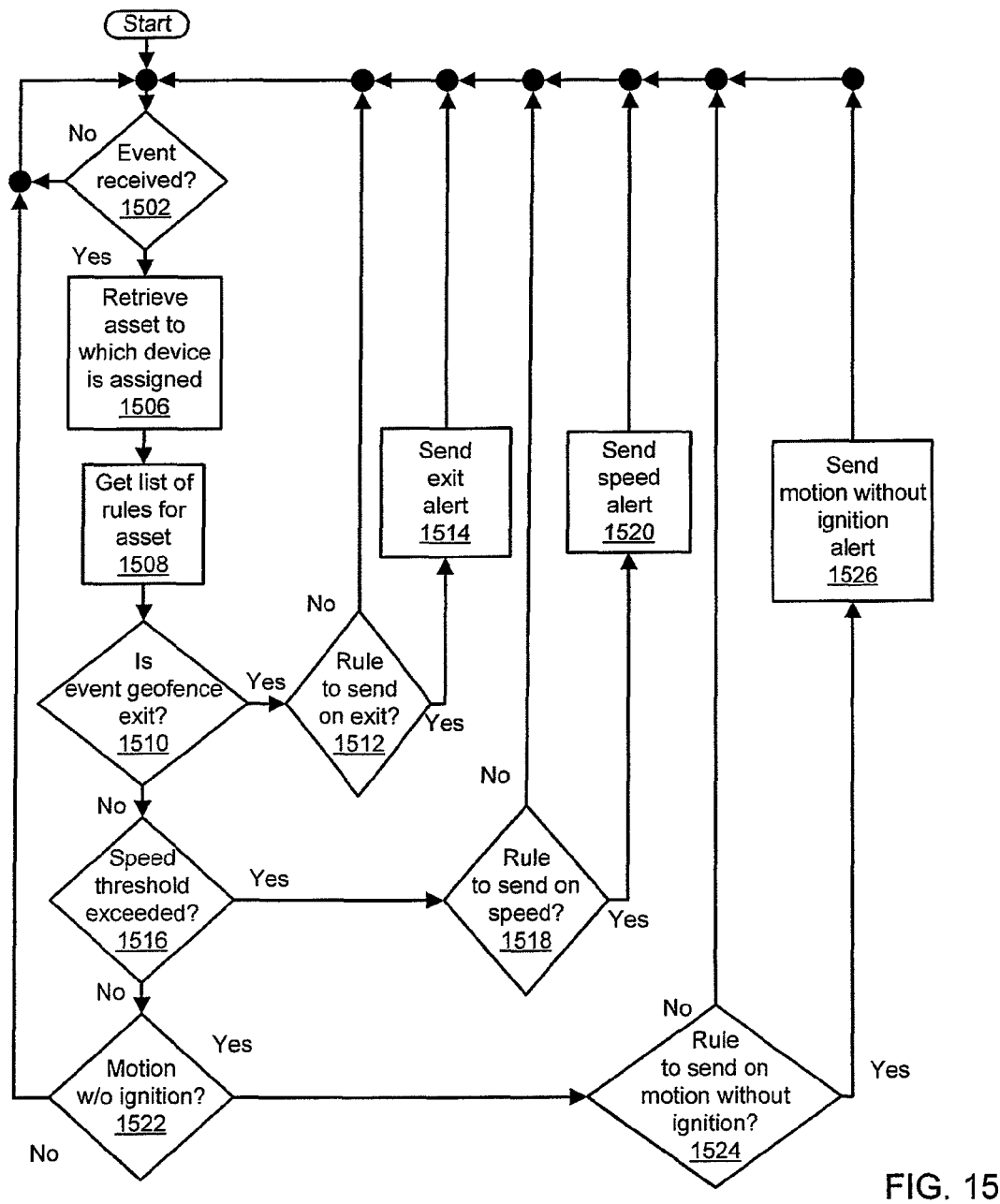
FIG. 15 illustrates a flowchart of an alerts engine in accordance with one embodiment of the present invention.

Referring now to FIG. 15, a flowchart of an alerts engine in accordance with one embodiment of the present invention is illustrated. The process of FIG. 15 illustrates an embodiment of the event reporting of step 412 above. The alerts described with respect to FIG. 15 are exemplary in nature, and one skilled in the art will realize, in light of the present specification, that alternative alerts may be implemented using similar location-based rules. After starting, the process proceeds to step 1502, which illustrates database server 138 containing master database 202 determining whether an event, which is an item of data, was received from one of remote devices 100*a*-100*n*. If database server 138 determines that an event was received from one of remote devices 100*a*-100*n*, then the process proceeds to step 1506, which depicts database server 138 retrieving an asset to which the remote device 100*n* from which the event was received is assigned. The process next moves to step 1508. Step 1508 illustrates database server 138 retrieving a list of rules, which are location-based rules, for the asset to which the remote device 100*n* from which the event was received is assigned.

The process then proceeds to step 1510, which depicts database server 138 determining whether a geofence exit event has been received. A geofence exit event occurs when an item of data representing the location of remote device 100*n* transitions outside of a list of location parameters set by a user. If database server 138 determines that a geofence exit event has been received, the process then next moves to step

1512. Step 1512 illustrates database server 138 determining whether a rule requires the sending of an alert for the exit event detected. If database server 138 determines that no rule requires the sending of an alert for the exit event detected, then the process returns to step 1502, which is described above. If, however, in step 1512, database server 138 determines that a rule requires the sending of an alert for the exit event detected, then the process proceeds to step 1514, which depicts database server 138 sending an exit alert to a user at terminal 128 or directly to display unit 314 on remote device 100*n*. The process then returns to step 1502, which is described above. In alternative embodiments, exit alerts can be sent via SMS, email, or phone calls, depending on the configuration of data conversion server 130 deployed in the alternative embodiment. Returning to step 1510, if database server 138 determines that a geofence exit event has not been received, the process then next moves to step 1516.

Step 1516 illustrates database server 138 making a determination as to whether a speed threshold has been exceeded. A speed threshold has been exceeded when data including the location of remote device 100*n* is determined by comparison to a rule to have changed during a fixed period by an amount exceeding parameters set by a user. If database server 138 determines that a speed threshold has been exceeded, the process then next moves to step 1518. In alternative embodiments, alerts can also be generated from the remote device 100*n* on the basis of the programming of remote device 100*n*, and database server 138 can be programmed to immediately recognize an alert as a speed alert. Step 1518 illustrates database server 138 determining whether a rule requires the sending of an alert for speed threshold that has been exceeded. If database server 138 determines that no rule requires the sending of an alert for the speed threshold that has been exceeded, then the process returns to step 1502, which is described above. If, however, in step 1518, database server 138 determines that a rule requires the sending of an alert for the speed threshold that has been exceeded, then the process proceeds to step 1520, which depicts database server 138 sending a speed alert to a user at terminal 128 or directly to display unit 314 on remote device 100*n*. The process then returns to step 1502, which is described above. In alternative embodiments, speed alerts can be sent via SMS, email, or phone calls, depending on the configuration of data conversion server 130 deployed in the alternative embodiment. Returning to step 1516, if database server 138 determines that a speed threshold has not been exceeded, the process then next moves to step 1522.

Step 1522 illustrates database server 138 determining whether a remote device 100*n* is in motion without engine ignition. If database server 138 determines that remote device 100*n* is in motion without engine ignition, the process then next moves to step 1524. In alternative embodiments, alerts can also be generated from the remote device 100*n* on the basis of the programming of remote device 100*n*, and database server 138 can be programmed to immediately recognize an alert as an ignition alert. Step 1524 illustrates database server 138 determining whether a rule requires the sending of an alert for remote device 100*n* in motion without engine ignition. If database server 138 determines that no rule requires the sending of an alert for remote device 100*n* in motion without engine ignition, then the process returns to step 1502, which is described above. If, however, in step 1524, database server 138 determines that a rule requires the sending of an alert for remote device 100*n* in motion without engine ignition, then the process proceeds to step 1526, which depicts database server 138 sending an alert to the effect that remote device 100*n* is in motion without engine ignition to a user at terminal 128 or directly to display unit 314 on remote device 100*n*. The process then returns to step 1502, which is described above. In alternative embodiments, motion without ignition alerts can be sent via SMS, email, or phone calls, depending on the configuration of data conversion server 130 deployed in the alternative embodiment. Returning to step 1522, if database server 138 determines that remote device 100*n* is not in motion without engine ignition, the process then next moves to step 1502, which is described above.

The present alerts engine is depicted in FIG. 15 with respect to a set of three exemplary rules for an exit event, a speed alert and a notification of motion without engine ignition. One skilled in the art will quickly realize, in light of the present disclosure, that a wide range of rules (e.g., ignition outside of allowed times, motion outside of allowed times, and the like) can be implemented as part of the alerts engine depicted in FIG. 15.

Figure 16:
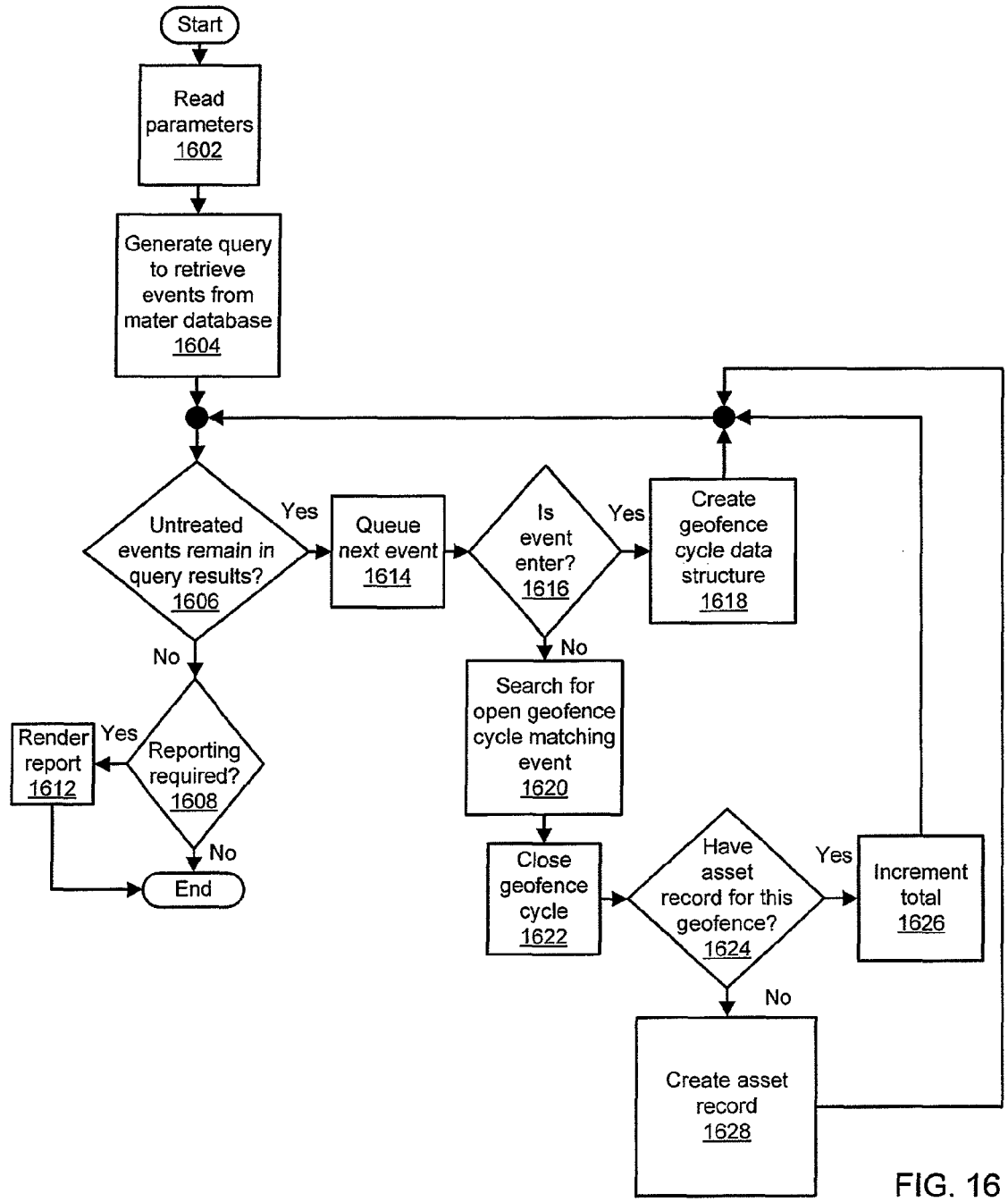
FIG. 16 depicts a flowchart of a process for generating a geofence report in accordance with one embodiment of the present invention.

Turning now to FIG. 16, a flowchart of a process for generating a geofence report in accordance with one embodiment of the present invention is depicted. The process of FIG. 16 illustrates an embodiment of the event reporting of step 412 above. After starting, the process proceeds to step 1602, which depicts database server 138 containing master database 202 reading a set of parameters, e.g., a list of assets, a list of geofences, or a date range. The process next moves to step 1604. Step 1604 illustrates database server 138 generating a query, e.g., in SQL, to retrieve events from master database 202, where events contain fields such as, e.g., asset_id, geofence_id, event_type (such as enter or exit) and timestamp. The process then proceeds to step 1606, which illustrates database server 138 determining whether untreated events remain in the results of the query generated in step 1604. If database server 138 determines that no untreated events remain in the results of the query generated in step 1604, then the process next moves to step 1608. Step 1608 illustrates database server 138 determining whether reporting is required. If database server 138 determines that no reporting is required, then the process ends. If database server 138 determines that reporting is required, then the process proceeds to step 1612, which illustrates database server 138 rendering a report. The process then ends.

Returning to step 1606, if database server 138 determines that untreated events remain in the results of the query generated in step 1604, then the process next moves to step 1614. Step 1614 illustrates database server 138 queuing a next untreated event. The process then proceeds to step 1616, which illustrates database server 138 determining whether the event queued in step 1614 is an entrance to a geofence perimeter. If database server 138 determines that the event queued in step 1614 is an entrance to a geofence perimeter, the process next moves to step 1618. Step 1618 depicts database server 138 creating a geofence cycle data structure containing fields such as, e.g., asset_id for recording an asset with which the geofence cycle data structure is associated, geofence_id for recording a geofence with which the geofence cycle data structure is associated, enter_time for recording the time that the asset recorded in the asset_id field entered the geofence recorded in the geofence_id field, and exit_time for recording the time that the asset recorded in the asset_id field exited the geofence recorded in the geofence_id field. The process then returns to step 1606, which is described above.

Returning to step 1616, if database server 138 determines that the event queued in step 1614 is not an entrance to a geofence perimeter, the process next moves to step 1620. Step 1620 illustrates database server 138 searching for an open geofence cycle matching the event queued in step 1614. The process then proceeds to step 1622, which illustrates database server 138 closing the geofence cycle represented by the event queued in step 1614 by setting its end_time variable to the time associated with the event queued in step 1614. The process next moves to step 1624. Step 1624 illustrates database server 138 determining whether master database 202 contains an asset record for the geofence corresponding to the geofence cycle closed in step 1622. If database server 138 determines that master database 202 contains an asset record for the geofence corresponding to the geofence cycle closed in step 1622, then the process proceeds to step 1626, which depicts database server 138 incrementing a time-within-geofence accumulator variable for the asset record for the geofence corresponding to the geofence cycle closed in step 1622, for instance, incrementing the accumulator variable by the minutes between time exited and time entered. The process then returns to step 1606, which is described above.

Returning to step 1624, database server 138 determines that master database 202 does not contain an asset record for the geofence corresponding to the geofence cycle closed in step 1622, then the process proceeds to step 1628. Step 1628 illustrates database server 138 creating an asset record for the geofence corresponding to the geofence cycle closed in step 1622 by creating an asset record containing an asset_id variable identifying the relevant asset, a geofence_id variable identifying the relevant geofence, and an accumulator variable set to the difference between the exit time and the entrance time for the geofence cycle closed in step 1622. The process then returns to step 1606, which is described above.

Figure 17:
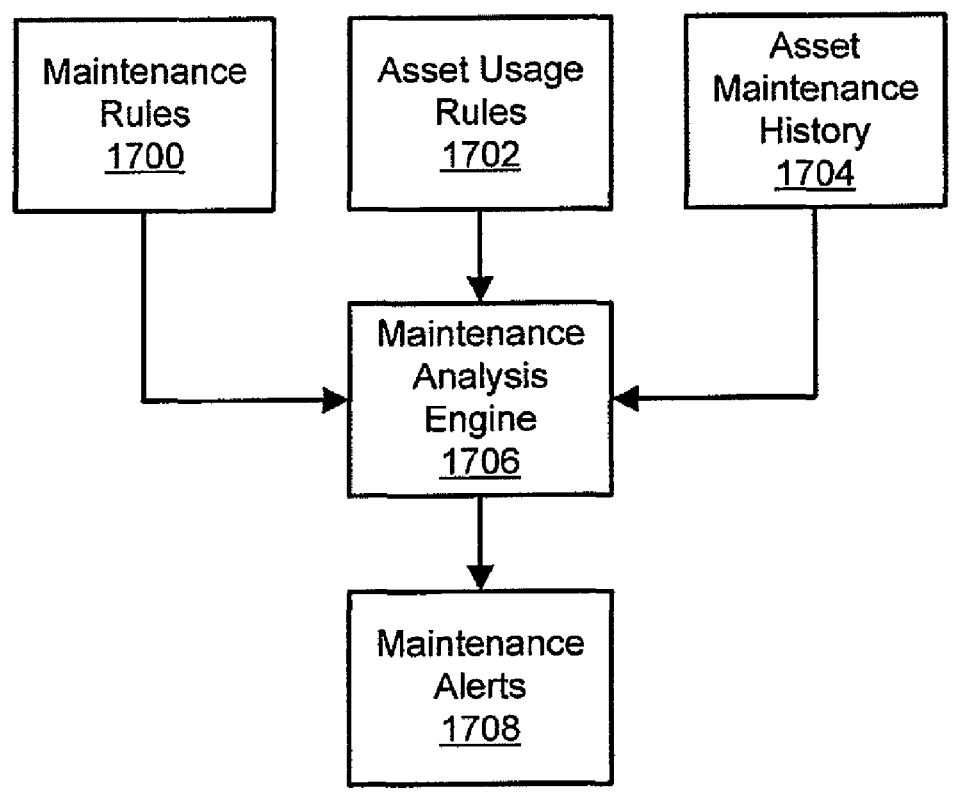
FIG. 17 illustrates a component diagram for providing maintenance alerts in accordance with one embodiment of the present invention.

Referring now to FIG. 17, a component diagram for providing maintenance alerts in accordance with one embodiment of the present invention is illustrated. In one embodiment of the present invention, maintenance rules 1700, asset usage rules 1702 and asset maintenance history 1704 are stored in device-specific databases 200*a*-200*n* or master database 202 and illustrate an embodiment of the means necessary for the reporting of step 412 above. In one non-limiting example of an embodiment of the present invention, asset usage rules 1702 include a derived set of rules modeling an asset's typical usage rates and patterns based on observed data and events. A maintenance analysis engine 1706, which, in one embodiment, is part of master database 202, performs a maintenance analysis by using each of maintenance rules 1700, asset usage rules 1702 and data in asset maintenance history 1704 to generate maintenance alerts 1708, which database server 138 sends to a user at terminal 128 or directly to display unit 314 on remote device 100*n*. In alternative embodiments, asset maintenance alerts 1708 can be sent via SMS, email, or phone calls, depending on the configuration deployed in the alternative embodiment.

Figure 18:
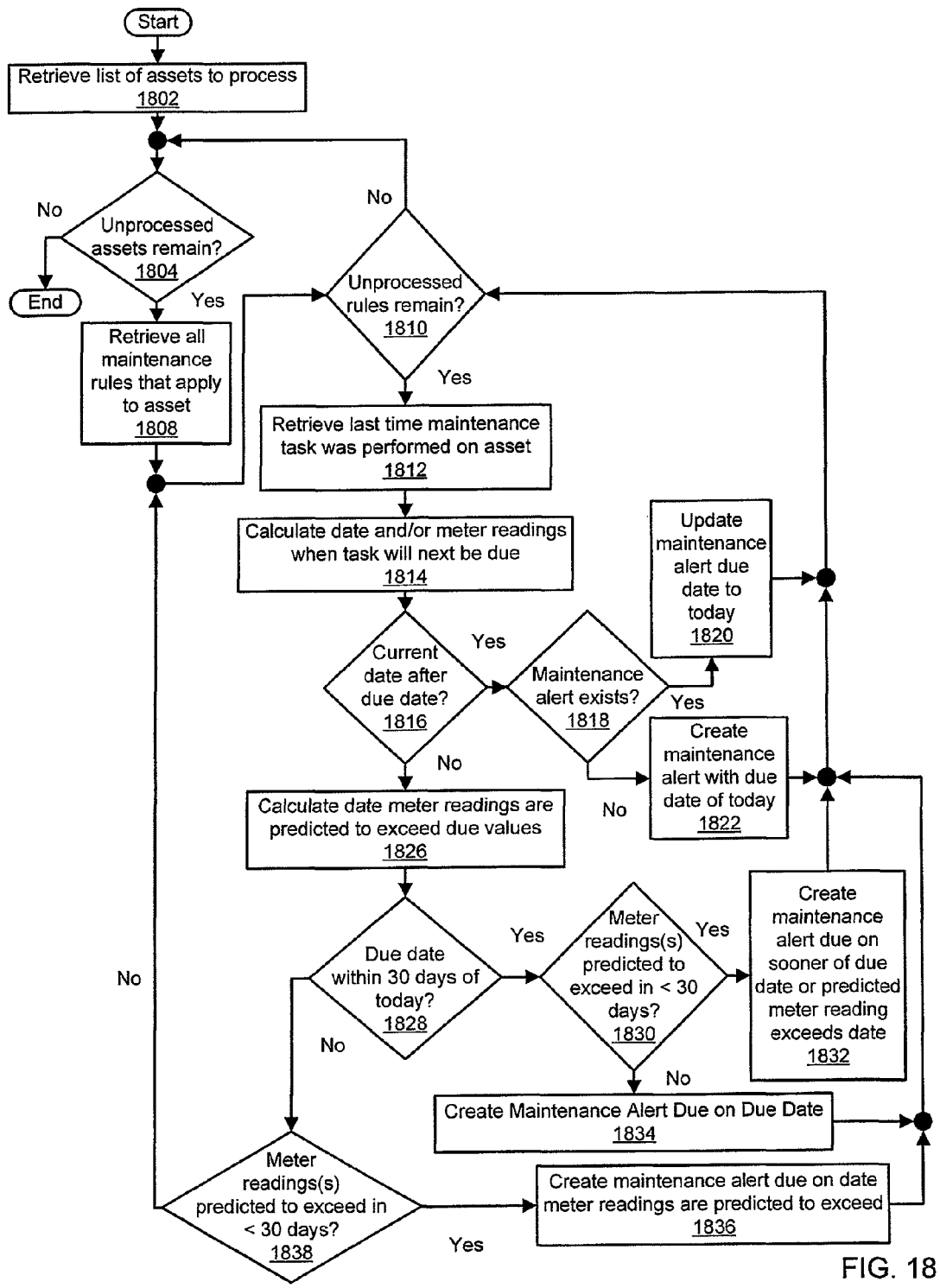
FIG. 18 depicts a flowchart of a process for providing maintenance alerts in accordance with one embodiment of the present invention.

Turning now to FIG. 18, a flowchart of a process for providing maintenance alerts in accordance with one embodiment of the present invention is depicted. The process of FIG. 18 illustrates an embodiment of the event reporting of step 412 above. After starting, the process proceeds to step 1802, which depicts maintenance analysis engine 1706 retrieving a list of assets to process. The process next moves to step 1804. Step 1804 illustrates maintenance analysis engine 1706 determining whether unprocessed assets remain. If maintenance analysis engine 1706 determines that no unprocessed assets remain, then the process ends. If, however maintenance analysis engine 1706 determines that unprocessed assets remain, then the process proceeds to step 1808, which depicts maintenance analysis engine 1706 retrieving from device-specific databases 200*a*-200*n* all maintenance rules that apply to a next unprocessed asset. The process next moves to step 1810. Step 1810 illustrates maintenance analysis engine 1706 determining whether unprocessed maintenance rules remain among the rules selected at step 1808. If maintenance analysis engine 1706 determines that no unprocessed maintenance rules remain among the rules selected at step 1808, then the process returns to step 1804, which is described above.

If, however, maintenance analysis engine 1706 determines that unprocessed maintenance rules remain among the rules selected at step 1808, then the process proceeds to step to step 1812, which illustrates maintenance analysis engine 1706 retrieving from master database 202 a record reflecting a last occasion on which a maintenance task associated with a selected rule was performed on the asset for which rules were retrieved in step 1808. The process next moves to step 1814. Step 1814 illustrates maintenance analysis engine 1706 calculating a date or meter readings associated with the occasion on which the task associated with the selected rule will next be due on the asset for which rules were retrieved in step 1808. The process then proceeds to step 1816, which depicts maintenance analysis engine 1706 determining, through a query of master database 202, whether current date or meter readings are greater than the due date calculated in step 1814. If maintenance analysis engine 1706 determines that current date or meter readings are greater than the due date calculated in step 1814, then the process next moves to step 1818.

Step 1818 illustrates maintenance analysis engine 1706 determining whether a maintenance alert exists for the rule for which retrieval was performed in step 1812. If maintenance analysis engine 1706 determines that a maintenance alert exists for the rule for which retrieval was performed in step 1812, then the process proceeds to step 1820, which depicts maintenance analysis engine 1706 updating to today the due date for the maintenance alert associated with the maintenance rule described in step 1810.

Returning to step 1818, if maintenance analysis engine 1706 determines that a maintenance alert does not exist for the rule for which retrieval was performed in step 1812, then the process proceeds to step 1822. Step 1822 illustrates maintenance analysis engine 1706 creating a maintenance alert with the current date as its due date for the rule for which retrieval was performed in step 1812. The process then returns to step 1810, which is described above.

Returning to step 1816, if maintenance analysis engine 1706 determines that the current date or meter readings are not greater than the due date calculated or meter readings in step 1814, then the process proceeds to step 1826, which depicts maintenance analysis engine 1706 determining a date on which meter readings are predicted to exceed due values. The process next moves to step 1828. Step 1828 illustrates maintenance analysis engine 1706 determining whether the due date calculated in step 1814 is within 30 days of the current date. If maintenance analysis engine 1706 determines that the due date calculated in step 1814 is within 30 days of the current date, then the process proceeds to step 1830, which depicts maintenance analysis engine 1706 determining whether the date on which meter readings are predicted to exceed due values calculated in step 1826 is less than 30 days away. One skilled in the art will recognize that, while in the preferred embodiment discussed above, references are made to 30 day periods, one embodiment will be configurable to allow for periods of different lengths. If maintenance analysis engine 1706 determines that the date on which meter readings are predicted to exceed due values calculated in step 1826 is less than 30 days away, the process next moves to step 1832. Step 1832 illustrates maintenance analysis engine 1706 creating a maintenance alert with a due date on the sooner of the due date used in step 1828 or the date on which meter readings are expected to exceed due values as calculated in step 1826. The process then returns to step 1810, which is described above.

Returning to step 1830, if maintenance analysis engine 1706 determines that the date on which meter readings are predicted to exceed due values calculated in step 1826 is not less than 30 days away, the process next moves to step 1834, which depicts maintenance analysis engine 1706 creating a maintenance alert with a due date on the due date used in step 1828. The process then returns to step 1810, which is described above.

Returning to step 1828, if maintenance analysis engine 1706 determines that the due date calculated in step 1814 is not within 30 days of the current date, then the process next moves to step 1838. Step 1838 depicts maintenance analysis engine 1706 determining whether the date on which meter readings are predicted to exceed due values calculated in step 1826 is less than 30 days away. If maintenance analysis engine 1706 determines that the date on which meter readings are predicted to exceed due values calculated in step 1826 is not less than 30 days away, then the process returns to step 1810, which is described above. If maintenance analysis engine 1706 determines that the date on which meter readings are predicted to exceed due values calculated in step 1826 is less than 30 days away, then the process proceeds to step 1836, which illustrates maintenance analysis engine 1706 creating a maintenance alert with a due date on the due date used in step 1826. The process then returns to step 1810, which is described above.

Figure 19:
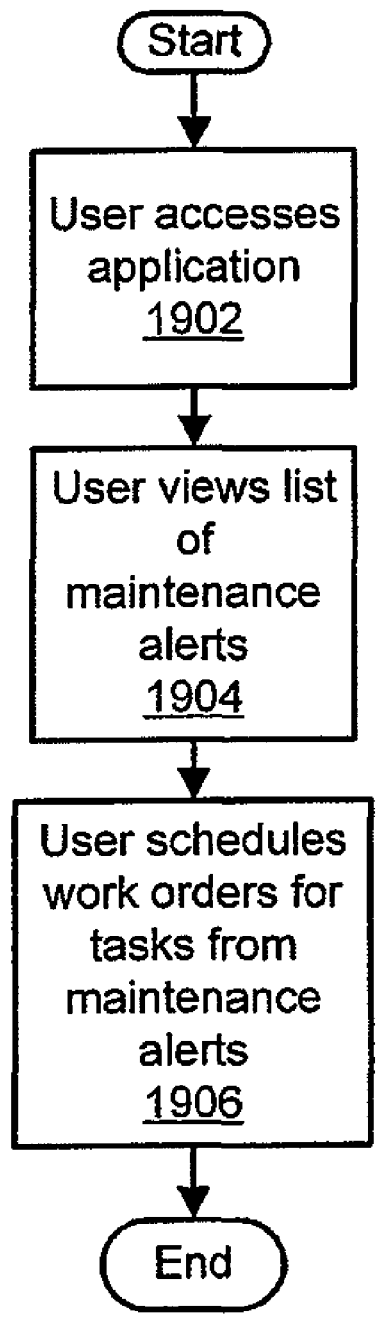
FIG. 19 illustrates a flowchart of a process for use of maintenance alerts in accordance with one embodiment of the present invention.

Referring now to FIG. 19, a flowchart of a process for use of maintenance alerts in accordance with one embodiment of the present invention is illustrated. After starting, the process proceeds to step 1902, which depicts a user accessing a maintenance-alerts-enabled application on terminal 128. The process next moves to step 1904. Step 1904 illustrates a user of a maintenance-alerts enabled application on terminal 128 viewing a list of maintenance alerts provided by maintenance analysis engine 1706. The process then proceeds to step 1906, which depicts a user of a maintenance-alerts enabled application on terminal 128 scheduling work orders for tasks on the basis of one or more maintenance alerts provided by maintenance analysis engine 1706. The process then ends.

Figure 20:
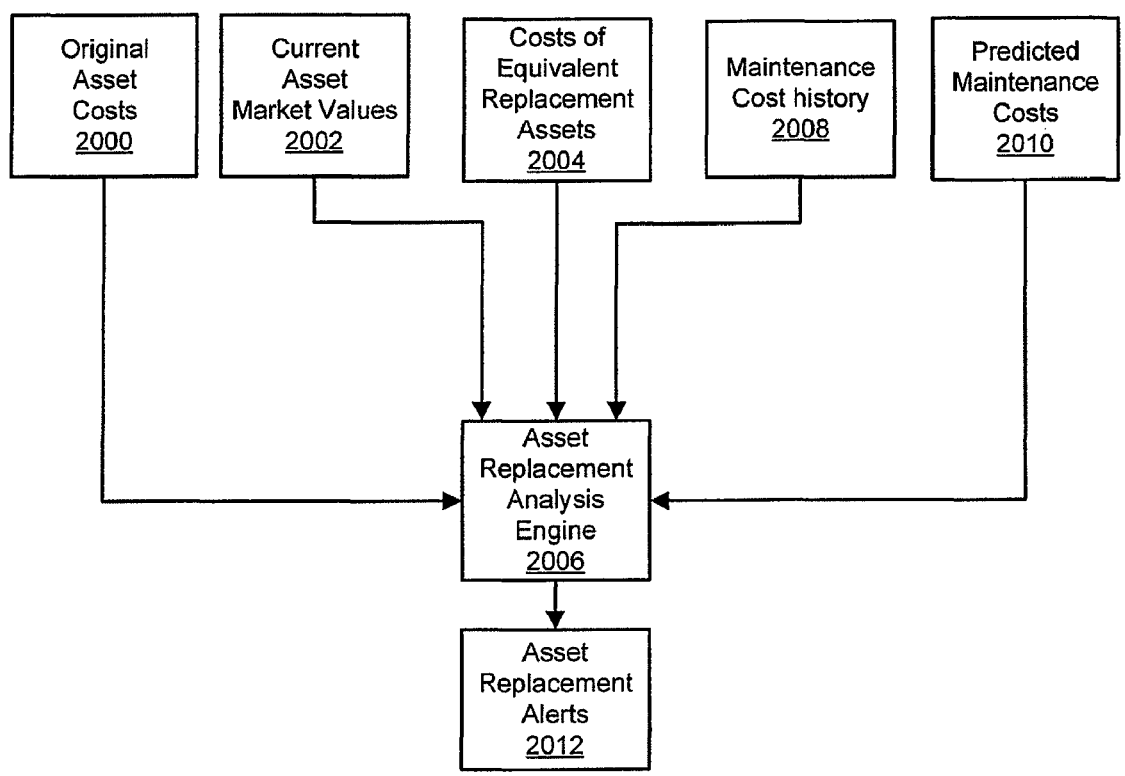
FIG. 20 depicts a component diagram for providing maintenance alerts in accordance with one embodiment of the present invention.

Turning now to FIG. 20, a component diagram for providing maintenance alerts in accordance with one embodiment of the present invention is depicted. In one embodiment of the present invention, original asset costs 2000, current asset market values 2002, costs of equivalent replacement assets 2004, maintenance cost history 2008 and asset maintenance history 2010 are stored in device-specific databases 200a-200n or master database 202 and illustrate an embodiment of the means associated with the reporting of step 412 above. An asset replacement analysis engine 2006, which, in one embodiment, is part of master database 202 (though, in an alternative embodiment, asset replacement analysis engine 2006 can be incorporated into another module) uses each original asset costs 2000, current asset market values 2002, costs of equivalent replacement assets 2004, maintenance cost history 2008 and asset maintenance history 2010 to generate asset replacement alerts 2012, which database server 138 sends to a user at terminal 128 or directly to display unit 314 on remote device 100n. In alternative embodiments, asset replacement alerts 2012 can be sent via SMS, email, or phone calls, depending on the configuration deployed in the alternative embodiment.

Figure 21:
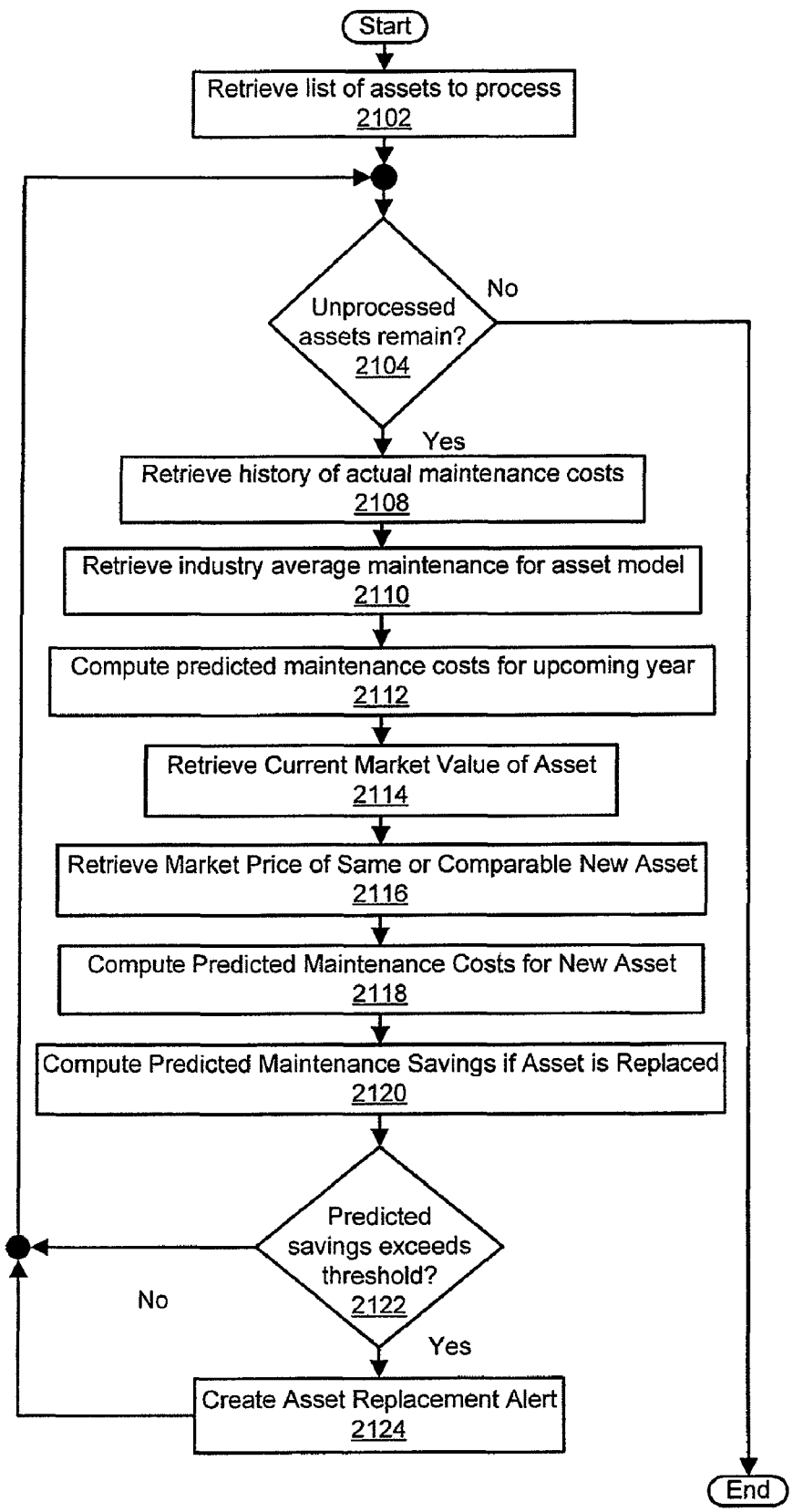
FIG. 21 illustrates a flowchart of a process for providing maintenance alerts in accordance with one embodiment of the present invention.

Referring now to FIG. 21, a flowchart of a process for providing maintenance alerts in accordance with one embodiment of the present invention is illustrated. After starting, the process proceeds to step 2102, which depicts asset replacement analysis engine 2006 retrieving a list of assets to process. The process next moves to step 2104. Step 2104 illustrates asset replacement analysis engine 2006 determining whether unprocessed assets remain. If asset replacement analysis engine 2006 determines that no unprocessed assets remain, then the process ends. If, however asset replacement analysis engine 2006 determines that unprocessed assets remain, then the process proceeds to step 2108, which depicts asset replacement analysis engine 2006 retrieving from master database 202 a history of actual maintenance for a selected asset, which, in one embodiment, is included in maintenance cost history 2008. The process then moves to step 2110. Step 2110 illustrates asset replacement analysis engine 2006 retrieving from master database 202 an industry average maintenance model for a selected asset, which, in one embodiment, is included in predicted maintenance costs 2010.

The process next proceeds to step 2112, which depicts asset replacement analysis engine 2006 calculating predicted maintenance costs for the upcoming year, which, in one embodiment, is calculated based on maintenance cost history 2008 and predicted maintenance costs 2010. While the implementation depicted calculates costs for the upcoming year, one skilled in the art will quickly realize, in light of the present disclosure, that the calculation can be made over any length of time desired. The process next moves to step 2114. Step 2114 illustrates asset replacement analysis engine 2006 retrieving from master database 202 a current market value for the selected asset, which, in one embodiment, is included in current asset market values 2002. The process then proceeds to step 2116, which depicts asset replacement analysis engine 2006 retrieving from master database 202 a market price of a same or comparable replacement asset, which, in one embodiment, is included in cost of equivalent replacement assets 2004. The process next moves to step 2118. Step 2118 illustrates asset replacement analysis engine 2006 calculating predicted maintenance costs for the replacement asset for which acquisition cost was retrieved in step 2116. The process then proceeds to step 2120, which depicts asset replacement analysis engine 2006 calculating a predicted savings to result from asset replacement.

The process then moves to step 2122. Step 2122 illustrates asset replacement analysis engine 2006 determining whether the savings calculated in step 2120 exceeds a user-configurable threshold. If asset replacement analysis engine 2006 determines that the savings calculated in step 2120 does not exceed a user-configurable threshold, then the process returns to step 2104, which is described above. If asset replacement analysis engine 2006 determines that the savings calculated in step 2120 exceeds a user-configurable threshold, then the process proceeds to step 2124, which depicts asset replacement analysis engine 2006 generating an asset replacement alert. The process then returns to step 2104, which is described above.

Figure 22:
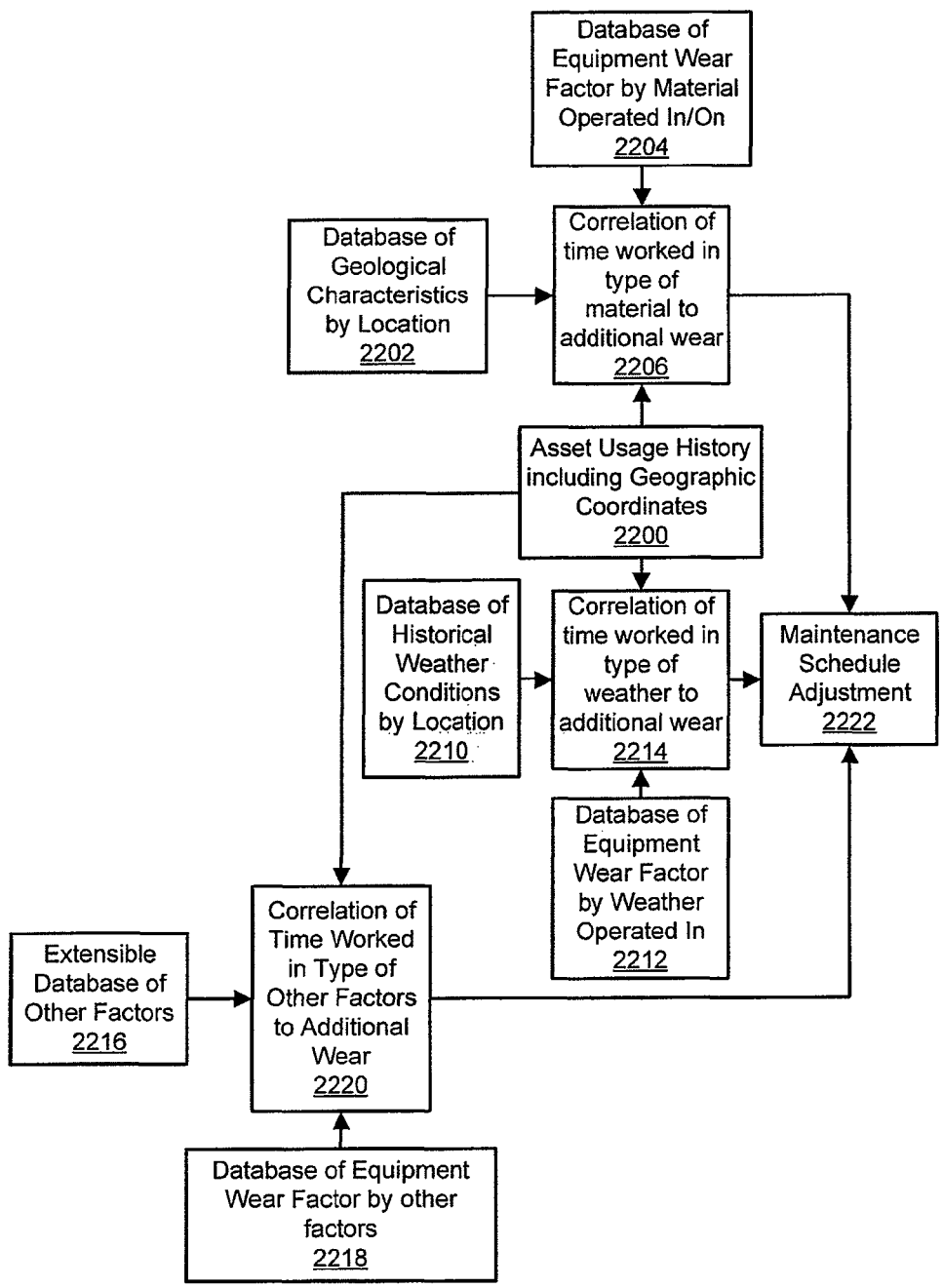
FIG. 22 depicts a component diagram for the calculation of multi-factor compounded maintenance schedules in accordance with one embodiment of the present invention.

Turning now to FIG. 22, a component diagram for the calculation of multi-factor compounded maintenance schedules in accordance with one embodiment of the present invention is depicted. In order to further refine accuracy of the results deliverable by asset replacement analysis engine 2006 and maintenance analysis engine 1706, database server 138 calculates multi-factor compounded maintenance schedules, which illustrate an embodiment of the means associated with the reporting of step 412 above. Database server 138 uses an asset usage history including geographic coordinates 2200 from device-specific databases 200a-200n, a database of geological characteristics by location 2202 within master database 202 and a database of equipment wear factor by material operated in/on 2204 within master database 202 to compute a correlation between time worked in a given type of material and additional wear 2206. Correlation of time worked in type of material to additional wear 2206 allows for prediction of any accelerated maintenance needed by the equipment. Database server 138 also uses asset usage history including geographic coordinates 2200 from device-specific databases 200a-200n with a database of historical weather conditions by location 2210 within master database 202 and a database of equipment wear factor by weather operated in 2212 within master database 202 to calculate a correlation between the time worked in a given type of weather and additional wear 2214. Correlation of time worked in type of weather to additional wear 2214 allows for prediction of any accelerated maintenance needed by the equipment.

Database server 138 also uses asset usage history including geographic coordinates 2200 from device-specific databases 200a-200n with an extensible database of other factors 2216 within master database 202 and a database of equipment wear factor by other factors 2218 within master database 202 to calculate a correlation of time worked in type of other factors to additional wear 2220, where the "other factors" referred to herein are configurable by customer over time and can include, by way of non-limiting example, construction materials and level of demolition required or depth of surface abrasion expected. Other factors considered can vary from those described herein.

Figure 23:
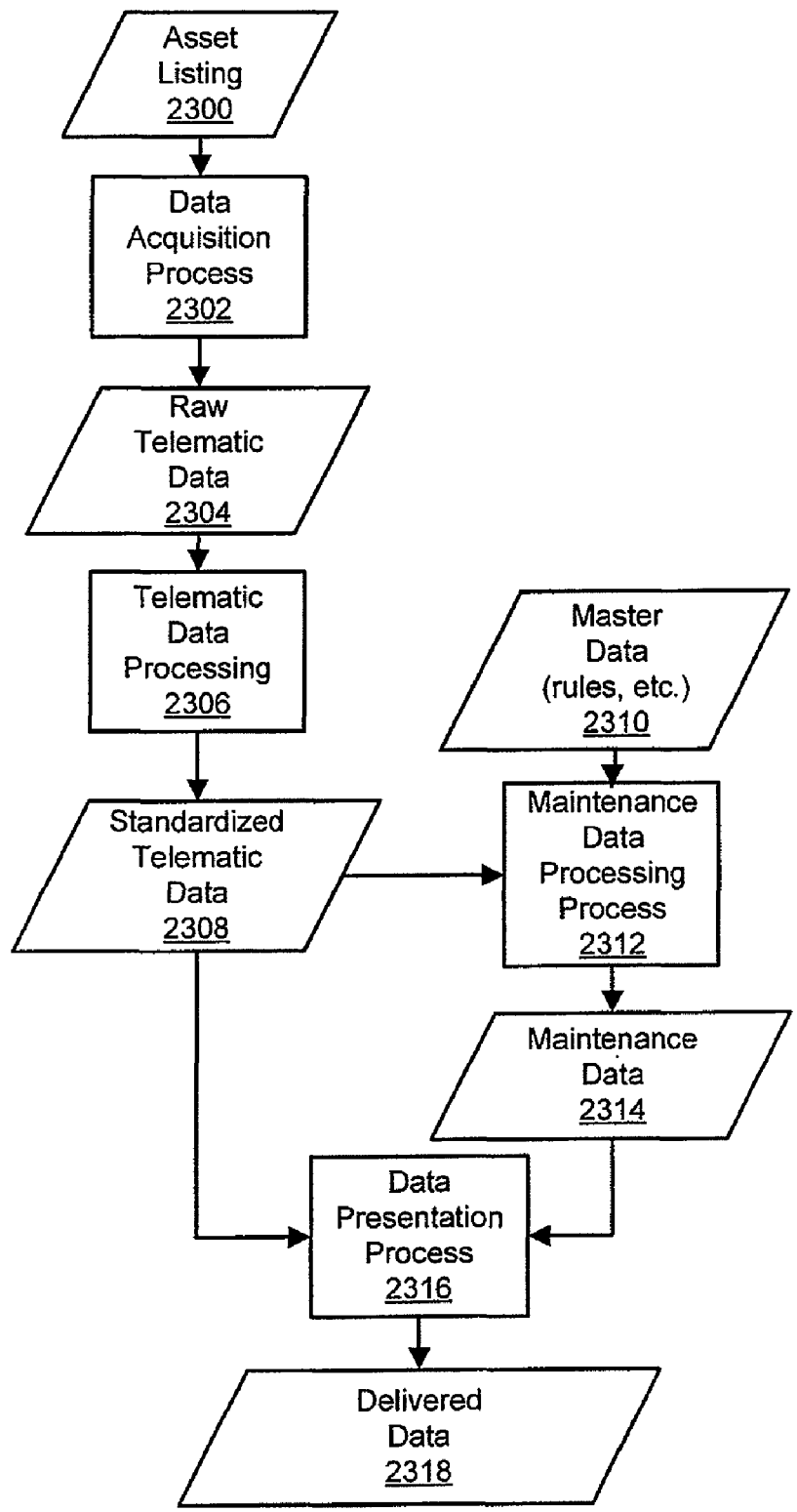
FIG. 23 illustrates an information flow diagram for performing monitoring and management of a mobile equipment fleet, in accordance with one embodiment of the present invention.

Referring now to FIG. 23, an information flow diagram for performing monitoring and management of a mobile equipment fleet, in accordance with one embodiment of the present invention is illustrated. In one embodiment of the present invention, asset listing 2300, which is a data structure for listing assets, is provided to a data acquisition process 2302. Asset listing 2300 can be generated from a database. Referring now to FIG. 2, in one embodiment of the present invention, asset listing 2300 is generated from master database 202 or from a survey of device-specific databases 200a-200n. For instance, referring briefly to FIG. 34A-C, asset listing 2300 can be generated from database entities and functions 3400, which is an assets portion of a database, non-limiting examples of which are illustrated below in the entity relationship diagrams of FIG. 34A-C.

In one embodiment of the present invention, data acquisition process 2302 includes, referring now to FIG. 4, steps 402-406 of FIG. 4. Data acquisition process 2302 can be performed by, in the example of an embodiment depicted in FIG. 1, device servers 126a-126n acting in concert with remote devices 100a-100n through a wide range of communication channels. Communication channels can include, for example, satellite uplink 106 to communications relay satellite 108 and downlink signals 122 to satellite signal receiver 124; medium-range wireless signal 114, such as a Global System for Mobile communications (GSM) network, to base station 116; or short-range radio connection 110, such as a connection complying with one or more of the Institute for Electrical and Electronics Engineers (IEEE) 802.11a/b/g standards, to a data aggregation server 112. Through the wide range of available communication channels described above, data acquisition process 2302 can be executed by a platform-independent manner and receive data from equipment created by a broad range of vendors. Further, a user can provide information directly to data acquisition process 2302 through entry at a terminal 128. Finally, a third-party source, such as a fuel provider, can transmit data to data acquisition process 2302.

Data acquisition process 2302 generates raw telematic data 2304, the format and nature of which is as varied as the range of assets and data inputs described above and includes location and condition information from a variety of sources. Examples of raw telematic data include sensor results and location information from remote device 100n or human-entered data received through terminal 128. Raw telematic data 2304 is then provided to a process of telematic data processing 2306, which normalizes raw telematic data 2304 from its first (native) format to a second (standardized) format to create standardized telematic data 2308. Examples of telematic data processing 2306 include, for example, step 410 of FIG. 4, step 812 of FIG. 8, or step 1008 of FIG. 10.

Standardized telematic data 2308 is then provided to a maintenance data processing process 2312, such as maintenance analysis engine 1706 of FIG. 17, that compares standardized telematic data 2308 to a set of master data 2310, such as maintenance rules 1700 of FIG. 17, containing rules or other relevant data structures and instructions. While maintenance data processing process 2312 is illustrated in FIG. 23, one skilled in the art will quickly realize, in light of the present disclosure, that embodiments of the present invention can be as easily practiced with regard to rules and data automating many aspects of a business, such as employee management, inventory accounting, asset location management, and cost accounting. Examples of alternative embodiments of the present invention include geographical information and geographical rules, such as are, for example, depicted with respect to FIG. 15. Maintenance data processing 2312 compares received data, such as standardized telematic data 2308 to a set of rules, such as maintenance rules 1700 to generate maintenance data 2314, including alerts, which are sent by a data presentation process 2316, such as the process of maintenance alert use portrayed with respect to FIG. 19. Data presentation process 2316 results in delivered data 2318, such as alerts communicated via email or display on terminal 128.

Figure 24:
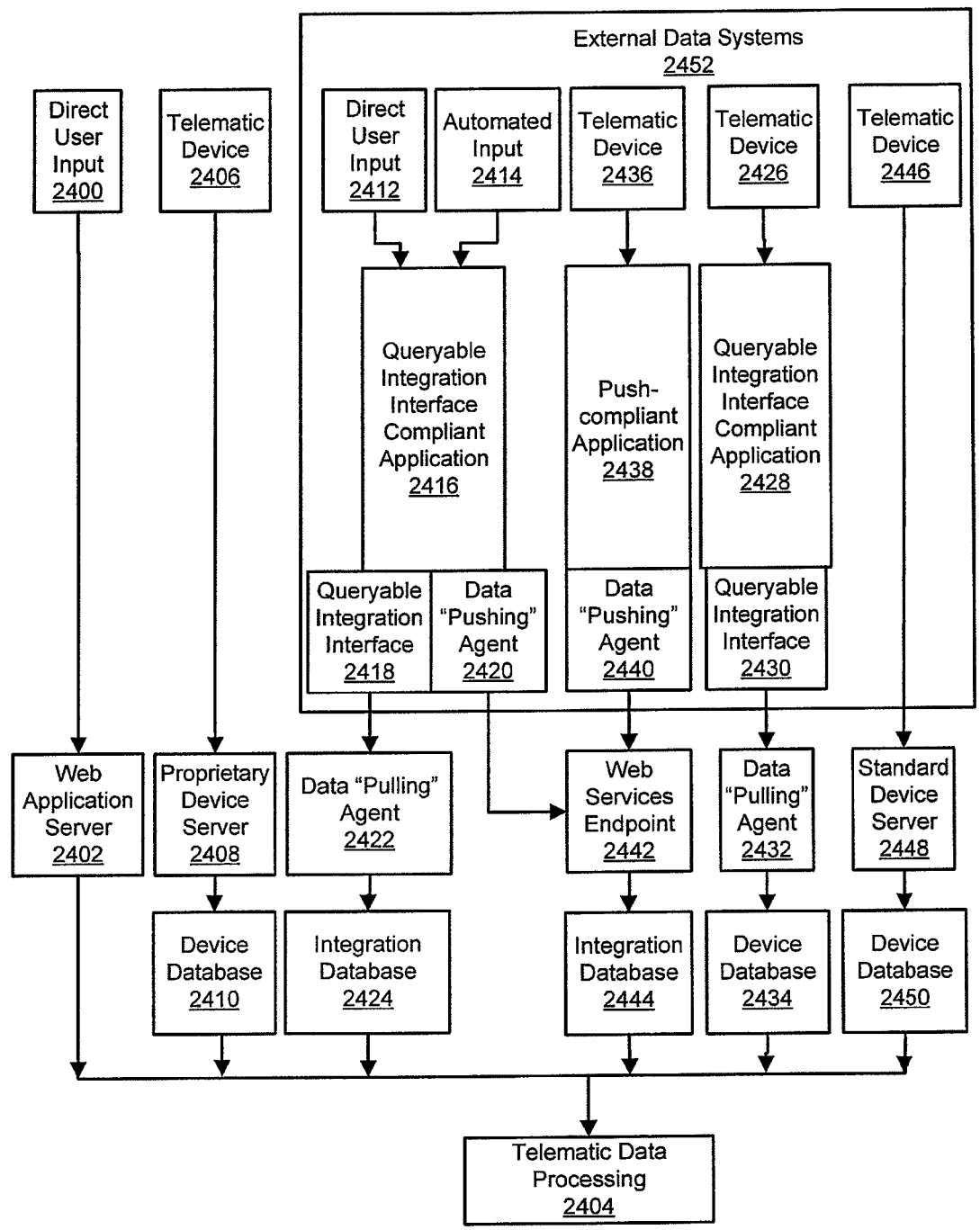
FIG. 24 depicts logical components of a system for acquisition of data to be used in conjunction with monitoring and management of a mobile equipment fleet, in accordance with one embodiment of the present invention.

Turning now to FIG. 24, logical components of a system for acquisition of data to be used in conjunction with monitoring and management of a mobile equipment fleet, in accordance with one embodiment of the present invention are depicted. Note that FIG. 30, described below, provides an embodiment of physical components that can perform the functions of the logical components illustrated in FIG. 24. In one embodiment of the present invention, the logical components displayed in FIG. 24 perform components of data acquisition process 2302 of FIG. 23. Direct user input 2400 can be supplied through a web application server 2402, such as data conversion server 130 of FIG. 1, and transmitted to a system providing telematic data processing 2404. Examples of telematic data processing 2404 include, for example, step 410 of FIG. 4, step 812 of FIG. 8, or step 1008 of FIG. 10. Telematic data processing 2404, which is labeled above with respect to FIG. 23 as telematic data processing 2306, normalizes raw telematic data 2304 received form a variety of sources from its first (native) format to a second (standardized) format to create standardized telematic data 2308.

A telematic device 2406, such as remote unit 100n of FIG. 1, can send data in a highly customized manner. In one embodiment, remote unit 100n can communicate over short-range radio connection 110, such as a connection complying with one or more of the IEEE 802.11a/b/g standards, to a proprietary device server (such as device-specific server 126n or data aggregation server 112) using a proprietary protocol, referred to as a Device Direct Proprietary Protocol (DDPP). Examples DDPPs include protocols used by devices used for remotely monitoring the position of an asset, which are also known as Automatic Vehicle Location (AVL) devices. In such an embodiment, telematic device 2406 sends data to a proprietary device server 2408, which may be implemented as device server 126n of FIG. 1, for communication to a device database 2410, which may be implemented as device-specific database 200b of FIG. 2, and eventual delivery to telematic data processing 2404.

Embodiments of the present invention allow for interoperability with a broad range of external data systems 2452 including processes, applications and devices communicating over standardized interfaces and protocols, which can include proprietary components, third-party components, and/or other components. For example, direct user input 2412, such as input into a business application or a web reporting service can be communicated to a queryable interface compliant application 2416, such as a web service. Similarly, automated input 2414, such as pump data received from a gasoline or water pump at a service station, can be communicated to a queryable interface compliant application 2416. Queryable interface compliant application 2416 can then provide data through a queryable integration interface 2418 to a data pulling agent 2422 for presentation to an integration database 2424, which, in one embodiment, can reside on data conversion server 130 of FIG. 1. Examples of data acquisition using aggregator pull solutions include business applications that store asset-related data such as fuel usage, mileage, or maintenance costs. Similarly, queryable interface compliant application 2416 can deliver data to a web services endpoint 2442 using a data pushing agent 2420. Examples of aggregator push systems include vehicle location service providers.

In one embodiment of an aggregator push solution in accordance with the present invention, a telematic device 2436 can communicate with a push-compliant third-party application 2438, such as a navigation and dispatching support system, which interacts directly with a data pushing agent 2440 to deliver data to web service endpoint 2442 for presentation to an integration database 2444 and communication to telematic data processing 2404.

Further, a telematic device 2426 may communicate directly with a queryable interface compliant application 2428, such as a driver performance monitoring system, which provides data to a device database 2434 through a data pulling agent 2432 that interrogates a queryable integration interface 2430, thereby allowing device database 2434 to receive data from a telematic device for which it has no direct protocol access. In one embodiment data pulling agent 2432 initiates calls to queryable integration interface 2430 on a regular schedule, e.g., every 5 minutes. In one implementation, the act of querying queryable integration interface 2430 consists of data pulling agent 2432 building a Standard Object Access Protocol (SOAP) request and transmitting it to the queryable integration interface 2430 over a TCP/IP socket. The SOAP request contains parameters necessary to retrieve the data of interest such as dates, customer identifiers, and/or asset or device identifiers. In response to the SOAP request sent by data pulling agent 2432 to queryable integration interface 2430, a response encoded in XML is returned to data pulling agent 2432 which is stored in device database 2434.

A telematic device 2446, such as remote unit 100n of FIG. 1, can send data in a standardized manner to a standard device server 2448, which then delivers the data to a device database 2450 for presentation to telematic data processing 2404, by providing standardized interfaces allowing any device or system implementing the interfaces to send data into device-specific databases 200a-200n using, for example, a Device Direct Standard Protocol (DDSP).

Figure 25:
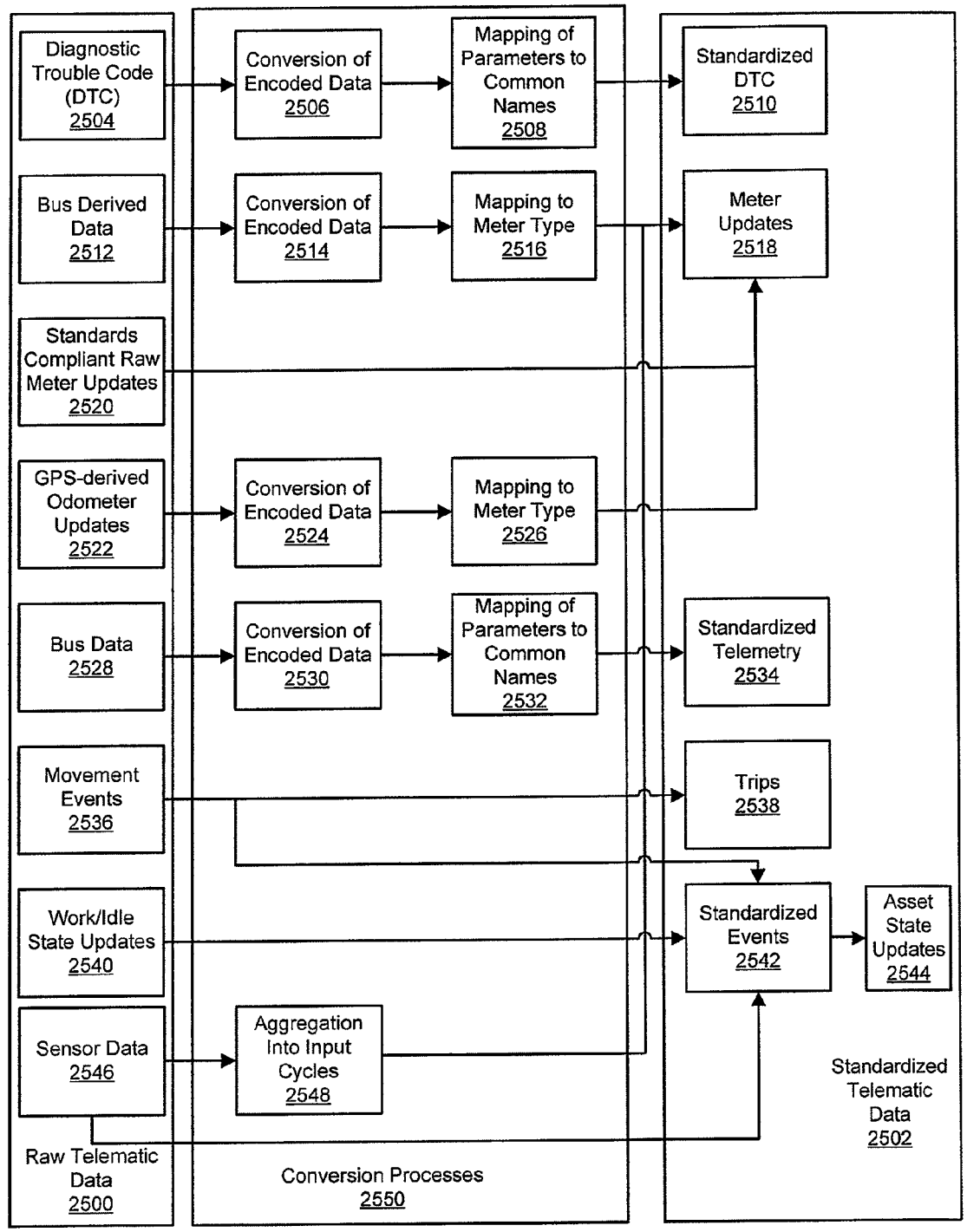
FIG. 25 illustrates a flow of telematic data processing for monitoring and management of a mobile equipment fleet, in accordance with one embodiment of the present invention.

Referring now to FIG. 25, a flow of telematic data processing for monitoring and management of a mobile equipment fleet, in accordance with one embodiment of the present invention, is illustrated. Raw telematic data 2500 is normalized, using a set of conversion processes 2550 from its first (native) format, in which it is received, to a second (standardized and/or device-neutral) format to create standardized telematic data 2502 through a series of steps illustrated in FIG. 26, which are an embodiment of telematic data processing 2306 and will vary according to the type of raw telematic data 2500. Telematic data processing 2306 allows the standardized telematic data 2502 to be utilized generically within a system without applying special logic based on the source of the data. While some data sources are capable of producing standards-compliant native-format data, generally speaking, the format of raw telematic data 2500 and the format of standardized telematic data 2502 are different formats.

Raw telematic data 2500 may take the form of a diagnostic trouble code (DTC) 2504. To convert a DTC 2504 to a standardized DTC 2510, telematic data processing 2306 includes conversion of encoded data 2506 and mapping of parameters to common names 2508. Examples A-C, below, depict different examples of raw formats that are converted to a standardized format for use as standardized DTC 2510.

Example (A) of DTC 2504 depicts a raw SAE J1939 DM1 message fragment, in which the received data is:
0x970314 (hexadecimal)
0000 0000 1001 0111 0000 0011 0001 0100 (binary)
Example (B) of DTC 2504 depicts a partially decoded, attribute value pair notation, in which the received data is:
SPN=1208; FMI=3; OC=10
Example (C) of DTC 2504: depicts a proprietary XML-encoded fragment, in which the received data is:

```
<DTC>
    <PARAMETER>4584</PARAMETER>
    <CHANNEL>2</CHANNEL>
    <DETAIL MODE="3" />
    <COUNT>10</COUNT>
</DTC>
```

For each of examples A-C, telematic data processing 2306 uses conversion of encoded data 2506 and mapping of parameters to common names 2508 to generate a standardized DTC 2510 indicating that the monitored parameter "Engine Pre-filter Oil Pressure" has entered the failure mode indicating "Voltage Above Normal, Or Shorted To High Source" and the failure mode has occurred 10 times. In one embodiment, the resulting standardized DTC 2510 may use content identical to Example C as a standardized data storage format for standardized DTC 2510.

Additionally, raw telematic data 2500 may include bus-derived data 2512. Examples of bus-derived data include data compliant with the Controller Area Network Bus (CANbus) standards published by the Society of Automotive Engineers (SAE), including, for example, the SAE J1939 and SAE J1708 standards. Examples of the data provided include an "on", "working", "idle" or "off" state of an engine (based on revolution per minute (RPM) rates and rules for decoding them), fuel consumption data, speed data, or mileage data.

To convert bus-derived data 2512 to meter updates 2518, telematic data processing 2306 includes conversion processes 2502 for conversion of encoded data 2514 and mapping to meter type 2516. In one embodiment of mapping to meter type 2516, "Engine Total Hours of Operation" is mapped to the meter type "Hour Meter." In order to generate meter updates 2518, mapping to meter type 2516 determines the type of update, (e.g., absolute). A call to the meter_update( ) stored procedure on database server 138 is executed, passing the unique device identifier, update type, timestamp, and "Engine Total Hours of Operation" as parameters. The meter_update( ) stored procedure records the meter update in master database 202 by performing SQL insert and updated operations.

Receipt of bus-derived data 2512 is available from a telematic device, such as remote unit 100*n*, which is capable of communicating on a vehicle bus utilizing the SAE J1939 protocol. Remote device 100*n* reads and delivers as bus-derived data 2512 the SPN 247 "Engine Total Hours of Operation" signal, which includes binary encoded data of size 4 bytes, indicating 0.05 hr/bit, with 0 offset. Remote device 100*n* transmits:
1. Unique Device Identifier
2. Date and time the data was read
3. Raw 4 bytes Conversion of encoded data 2514 takes the raw four bytes and converts the raw four bytes to an unsigned integer. The resulting value is multiplied by 0.05 to yield the decoded "Engine Total Hours of Operation."

Alternatively, if standards-compliant raw meter updates 2520 are received as raw data, they are used as standardized data 2502. Examples of meter updates 2520 can include odometer updates, engine hour meter updates, separator hours updates for a combine, pump hours updates for a concrete truck, or any other running tally of the use of equipment associated with an asset. Meter updates 2520 can also include absolute data (such as engine hours=12,345 total) or incremental data (such as engine use=+13.5 hours for a particular session).

Raw telematic data 2500 may also take the form of GPS-derived odometer updates 2522. GPS-derived odometer updates 2522 involve the conversion of GPS-coordinates to estimate a linear distance traveled, and can be used, as a proxy for an odometer reading, to estimate asset usage when an odometer reading is not available. To convert GPS-derived odometer update 2522 (also called a virtual odometer reading) to meter update 2518, telematic data processing 2306 includes conversion processes 2502 for conversion of encoded data 2524 and mapping to meter type 2526.

Example (A)

In one embodiment, an absolute virtual odometer reading from a telematic device consists of the following data:
1. Unique Device Identifier
2. Date and time the reading was recorded
3. Number of miles (or kilometers or some distance measure) traveled since last reset of virtual odometer Example (B)

In one embodiment, an incremental virtual odometer reading from a telematic device consists of the following data:
1. Unique Device Identifier
2. Date and time the reading was recorded
3. Number of miles (or kilometers or some distance measure) traveled since the last incremental virtual odometer reading was transmitted In one embodiment, conversion of encoded data 2524 includes both conversion of each parameter of the message from its native format (binary, character, XML, or other encoding) into primitive values of integers and timestamps and conversion of the distance traveled into meters, which is used as the standard unit of measure in the system for distance. In one embodiment, mapping to meter type 2526 includes determination of the type of meter being updated, (e.g., virtual odometer updates map to an odometer meter type). In one embodiment, mapping to meter type 2526 completes the conversion of GPS-derived odometer update 2522 by executing the following steps:
1. Determine the type of update, either absolute (Ex. A) or incremental (Ex. B).
2. Execute a call to the meter_update( ) stored procedure on the master database server passing the unique device identifier, update type, timestamp, and distance traveled as parameters.
3. The meter_update( ) stored procedure records the meter update in the master database by performing SQL insert and updated operations.

Raw telematic data 2500 may further take the form of bus data 2528. Examples of bus data can include odometer and hour meter readings, sensor readings (such as engine coolant temperature), and certain device trouble codes. To convert bus data 2528 to standardized telemetry 2534, telematic data processing 2306 includes conversion processes 2502 for conversion of encoded data 2530 and mapping of parameters to common names 2532.

Raw telematic data 2500 may additionally take the form of movement events 2536, which may be received directly as trips 2538 or standardized events 2542, which can then be converted to asset state updates 2544. Examples of an asset state include "the cargo door is open," which would inform the system that the state of the cargo door of the asset is "open" until a "cargo door is closed" state update is received. Work/idle state updates 2540 may also be received directly as standardized events 2542, which can then be converted to asset state updates 2544. Similarly, sensor data 2546 may be aggregated into input cycles 2548 for use as meter updates 2518. Sensor data 2546 can include any data received by a mobile unit 100*n* over a sensor lead 304 or a serial port, for example. Typical examples of sensor data include detection of whether an engine has turned on or off, detection of whether a cargo door has opened or closed, detection of a temperature in a refrigerated compartment, detection of whether a dump truck gate has opened or closed, and detection of whether a power take-off (PTO) is engaged. Other examples of sensor data will vary from embodiment to embodiment.

Figure 26:
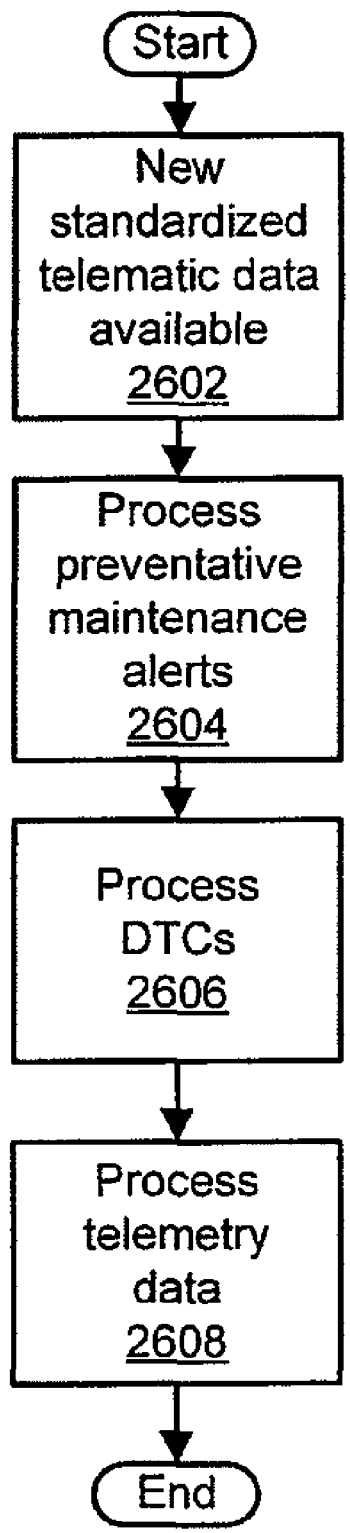
FIG. 26 depicts a flowchart of a process for maintenance data processing for monitoring and management of a mobile equipment fleet, in accordance with one embodiment of the present invention.

Turning now to FIG. 26, a flowchart of a process for maintenance data processing for monitoring and management of a mobile equipment fleet, in accordance with one embodiment of the present invention, is depicted. In one embodiment, preventive maintenance alerts are created from usage information accumulated for an asset, which is compared to maintenance schedules that can be applied to a single asset or a group of assets. In one embodiment, usage information for an asset is a part of standardized telematic data 2308, and is more specifically contained in meter updates 2518. The process of creating maintenance alerts is 2312 shown in more detail in FIG. 18, above. Referring briefly to FIG. 18, in one embodiment, step 1808 includes retrieval of all maintenance rules that apply to an asset. Maintenance rules which apply include those that are directly assigned to the asset and those that are assigned to a group of assets where the asset is a member of the group. Groups of assets can be flexibly defined on the basis of a broad range of factors, which include the manufacturer of an asset, the model or year of an asset, or the equipment type of an asset (e.g., an excavator, loader, or passenger vehicle). Examples of groups provided by the system include groups based on asset type (e.g., all excavators belonging to an enterprise or all passenger vehicles leased by an enterprise regardless of manufacturer, year of manufacture), groups based on model (e.g., all Ford F-150 pickup trucks), and groups based on location (e.g., all assets domiciled at the northwest regional yard). The system also supports user-defined groups which allow the user to define a group for any purpose. Example usage of a user-defined group includes all assets expected to be used in the next month, all assets planned for sale or disposal, and all assets requiring a trailer for transport between locations.

Further, maintenance can be scheduled for attachments to assets, which can be attached and recorded as being attached in a fixed or interchangeable manner. After starting, the process moves to step 2602, which depicts maintenance analysis engine 1706 determining that new standardized telematic data 2502 is available for processing. The process then proceeds to step 2604. Step 2604 illustrates processing of preventative maintenance alerts, which can be, in one embodiment, performed by maintenance analysis engine 1706. An example of a process of processing preventative maintenance alerts is provided in FIG. 18, which is described above. The process then moves to step 2606, which depicts processing of device trouble codes. An example of a process for processing device trouble codes is described below with respect to FIG. 27. The process next moves to step 2608, which depicts processing telemetry data. An example of a process for processing telemetry data is described below with respect to FIG. 28. The process then ends.

Figure 27:
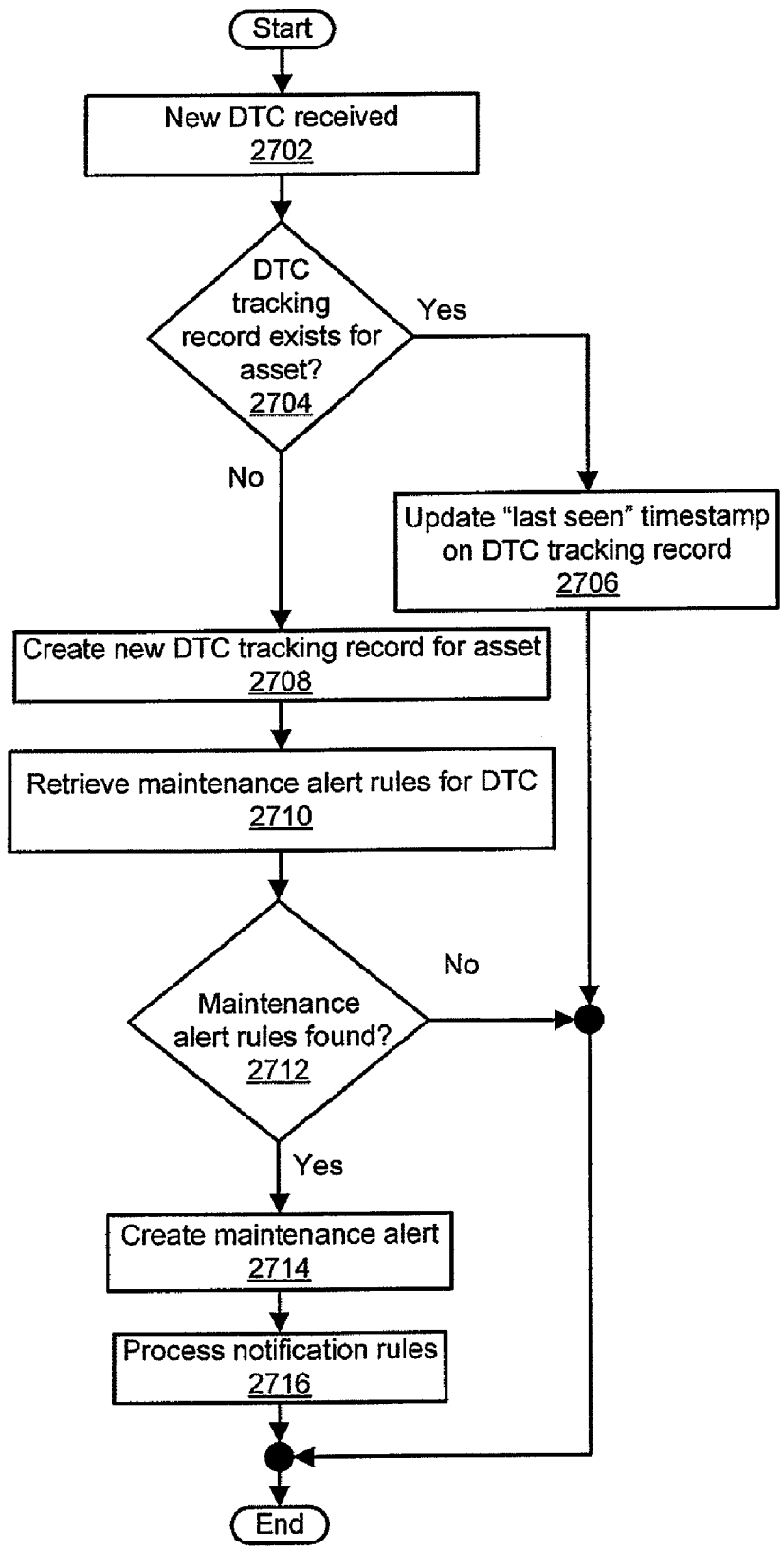
FIG. 27 illustrates a flowchart of a process for device trouble code processing for monitoring and management of a mobile equipment fleet, in accordance with one embodiment of the present invention.

Referring now to FIG. 27, a flowchart of a process for device trouble code processing for monitoring and management of a mobile equipment fleet, in accordance with one embodiment of the present invention, is illustrated. FIG. 27 displays the steps taken when a new DTC is available for processing. In one embodiment, the steps of FIG. 27 are performed by maintenance analysis engine 1706. Additionally, the process illustrated in FIG. 27 reflects one embodiment of maintenance data processing 2312. Many assets, such as automobiles, constantly report a DTC while the DTC remains active. If a DTC is determined to be new, a tracking record is created for the DTC. Rules for creating maintenance alerts based on the DTC and the asset with which it is associated are then retrieved. In one embodiment, the task for which the maintenance alert is created is selected by a prioritized search for the most specific rule that applies to the asset. In one embodiment, such a search is conducted in the following order:

A rule that matches the manufacturer, model, and year of manufacture;
A rule that matches the manufacturer and model;
A rule that matches the manufacturer;
If the DTC is related to the engine;
A rule that matches the engine manufacturer and engine model, and
A rule that matches the engine manufacturer;
A rule that matches the asset type; and
A rule that matches the DTC.

For example, a DTC for "Engine coolant temperature exceeds normal range" triggers a maintenance alert for the "Cooling System Inspection" task. These rules may be defined with a variable number of parameters such that they apply only when the DTC occurs on assets of a particular make, model, year of manufacture, or type of asset. Notifications are then processed for any maintenance alerts that are created.

The process of FIG. 27 provides for tracking of DTCs that are currently active and identifying, by creating a tracking record, new DTCs that are detected. After starting, the process moves to step 2702, which depicts receiving a new DTC. The process then proceeds to step 2704. Step 2704 illustrates determining whether a DTC tracking record exists for the asset associated with the DTC received in step 2702. If it is determined that a tracking record exists for the asset associated with the DTC received in step 2702, then the process next moves to step 2706, which depicts performing an update of a "last seen" time stamp on the DTC tracking record referenced in step 2704. The process then ends.

Returning to step 2704, if it is determined by database server 138 through a query of master database 202 that a tracking record does not exist for the asset associated with the DTC received in step 2702, then the process next moves to step 2708. Step 2708 illustrates database server 138 creating a new DTC tracking record in master database 202 for the asset associated with the DTC received in step 2702. The process then proceeds to step 2710, which depicts retrieval by database server 138 through a query of master database 202 of maintenance alert rules for the DTC received in step 2702. The process next moves to step 2712. Step 2712 illustrates determining whether maintenance alert rules were found for the DTC received in step 2702. If it is determined that no maintenance alert rules were found for the DTC received in step 2702, the process then ends at step 2718. If, however, it is determined that maintenance alert rules were found for the DTC received in step 2702, then the process proceeds to step 2714, which depicts creation of a maintenance alert.

The process next moves to step 2716. Step 2716 illustrates processing of notification rules. The process then ends. An example of a process for processing maintenance rules is discussed below with respect to FIG. 29.

Figure 28:
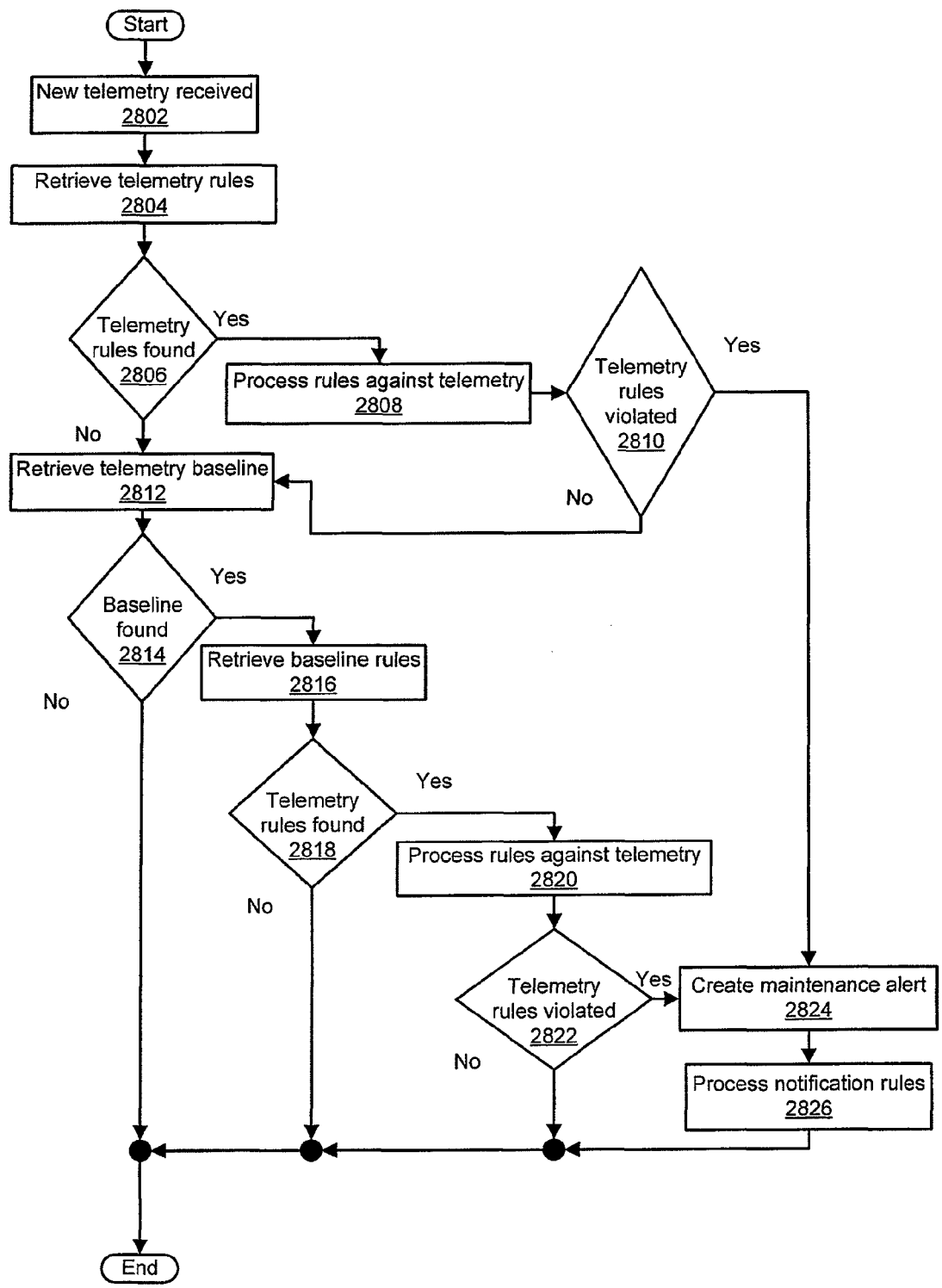
FIG. 28 depicts a flowchart of a process for telemetry processing for monitoring and management of a mobile equipment fleet, in accordance with one embodiment of the present invention.

Turning now to FIG. 28, a flowchart of a process for telemetry processing for monitoring and management of a mobile equipment fleet, in accordance with one embodiment of the present invention, is depicted. When data is received, data is processed against a multivariate rule set based on the reported values and known asset information such as make, model, type, and usage profile. Turning briefly to FIG. 2, reported values include any information received at database server 138. Turning briefly to FIG. 15, one example of a multivariate rule set is the set of geofence rules retrieved in step 1508, where the multiple variables include speed, ignition condition, and position. Turning briefly to FIG. 17, another example of a multivariate rule set is the set of maintenance rules 1700 and asset usage rules 1702. One skilled in the art will readily conclude, based on the content of the present disclosure, that the current invention includes the use of multivariate rule sets including automating many aspects of a business, such as employee management, inventory accounting, asset location management, and cost accounting. Turning briefly to FIG. 2, known asset information includes the entire content of master database 202. If the data reported violates the rule, then a maintenance alert is created. For example, a rule could dictate that engine oil pressure on 2000-2005 Ford F-150 trucks should be within a specified range, measured in psi. If the received data, which is compared to the limits of a range, is not within the specified range, a maintenance alert is created. An alternative method of processing telematic data compares actual values to establish a "known good" baseline. Baseline readings are obtained at a time when the asset is known to be operating properly. Data subsequently received is then compared against the baseline for substantial fluctuation (measured as a percentage deviation from the baseline or, alternatively, a percentile deviation from the baseline when a large sample of historical values is available), which will cause a maintenance alert to be created. Both such a baseline embodiment and a rules embodiment can be integrated into a single process, as is illustrated by the process depicted in FIG. 28, which is, in one embodiment, performed by maintenance analysis engine 1706.

After starting, the process proceeds to step 2802, which depicts receiving new telemetry. The process then moves to step 2804, which illustrates retrieving telemetry rules. The process then proceeds to step 2806, which depicts determining whether telemetry rules were found for the telemetry received in step 2802. If it is determined that telemetry rules were not found for the telemetry received in step 2802, the process next moves to step 2812, which is described below. If, however, it is determined that telemetry rules were found for the telemetry received in step 2802, the process proceeds to step 2808. Step 2808 illustrates processing rules against the telemetry received in step 2802. The process next moves to step 2810, which depicts determining whether any of the telemetry rules against which the telemetry received in step 2802 was processed in step 2808 are violated. If it is determined that telemetry rules against which the telemetry received in step 2802 was processed in step 2808 are violated, the process proceeds to step 2824, which is described below. If, however, it is determined that telemetry rules against which the telemetry received in step 2802 was processed in step 2808 are not violated, the process next moves to step 2812.

Step 2812 illustrates retrieving a telemetry baseline. In one embodiment, a telemetry baseline is an expected numerical value or set of values stored in master database 202 that is used for a rule-based comparison to telemetry data received in step 2802. The process then proceeds to step 2814, which depicts determining whether a telemetry baseline was found in step 2812. If it is determined at step 2814 that no telemetry baseline was found in step 2812, then the process ends. If, however, a telemetry baseline was found in step 2812, then the process next moves to step 2816, which depicts retrieving baseline rules. Baseline rules are rules for comparing the values received in step 2812 to the value received in step 2802 and acting on the results of the comparison. The process then proceeds to step 2818, which depicts determining whether telemetry rules were found for the baseline retrieved in step 2812. If it is determined that telemetry rules were not found for the baseline retrieved in step 2812, then the process ends. If, however, it is determined that telemetry rules were found for the baseline retrieved in step 2812, the process proceeds to step 2820. Step 2820 illustrates processing rules against the telemetry received in step 2802 and the baseline retrieved in step 2812.

The process next moves to step 2822, which depicts determining whether any of the telemetry rules against which the telemetry received in step 2802 was processed in step 2820 are violated. If it is determined that the telemetry data received in step 2802 does not violate the telemetry rules, the process ends. If, however, it is determined that the telemetry data received in step 2802 does violate the telemetry rules, the process next moves to step 2824. Step 2824 depicts creation of a maintenance alert. The process next moves to step 2826, which represents processing of notification rules. An example of an embodiment of a process for processing notification rules is discussed below with respect to FIG. 29. The process then ends.

Figure 29:
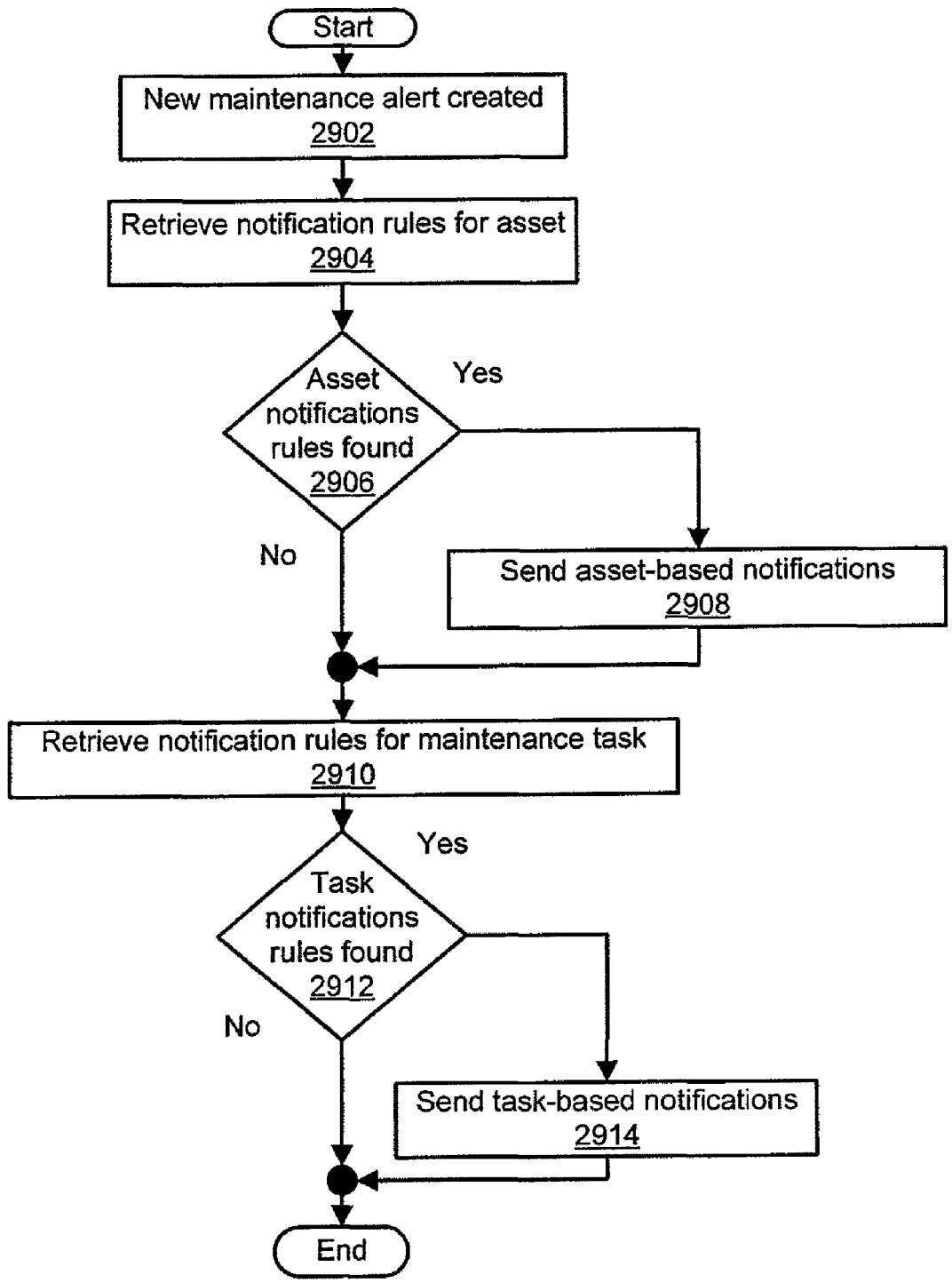
FIG. 29 illustrates a flowchart of maintenance alert notification processing for monitoring and management of a mobile equipment fleet, in accordance with one embodiment of the present invention.

Referring now to FIG. 29, a flowchart of maintenance alert notification processing for monitoring and management of a mobile equipment fleet, in accordance with one embodiment of the present invention, is illustrated. FIG. 29 depicts a process, which can be performed on data conversion server 130 for sending notifications in response to creation of a maintenance alert. Examples of methods for sending a notification include email, short message service (SMS), interactive voice response (IVR) phone call, message displayed on a website, or any other applicable method of communication. Two methods of defining rules are shown (per asset and per task) but many more options are available in a variety of implementations. Similarly, some embodiments of the present invention include analysis of the history of telemetry data received to find readings that are statistically abnormal and create maintenance alerts base on those abnormal readings.

After starting, the process proceeds to step 2902, which depicts creation of a new maintenance alert. An example of a process for creation of a new maintenance is portrayed in FIG. 26, which is described above. The process next moves to step 2904. Step 2904 illustrates retrieval of notification rules for an asset. The process then proceeds to step 2906, which depicts determining whether asset-based notification rules have been found for the maintenance alert created at step 2902. An asset-based notification rule defines conditions for sending alerts to a particular recipient by a particular mode and is referenced all alerts that occur for a particular asset. For example, an asset-based notification rule could require notifying a department supervisor about alerts on vehicles assigned to employees reporting to the supervisor. If it is determined that no asset-based notification rules have not been found for the maintenance alert created at step 2902, then the process proceeds to step 2910, which is described below. If, however, it is determined that asset-based notification rules have been found for the maintenance alert created at step 2902, then the process next moves to step 2908. Step 2908 depicts sending asset-based notifications.

The process then proceeds to step 2910, which depicts retrieval of notification rules for a task. The process then proceeds to step 2912, which depicts determining whether task-based notification rules have been found for the maintenance alert created at step 2902. A task-based notification rule defines conditions for sending an alert to a particular recipient by a particular mode. For example, an asset-based notification rule could require notifying a hydraulic specialist about DTCs raised for hydraulic systems. If it is determined that task-based notification rules have not been found for the maintenance alert created at step 2902, then the process ends. If, however, it is determined that task-based notification rules have been found for the maintenance alert created at step 2902, then the process next moves to step 2914. Step 2914 depicts sending task-based notifications. The process then ends.

Figure 30:
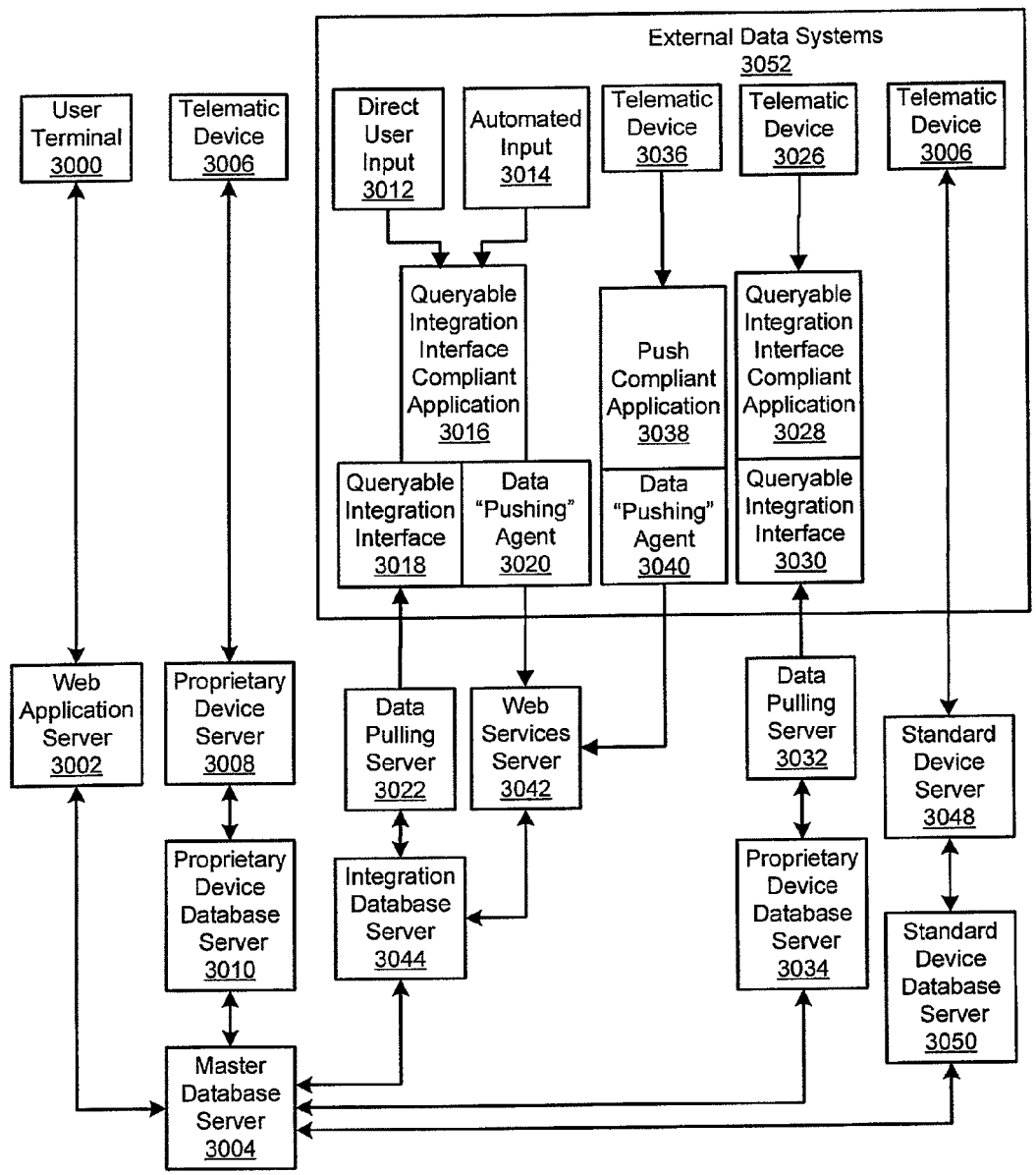
FIG. 30 depicts physical components of a system for acquisition of data to be used in conjunction with monitoring and management of a mobile equipment fleet, in accordance with one embodiment of the present invention.

Turning now to FIG. 30, physical components of a system for acquisition of data to be used in conjunction with monitoring and management of a mobile equipment fleet, in accordance with one embodiment of the present invention, are depicted. In one embodiment of the present invention, the physical components displayed in FIG. 30 perform components of data acquisition process 2302 of FIG. 23. Direct user input can be supplied through a user terminal 3000 to a web application server 3002 and transmitted to a system providing telematic data processing, such as master database server 3004. Examples of telematic data processing performed by master database server 3004 include, for example, step 410 of FIG. 4, step 812 of FIG. 8, or step 1008 of FIG. 10. Master database server 3004 normalizes the raw telematic data 2304 received form a variety of sources from its first (native) format to a second (standardized) format to create standardized telematic data 2308.

A telematic device 3006, such as remote unit 100n of FIG. 1, can send data in a customized manner. Examples of customization include the use of a proprietary communication protocol. Customization can also be provided for by allowing for configurably variable conditions motivating when data is transmitted and what data is transmitted. In one embodiment, remote unit 100*n* can communicate to a proprietary device server 3008 using a proprietary protocol, referred to as a Device Direct Proprietary Protocol. In such an embodiment, telematic device 3006 sends data to a proprietary device server 3008 for communication to a proprietary device database server 3010 and eventual delivery to master database 3004.

Some embodiments of the present invention allow for interoperability with a broad range of external data systems 3052 including processes, applications and devices communicating over standardized interfaces and protocols. For example, direct user input 3012, such as input into a business application or a web reporting service can be communicated to a queryable interface compliant application 3016, such as a web service. Similarly, automated input 3014, such as pump data received from a gasoline or water pump at a service station, can be communicated to a queryable interface compliant application 3016. Queryable interface compliant application 3016 can then provide data through a queryable integration interface 3018 to a data pulling server 3022 for presentation to an integration database server 3044. Data acquisition using aggregator pull solutions includes business applications that store asset-related data such as fuel usage, mileage, or maintenance costs. Similarly, queryable interface compliant application 3016 can deliver data to a web services server 3042 using a data pushing agent 3020. Examples of aggregator push systems include vehicle location service providers.

In one embodiment of an aggregator push solution in accordance with the present invention, a telematic device 3036 can communicate with a push-compliant third-party application 3038, such as a navigation and dispatching support system, which interacts directly with a data pushing agent 3040 to deliver data to web service server 3042 for presentation to an integration database server 3044 and communication to master database server 3004.

Further, a telematic device 3026 may communicate directly with a queryable interface compliant application 3028, which provides data to a proprietary device database server 3034 through a data pulling server 3032 that interrogates a queryable integration interface, thereby allowing device database 3034 to receive data from a telematic device for which it has no direct protocol access.

A telematic device 3046, such as remote unit 100*n* of FIG. 1, can send data in a highly standardized manner to a standard device server 3048, which then delivers the data to a standard device database server 3050 for presentation to master database server 3004, by providing standardized interfaces allowing any device or system implementing the interfaces to send data into master database server 3004 using a Device Direct Standard Protocol (DDSP).

Figure 31A:
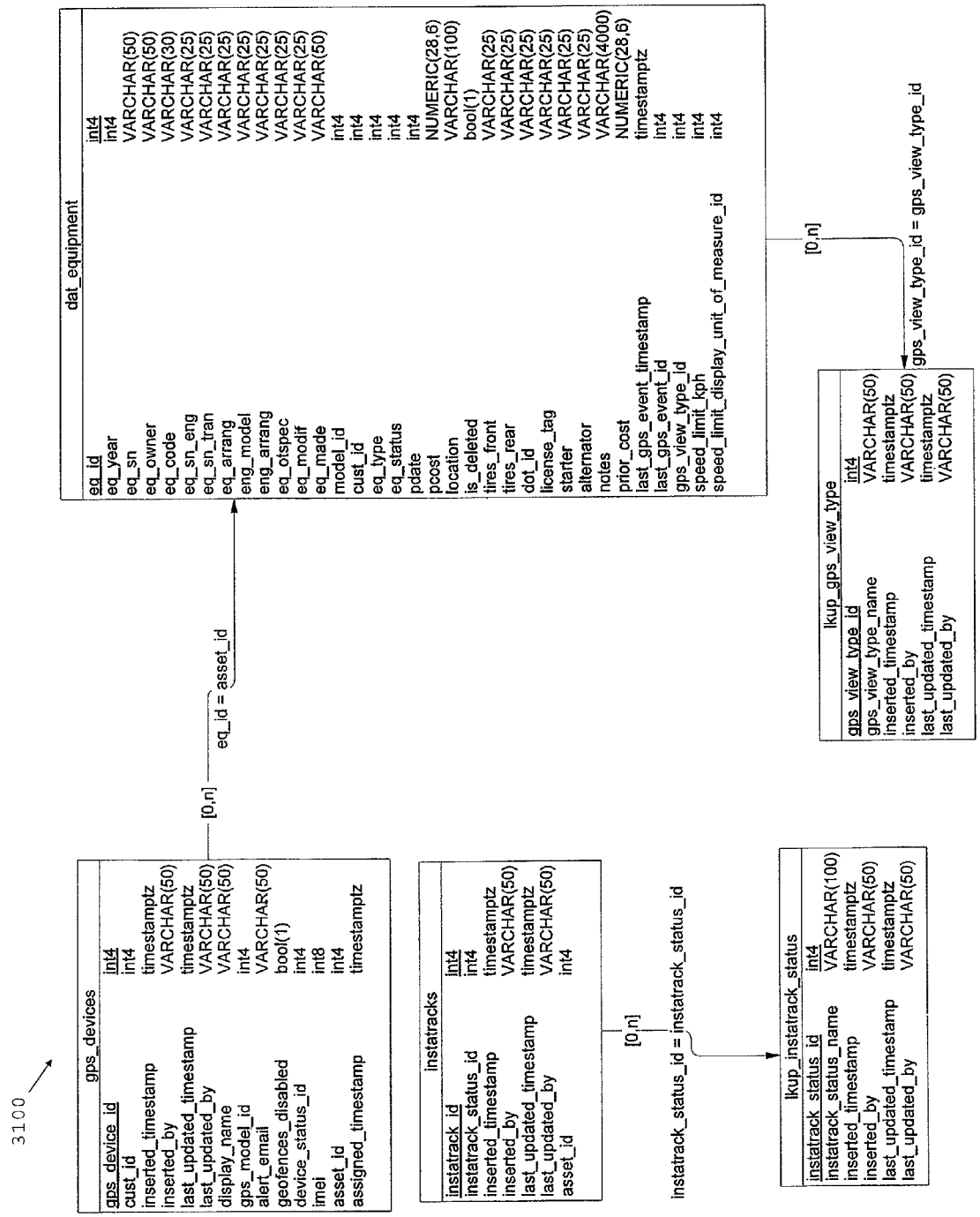
Figure 32C:
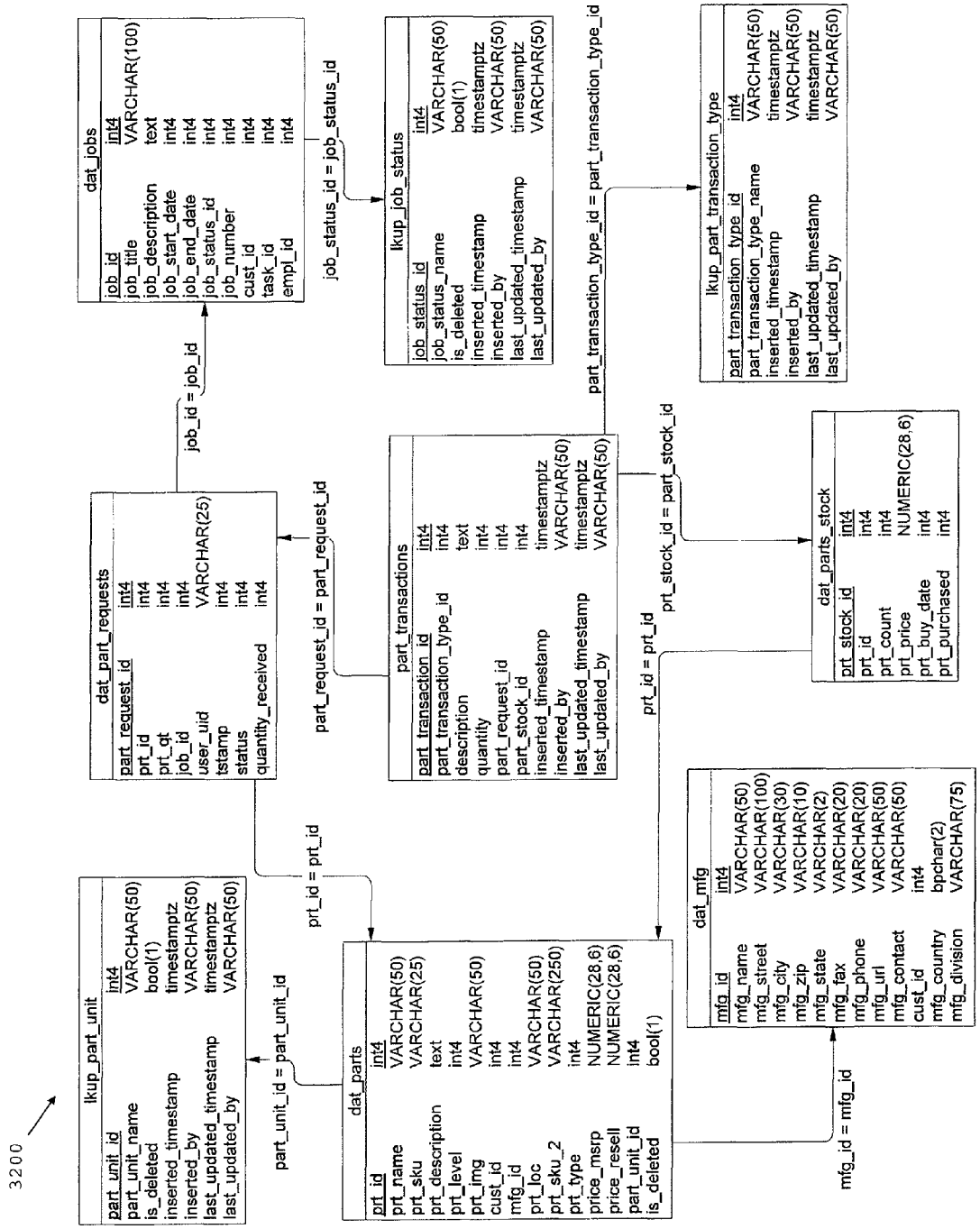
Figure 32D:
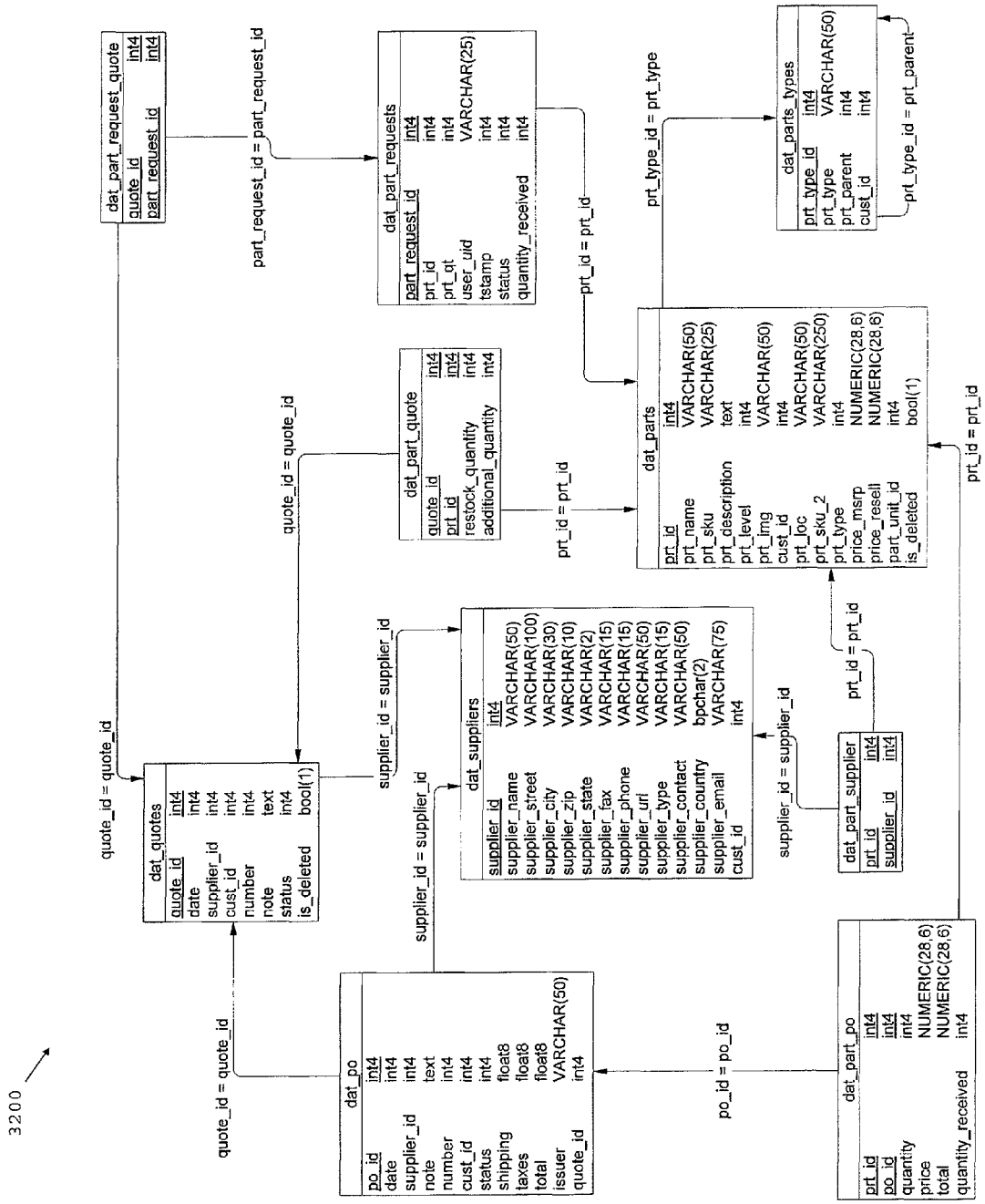

Referring now to FIG. 31A-C, an entity relationship diagram for an alerts and notifications portion of a database in accordance with one embodiment of the present invention is illustrated. In one embodiment of the present invention database entities and functions 3100 exist within master database 202 and support implementation of the functions described above.

Turning now to FIG. 32A-D, an entity relationship diagram for maintenance portion of a database in accordance with one embodiment of the present invention is depicted. In one embodiment of the present invention database entities and functions 3200 exist within master database 202 and support implementation of the functions described above.

Referring now to FIG. 33A-B, an entity relationship diagram for the device management and interaction portion of a database in accordance with one embodiment of the present invention is illustrated. In one embodiment of the present invention database entities and functions 3300 exist within device-specific database 200*a* and support implementation of the functions described above.

Turning now to FIG. 34A-C, an entity relationship diagram for an assets portion of a database in accordance with one embodiment of the present invention is depicted. In one embodiment of the present invention database entities and functions 3400 exist within master database 202 and support implementation of the functions described above.

Figures 1, 35:
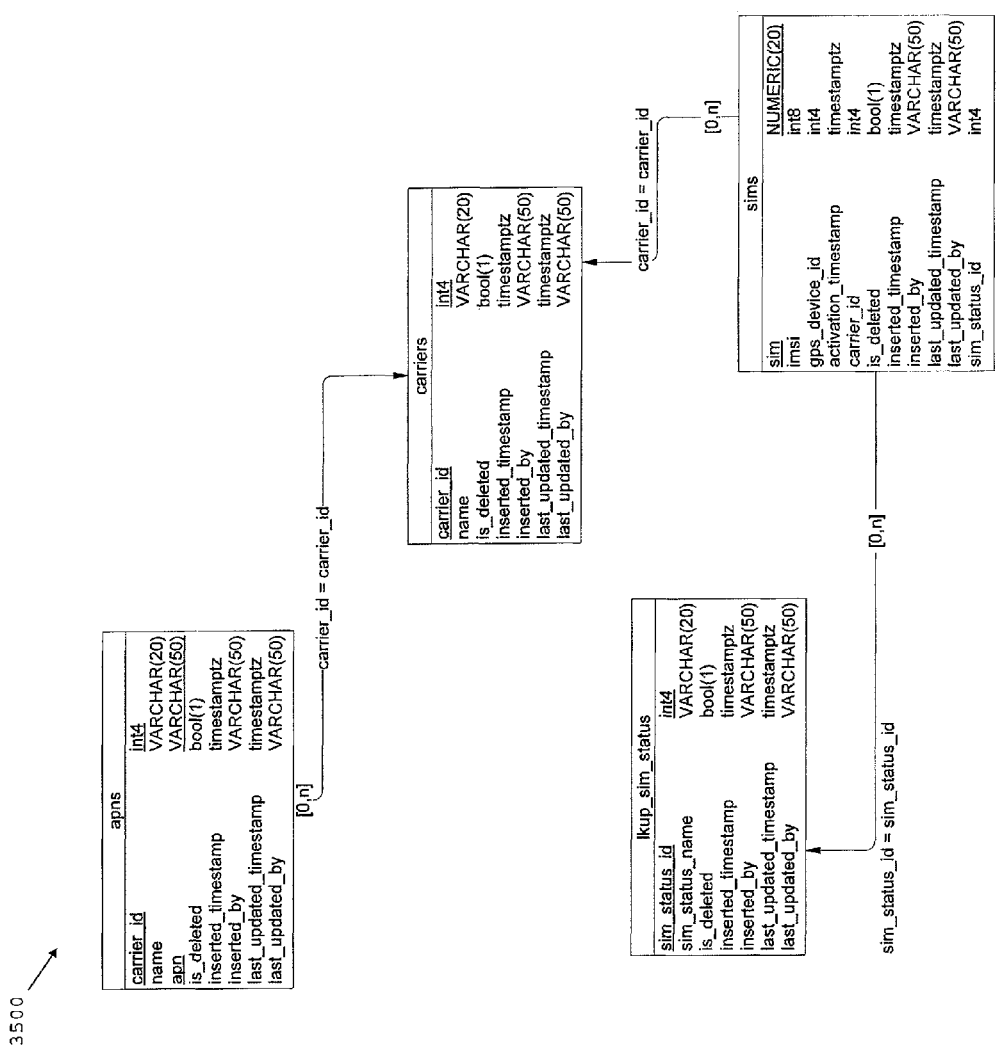
FIG. 35 illustrates an entity relationship diagram for a communications portion of a database in accordance with one embodiment of the present invention is illustrated.
Figures 2, 35:
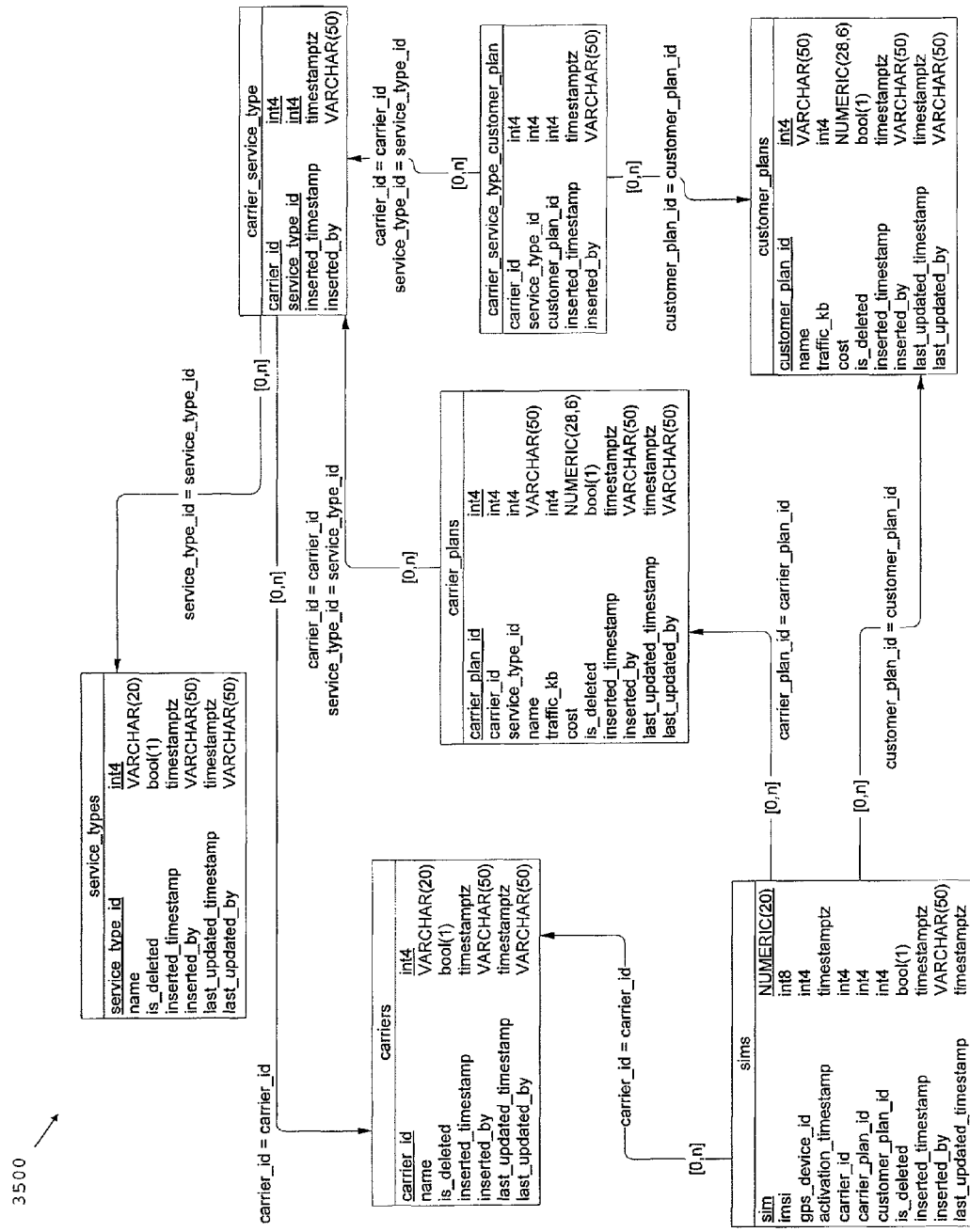

Referring now to FIG. 35, an entity relationship diagram for a communications portion of a database in accordance with one embodiment of the present invention is illustrated. In one embodiment of the present invention database entities and functions 3500 exist within master database 202 and support implementation of the functions described above.

Turning now to FIG. 36A-C, an entity relationship diagram for the device management and interaction portion of a database in accordance with one embodiment of the present invention is depicted. In one embodiment of the present invention database entities and functions 3600 exist within device-specific database 200*b* and support implementation of the functions described above. With respect to each of FIG. 31A-36C, although depicted separately, the entities shown are, in one embodiment, part of an interrelated database system, Additionally, while one embodiment of the present invention is displayed with respect to each of FIG. 31A-36C, one skilled in the art will quickly realize that substantially different database relationship implementations can embody the present invention without departing from the scope of the present invention.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, said method comprising:
   one or more servers receiving a message from a remote device attached to a mobile physical asset that is remote from the one or more servers, wherein said message comprises data describing a status of the mobile physical asset and a location of the mobile physical asset;
   storing said described data, wherein storing said described data comprises
     a device specific database from a device-specific server using a poll of said device-specific server established over a bi-directional communication channel by said device-specific database;
   analyzing said stored data of the one or more servers using a set of rules, wherein said analyzing comprises
     performing a maintenance analysis with respect to maintenance of the mobile physical asset; and
   responsive to said analyzing said data using said set of rules, sending an alert, wherein
     said alert specifies a maintenance activity to perform on the mobile physical asset.

2. The method of claim 1, wherein
   said method further comprises storing said data in a maintenance history, said maintenance history comprises a record of maintenance activities performed on the mobile physical asset, and the mobile physical asset is a vehicle.

3. The method of claim 1, wherein said analyzing further comprises
analyzing said data using a location-based rule.

4. The method of claim 1, further comprising,
collecting said data using said remote device.

5. The method of claim 4, further comprising:
pre-processing said data to create an event;
pushing said event to a master database; and
presenting a report of said alert to a user.

6. The method of claim 5, wherein said pushing said event to said master database further comprises
said pushing being performed without processing said event; and
said pushing being performed by a priority push engine.

7. The method of claim 5, wherein
said pushing further comprises
pushing said event to said master database after processing said event;
said pushing is performed by a processed-push engine;
said method further comprises building a quote associated with said alert; and
said quote lists one or more parts required to perform a task associated to said alert.

8. A non-transitory computer-readable storage medium storing program instructions configured, when executed, to cause a server to:
receive a message from a remote device attached to a mobile physical asset that is remote from the server, wherein said message comprises data describing a status of the mobile physical asset and a location of the mobile physical asset,
store said described data, wherein said stored data comprise instructions configured to cause said server to:
deliver said data to a device specific database from a device-specific server using a poll of said device-specific server established over a bi-directional communication channel by said device-specific database,
analyze said data using a set of rules, wherein said instructions configured to analyze said data comprise instructions configured to perform a maintenance analysis with respect to maintenance of the mobile physical asset, and
responsive to said maintenance analysis, send an alert, wherein the alert specifies a maintenance activity to perform on said mobile physical asset.

9. The non-transitory computer-readable storage medium of claim 8, wherein said program instructions are further configured to cause said server to store said data a maintenance history, and said maintenance history comprises a record of maintenance activities performed on the mobile physical asset.

10. The non-transitory computer-readable storage medium of claim 8, wherein said instructions configured to analyze said data using a set of rules further comprise:
instructions configured to cause said processor to analyze said data using a location-based rule.

11. The non-transitory computer-readable storage medium of claim 8, wherein said instructions further comprise:
instructions configured to cause said processor to collect said data using said remote device.

12. The non-transitory computer-readable storage medium of claim 11, wherein said instructions further comprise:
instructions configured to cause said processor to pre-process said data to create an event;
instructions configured to cause said processor to push said event to a master database; and
instructions configured to cause said processor to present a report of said event to a user.

13. The non-transitory computer-readable storage medium of claim 11, wherein said instructions configured to cause said processor to push said event to a master database further comprise:
instructions configured to cause said processor to perform said pushing without processing said event; and
instructions configured to cause said processor to perform said pushing using a priority push engine.

14. A system, comprising:
a processor,
instructions, stored on a computer-readable storage medium, configured to cause said processor to perform a method, said method comprising
receiving a message from a remote device attached to a mobile physical asset that is remote from a server, wherein said message comprises data describing a status of the mobile physical asset and a location of the mobile physical asset;
storing said described data, wherein storing data comprises:
delivering said data to a device specific database from a device-specific server using a poll of said device-specific server established over a bi-directional communication channel by said device-specific database;
analyzing said data using a set of rules, wherein said analyzing comprises
performing a maintenance analysis with respect to maintenance of the physical asset; and
responsive to said analyzing said data using said set of rules, sending an alert, wherein the alert specifies a maintenance activity to perform on the mobile physical asset.

15. The system of claim 14, wherein said method further comprises storing said data in a maintenance history.

16. The system of claim 14, wherein said analyzing further comprises
analyzing said data using a location-based rule.

17. The system of claim 14, said method further comprising:
collecting said data using said remote device.

* * * * *